United States Patent
Lin et al.

(10) Patent No.: US 12,394,020 B2
(45) Date of Patent: Aug. 19, 2025

(54) RECOMMENDING OBJECTS FOR IMAGE COMPOSITION USING GEOMETRY-AND-LIGHTING AWARE SEARCH AND EFFICIENT USER INTERFACE WORKFLOWS

(71) Applicant: Adobe Inc., San Jose, CA (US)

(72) Inventors: Zhe Lin, Fremont, CA (US); Sijie Zhu, Orlando, FL (US); Jason Wen Yong Kuen, Santa Clara, CA (US); Scott Cohen, Sunnyvale, CA (US); Zhifei Zhang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 518 days.

(21) Appl. No.: 17/658,774

(22) Filed: Apr. 11, 2022

(65) Prior Publication Data

US 2023/0325992 A1    Oct. 12, 2023

(51) Int. Cl.
*G06K 9/40*    (2006.01)
*G06T 3/60*    (2006.01)
(Continued)

(52) U.S. Cl.
CPC ............... *G06T 5/50* (2013.01); *G06T 3/60* (2013.01); *G06T 7/194* (2017.01);
(Continued)

(58) Field of Classification Search
CPC .. G06T 5/50; G06T 3/60; G06T 7/194; G06T 2200/24; G06T 2207/20084;
(Continued)

(56) References Cited

U.S. PATENT DOCUMENTS

| | | |
|---|---|---|
| 5,579,471 A | 11/1996 | Barber et al. |
| 10,504,264 B1 | 12/2019 | Koenig |

(Continued)

FOREIGN PATENT DOCUMENTS

| | | | | |
|---|---|---|---|---|
| DE | 102020002964 A1 | * | 1/2021 | ............... G06N 3/04 |
| GB | 2574087 A | * | 11/2019 | ............... G06F 16/51 |
| WO | WO-2020102767 A1 | * | 5/2020 | ............... G06N 20/00 |

OTHER PUBLICATIONS

Pixabay; Stunning free images & royalty free stock; Date downloaded May 26, 2022; https://pixabay.com.

(Continued)

*Primary Examiner* — Xin Jia
(74) *Attorney, Agent, or Firm* — Keller Preece PLLC

(57) ABSTRACT

The present disclosure relates to systems, methods, and non-transitory computer readable media that utilizes artificial intelligence to learn to recommend foreground object images for use in generating composite images based on geometry and/or lighting features. For instance, in one or more embodiments, the disclosed systems transform a foreground object image corresponding to a background image using at least one of a geometry transformation or a lighting transformation. The disclosed systems further generating predicted embeddings for the background image, the foreground object image, and the transformed foreground object image within a geometry-lighting-sensitive embedding space utilizing a geometry-lighting-aware neural network. Using a loss determined from the predicted embeddings, the disclosed systems update parameters of the geometry-lighting-aware neural network. The disclosed systems further provide a variety of efficient user interfaces for generating composite digital images.

20 Claims, 32 Drawing Sheets

(51) Int. Cl.
   *G06T 5/50* (2006.01)
   *G06T 7/194* (2017.01)
(52) U.S. Cl.
   CPC ...... *G06T 2200/24* (2013.01); *G06T 2207/20084* (2013.01); *G06T 2207/20221* (2013.01)
(58) Field of Classification Search
   CPC ............. G06T 2207/20221; G06T 5/60; G06T 2207/30168; G06T 7/0002
   See application file for complete search history.

(56) References Cited

U.S. PATENT DOCUMENTS

| | | |
|---|---|---|
| 2008/0301546 A1 | 12/2008 | Moore et al. |
| 2014/0035950 A1 | 2/2014 | Jonsson |
| 2019/0251401 A1 | 8/2019 | Shechtman et al. |
| 2019/0361994 A1 | 11/2019 | Shen et al. |
| 2020/0033615 A1 | 1/2020 | Kim et al. |
| 2020/0134858 A1 | 4/2020 | Yang et al. |
| 2022/0019849 A1* | 1/2022 | Kim ..................... G06N 3/08 |
| 2023/0138380 A1 | 5/2023 | Chen et al. |

OTHER PUBLICATIONS

Samaneh Azadi, Deepak Pathak, Sayna Ebrahimi, and Trevor Darrell. Compositional gan: Learning image-conditional binary composition. International Journal of Computer Vision, 128(10):2570-2585, 2020.

Gal Chechik, Varun Sharma, Uri Shalit, and Samy Bengio. Large scale online learning of image similarity through ranking. Journal of Machine Learning Research, 11(3), 2010.

Yun Chen, Frieda Rong, Shivam Duggal, Shenlong Wang, Xinchen Yan, Sivabalan Manivasagam, Shangjie Xue, Ersin Yumer, and Raquel Urtasun. Geosim: Realistic video simulation via geometry-aware composition for self-driving. In Proceedings of the IEEE/CVF Conference on Computer Vision and Pattern Recognition, pp. 7230-7240, 2021.

Jia Deng, Wei Dong, Richard Socher, Li-Jia Li, Kai Li, and Li Fei-Fei. Imagenet: A large-scale hierarchical image database. In 2009 IEEE conference on computer vision and pattern recognition, pp. 248-255. Ieee, 2009.

Mark Everingham, Luc Van Gool, Christopher Ki Williams, John Winn, and Andrew Zisserman. The pascal visual object classes (voc) challenge. International journal of computer vision, 88(2):303-338, 2010.

Priya Goyal, Piotr Dollar, Ross Girshick, Pieter Noordhuis, Lukasz Wesolowski, Aapo Kyrola, Andrew Tulloch, Yangqing Jia, and Kaiming He. Accurate, large mini-batch sgd: Training imagenet in 1 hour. arXiv preprint arXiv:1706.02677, 2017.

Yifan Jiang, He Zhang, Jianming Zhang, Yilin Wang, Zhe Lin, Kalyan Sunkavalli, Simon Chen, Sohrab Amirghodsi, Sarah Kong, and Zhangyang Wang. Ssh: A self-supervised framework for image harmonization. In Proceedings of the IEEE/CVF International Conference on Computer Vision, pp. 4832-4841, 2021.

Diederik P Kingma and Jimmy Ba. Adam: A method for stochastic optimization. arXiv preprint arXiv:1412.6980, 2014.

Alina Kuznetsova, Hassan Rom, Neil Alldrin, Jasper Uijlings, Ivan Krasin, Jordi Pont-Tuset, Shahab Kamali, Stefan Popov, Matteo Malloci, Alexander Kolesnikov, et al. The open images dataset v4. International Journal of Computer Vision, 128(7):1956-1981, 2020.

Jean-Francois Lalonde, Derek Hoiem, Alexei A Efros, Carsten Rother, John Winn, and Antonio Criminisi. Photo clip art. ACM transactions on graphics (TOG), 26(3):3-es, 2007.

Donghoon Lee, Sifei Liu, Jinwei Gu, Ming-Yu Liu, Ming- Hsuan Yang, and Jan Kautz. Context-aware synthesis and placement of object instances. arXiv preprint arXiv:1812.02350, 2018.

Youngwan Lee and Jongyoul Park. Centermask: Real-time anchor-free instance segmentation. InProceedings of the IEEE/CVF conference on computer vision and pattern recognition, pp. 13906-13915, 2020.

Xueting Li, Sifei Liu, Kihwan Kim, Xiaolong Wang, Ming-Hsuan Yang, and Jan Kautz. Putting humans in a scene: Learning affordance in 3d indoor environments. In Proceedings of the IEEE/CVF Conference on Computer Vision and Pattern Recognition, pp. 12368-12376, 2019.

Chen-Hsuan Lin, Ersin Yumer, Oliver Wang, Eli Shechtman, and Simon Lucey. St-gan: Spatial transformer generative adversarial networks for image compositing. In Proceedings of the IEEE Conference on Computer Vision and Pattern Recognition, pp. 9455-9464, 2018.

Tsung-Yi Lin, Michael Maire, Serge Belongie, James Hays, Pietro Perona, Deva Ramanan, Piotr Dollar, and C Lawrence Zitnick. Microsoft coco: Common objects in context. In European conference on computer vision, pp. 740-755. Springer, 2014.

Li Niu, Wenyan Cong, Liu Liu, Yan Hong, Bo Zhang, Jing Liang, and Liqing Zhang. Making images real again: A comprehensive survey on deep image composition.arXiv preprint arXiv:2106.14490, 2021.

Rohit Pandey, Sergio Orts Escolano, Chloe Legendre, Christian Haene, Sofien Bouaziz, Christoph Rhemann, Paul Debevec, and Sean Fanello. Total relighting: learning to relight portraits for background replacement. ACM Transactions on Graphics (TOG), 40(4):1-21, 2021.

Adam Paszke, Sam Gross, Francisco Massa, Adam Lerer, James Bradbury, Gregory Chanan, Trevor Killeen, Zeming Lin, Natalia Gimelshein, Luca Antiga, et al. Pytorch: An imperative style, high-performance deep learning library. Advances in neural information processing systems, 32:8026-8037, 2019.

Karen Simonyan and Andrew Zisserman. Very deep convolutional networks for large-scale image recognition.arXiv preprint arXiv:1409.1556, 2014.

Zhi Tian, Chunhua Shen, Hao Chen, and Tong He. Fcos: Fully convolutional one-stage object detection. In Proceedings of the IEEE/CVF international conference on computer vision, pp. 9627-9636, 2019.

Yi-Hsuan Tsai, Xiaohui Shen, Zhe Lin, Kalyan Sunkavalli, Xin Lu, and Ming-Hsuan Yang. Deep image harmonization. In Proceedings of the IEEE Conference on Computer Vision and Pattern Recognition, pp. 3789-3797, 2017.

Yifan Wang, Andrew Liu, Richard Tucker, Jiajun Wu, Brian L Curless, Steven M Seitz, and Noah Snavely. Repopulating street scenes. InProceedings of the IEEE/CVF Conference on Computer Vision and Pattern Recognition, pp. 5110-5119, 2021.

Zongze Wu, Dani Lischinski, and Eli Shechtman. Fine-grained foreground retrieval via teacher-student learning. In Proceedings of the IEEE/CVF Winter Conference on Applications of Computer Vision, pp. 3646-3654, 2021.

He Zhang, Jianming Zhang, Federico Perazzi, Zhe Lin, and Vishal M Patel. Deep image compositing. In Proceedings of the IEEE/CVF Winter Conference on Applications of Computer Vision, pp. 365-374, 2021.

Lingzhi Zhang, Tarmily Wen, Jie Min, Jiancong Wang, David Han, and Jianbo Shi. Learning object placement by in-painting for compositional data augmentation. In Computer Vision—ECCV 2020: 16th European Conference, Glasgow, UK, Aug. 23-28, 2020, Proceedings, Part XIII 16, pp. 566-581. Springer, 2020.

Hengshuang Zhao, Xiaohui Shen, Zhe Lin, Kalyan Sunkavalli, Brian Price, and Jiaya Jia. Compositing-aware image search. In Proceedings of the European Conference on Computer Vision (ECCV), pp. 502-516, 2018.

Yinan Zhao, Brian Price, Scott Cohen, and Danna Gurari. Unconstrained foreground object search. In Proceedings of the IEEE/CVF International Conference on Computer Vision, pp. 2030-2039, 2019.

Bolei Zhou, Hang Zhao, Xavier Puig, Sanja Fidler, Adela Barriuso, and Antonio Torralba. Scene parsing through ade20k dataset. In Proceedings of the IEEE conference on computer vision and pattern recognition, pp. 633-641, 2017.

Jun-Yan Zhu, Philipp Krahenbuhl, Eli Shechtman, and Alexei A Efros. Learning a discriminative model for the perception of realism in composite images. In Proceedings of the IEEE International Conference on Computer Vision, pp. 3943-3951, 2015.

U.S. Appl. No. 17/660,544, Nov. 12, 2024, Office Action.

(56) References Cited

OTHER PUBLICATIONS

M. Eitz, R. Richter, K. Hildebrand, T. Boubekeur and M. Alexa, "Photosketcher: Interactive Sketch-Based Image Synthesis," in IEEE Computer Graphics and Applications, vol. 31, No. 6, pp. 56-66, Nov.-Dec. 2011, doi: 10.1109/MCG.2011.67. (Year: 2011).
U.S Appl. No. 17/660,544, Feb, 21, 2025, Office Action.
U.S Appl. No. 18/167,690, Feb, 24, 2025, Office Action.
Neural Filters. Adobe Photoshop, 2020 [retrieved on Dec. 5, 2020]. Retrieved from the Internet Archive Wayback Machine. https://web.archive.org/web/20201205000839/https://helpx.adobe.com/photoshop/using/neural-filters.html#expand (Year: 2020).
U.S. Appl. No. 17/658,770, filed Jun. 6, 2025, Notice of Allowance.
U.S. Appl. No. 18/167,690, filed Jun. 20, 2025, Office Action.

* cited by examiner

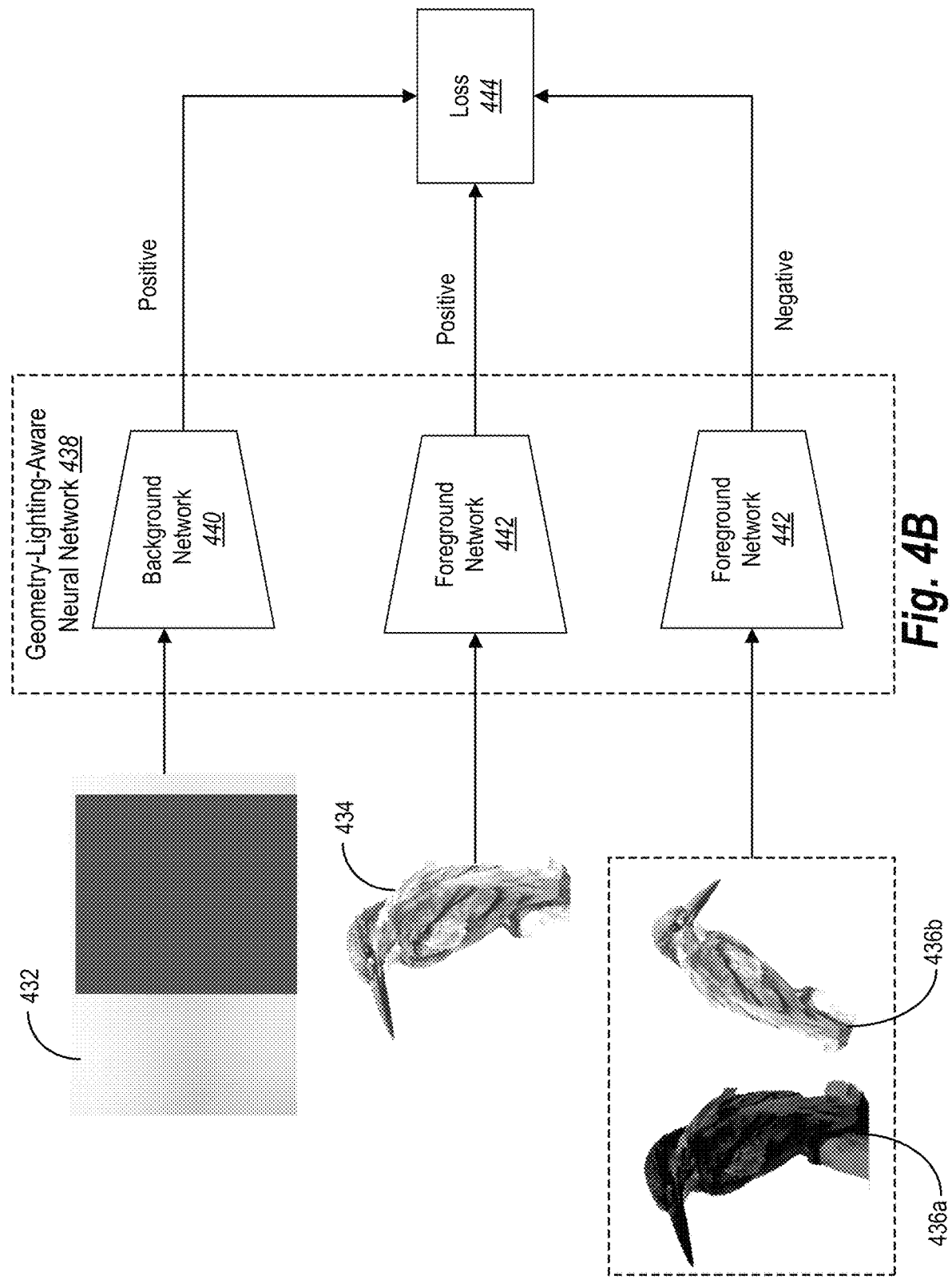

|  | mAP |
|---|---|
| Fix Foreground | 29.10 |
| Direct Training | 17.93 |
| Aug | 23.45 |
| Aug + Alternating | 31.20 |

*Fig. 5C*

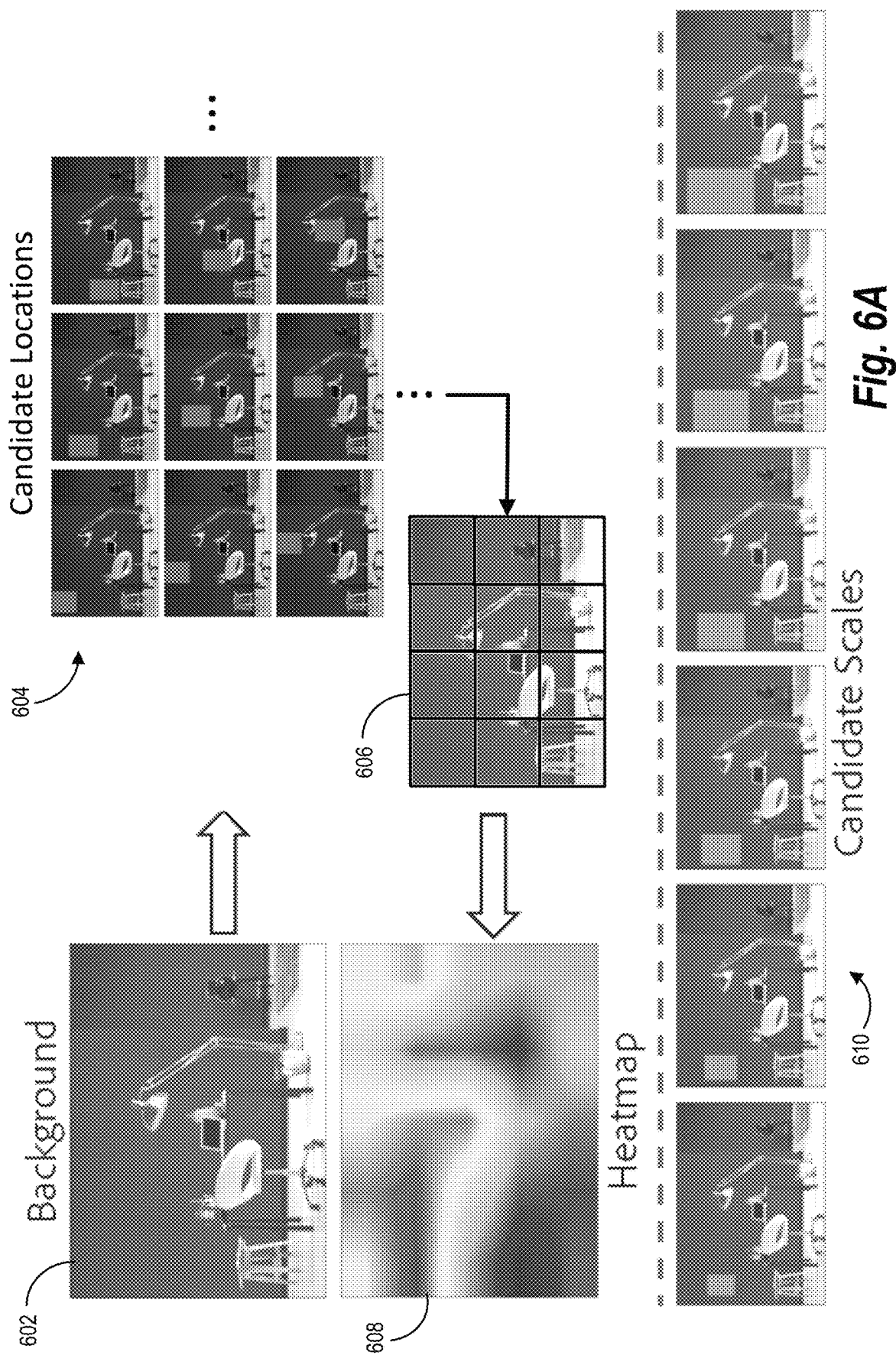

| Method | Boat | Bottle | Car | Chair | Dog | Painting | Person | Plant | Overall |
|---|---|---|---|---|---|---|---|---|---|
| Shape | 7.47 | 1.16 | 10.40 | 12.25 | 12.22 | 3.89 | 6.37 | 8.82 | 7.82 |
| RealismCNN | 12.33 | 7.19 | 7.55 | 1.81 | 7.58 | 6.45 | 1.47 | 12.74 | 7.14 |
| †CFO-C Search | 57.48 | 14.24 | 18.85 | 21.61 | 38.01 | 27.72 | 47.33 | 20.20 | 30.68 |
| †CFO-D Search | 55.48 | 8.93 | 24.10 | 18.16 | 57.82 | 21.59 | 27.66 | 23.13 | 29.61 |
| UFO Search | 59.73 | 21.12 | 36.63 | 19.27 | 36.51 | 25.84 | 27.11 | 31.19 | 32.17 |
| Ours | 70.58 | 19.41 | 40.22 | 24.17 | 37.81 | 28.20 | 44.72 | 34.91 | 37.50 |

*Fig. 10A*

| Category | Majority #samples≈5000 | | | | Medium #samples≈50 | | | | Minority #samples<5 |
|---|---|---|---|---|---|---|---|---|---|
| | Person | Flower | Birds | Vehicle | Cell Phone | Mandarin Orange | Christmas Tree | Boiled Egg | Last 50 Classes |
| Baseline | 5.52 | 11.21 | 7.68 | 9.79 | 8.57 | 30.30 | 8.82 | 9.09 | 8.00 |
| Ours | 19.36 | 28.55 | 21.11 | 26.83 | 20.00 | 63.64 | 20.59 | 30.30 | 24.00 |

*Fig. 10B*

| Method | R@1 | R@5 | R@10 | R@1% |
|---|---|---|---|---|
| Pixabay | | | | |
| Baseline | 2.55 | 7.71 | 11.95 | 64.43 |
| Ours | 7.75 | 20.13 | 28.20 | 85.61 |
| Open Images | | | | |
| Baseline | 0.95 | 2.93 | 4.67 | 60.81 |
| Ours | 5.59 | 15.22 | 22.39 | 88.30 |

Fig. 10C

| Ablation | Lighting | | | | Geometry | | | |
|---|---|---|---|---|---|---|---|---|
| | Sensitivity(↑) | R@5 | R@10 | R@15 | Sensitivity(↑) | R@5 | R@10 | R@15 |
| | | | | Pixabay | | | | |
| Baseline | 0.27 | 53.40 | 67.30 | 75.35 | 0.39 | 58.10 | 69.70 | 77.65 |
| No Contrastive | 0.51 | 55.60 | 70.70 | 79.70 | 0.72 | 61.30 | 74.30 | 82.75 |
| Overall | 0.57 | 60.55 | 74.70 | 82.85 | 1.12 | 98.55 | 99.45 | 99.70 |
| | | | | Open Images | | | | |
| Baseline | 0.24 | 51.70 | 65.45 | 74.60 | 0.40 | 60.10 | 71.80 | 78.45 |
| No Contrastive | 0.53 | 54.80 | 71.55 | 80.10 | 0.98 | 71.70 | 82.60 | 89.10 |
| Overall | 0.56 | 59.35 | 73.90 | 81.80 | 1.58 | 99.50 | 99.75 | 99.90 |

Fig. 11A

| Ablations | mAP | mAP-100 |
|---|---|---|
| No Contrastive | 31.20 | 36.30 |
| Geometry | 32.11 | 36.68 |
| Geometry+Color | 30.80 | 35.06 |
| Geometry+Lighting | 32.67 | 37.49 |

*Fig. 11C*

| Ablations | mAP | mAP-100 |
|---|---|---|
| Direct Training | 17.93 | 24.02 |
| Aug | 23.45 | 31.78 |
| Fix+Aug | 28.65 | 30.33 |
| No Alternating | 29.99 | 32.13 |
| No Contrastive | 31.20 | 36.30 |
| Overall | 32.67 | 37.49 |

*Fig. 11B*

RECOMMENDING OBJECTS FOR IMAGE COMPOSITION USING GEOMETRY-AND-LIGHTING AWARE SEARCH AND EFFICIENT USER INTERFACE WORKFLOWS

BACKGROUND

Recent years have seen significant advancement in hardware and software platforms for image composition. For instance, systems have been developed that can search for and recommend foreground objects that are compatible with a background image for generating an image composition. Upon combining the foreground object and background image, such systems can further apply harmonization techniques to blend the image components together for an improved final appearance. Despite these advances, conventional systems often fail to provide realistic image compositions as they utilize inflexible models that fail to accurately determine the compatibility of a foreground object with a background image. Further, many of these systems execute object searches using tedious, inflexible workflows that require a significant amount of user interaction.

These, along with additional problems and issues exist with regard to conventional object recommendation systems.

SUMMARY

One or more embodiments described herein provide benefits and/or solve one or more of the foregoing or other problems in the art with systems, methods, and non-transitory computer-readable media that implement accurate models and flexible, efficient user interface workflows for object retrieval and image composition. In particular, in one or more embodiments, the disclosed systems learn model parameters for a neural network to facilitate retrieval of foreground objects that match the lighting and geometry of background images. For instance, in some cases, the disclosed systems learn the model parameters via an alternating parameter-update strategy and/or a contrastive approach that incorporates object transformations. In some implementations, the disclosed systems further extend object retrieval to non-box scenarios where a background image is provided without a query bounding box. Additionally, in some embodiments, the disclosed systems provide a user interface to implement a workflow for retrieving foreground objects and generating composite images based on a consolidated set of user interactions. In this manner, the disclosed systems accurately determine object compatibility while reducing the number of interactions required for retrieval and composition.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 4B illustrates utilizing a transformed foreground object image to update parameters of a geometry-lighting-aware neural network in accordance with one or more embodiments;

FIG. 5C illustrates a table reflecting experimental results regarding the effectiveness of the object recommendation system in accordance with one or more embodiments;

FIG. 6A illustrates determining a location and/or scale for a foreground object image within a background image in accordance with one or more embodiments;

FIGS. 10A-10C illustrate tables reflecting further experimental results regarding the effectiveness of the object recommendation system in accordance with one or more embodiments;

FIGS. 11A-11C illustrate tables reflecting yet further experimental results regarding the effectiveness of the object recommendation system in accordance with one or more embodiments;

DETAILED DESCRIPTION

Figure 1:
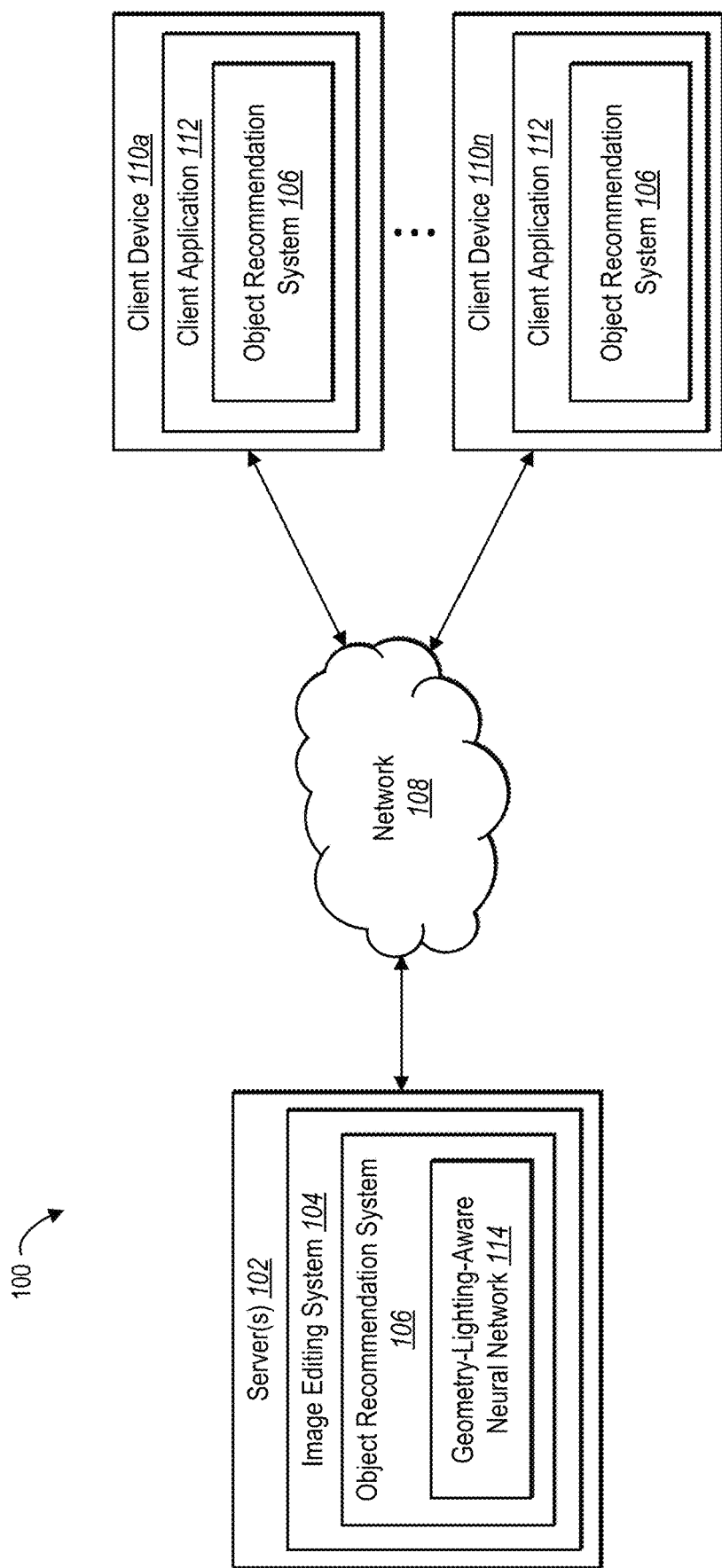
FIG. 1 illustrates an example environment in which an object recommendation system operates in accordance with one or more embodiments.

One or more embodiments described herein include an object recommendation system that generates and provides foreground object recommendations for realistic image composition using an accurate neural network, flexible searching methods, and an efficient graphical user interface. For instance, in one or more embodiments, the object recommendation system utilizes a neural network to retrieve foreground object images that are compatible with background images for generating composite images in terms of semantics, geometry, and lighting. In some embodiments, the object recommendation system builds the neural network using lighting and/or geometric object transformations or by alternating updates to the various network components. In some implementations, the object recommendation system further recommends a location and/or a scale for a foreground object image when no such parameters are provided. Additionally, in some cases, the object recommendation system implements a graphical user interface that intuitively facilitates object retrieval and image composition based on a small set of user interactions.

As mentioned, in one or more embodiments, the object recommendation system builds a neural network for retrieving foreground object images. In particular, in some embodiments, the object recommendation system builds a lighting-and-geometry-aware neural network that retrieves foreground object images based on their compatibility with the lighting and geometry (as well as the semantics) of background images selected for image composition. To illustrate, in some cases, the object recommendation system learns parameters for the lighting-and-geometry-aware neural network. Further, in some implementations, the object recommendation system learns an embedding space where the proximity/distance between embeddings is at least partly based on geometry and lighting features (e.g., a geometry-lighting-sensitive embedding space).

As further discussed, in some embodiments, the object recommendation system builds the lighting-and-geometry-aware neural network utilizing one or more object transformations. For instance, in some cases, the object recommendation system utilizes transformed foreground object images to learn parameters for the lighting-and-geometry-aware neural network that will position a transformed foreground object image away from its untransformed counterpart within the embedding space. In some cases, the object recommendation system transforms a foreground object image by modifying a geometry of the foreground object image. In some instances, the object recommendation system transforms a foreground object image by modifying a lighting of the foreground object image.

Further, in some implementations, the object recommendation system builds the lighting-and-geometry-aware neural network by alternating updates to its various components. To illustrate, in one or more embodiments, the lighting-and-geometry-aware neural network includes a foreground network and a background network. In some cases, the object recommendation system maintains the parameters of the foreground network when updating the parameters of the background network. Likewise, in some instances, the object recommendation system maintains the parameters of the background network when updating the parameters of the foreground network.

Thus, in one or more embodiments, the object recommendation system implements the lighting-and-geometry-aware neural network having the parameters learned from the transformed foreground object images and/or the alternating updating process. To illustrate, in one or more embodiments, the object recommendation system receives a background image (and corresponding query bounding box) for generating a composite image. The object recommendation system further utilizes the lighting-and-geometry-aware neural network to identify a foreground object image that is proximate to the background image within the embedding space. Accordingly, the object recommendation system generates a recommendation for using the identified foreground object image to generate the composite image with the background image.

In one or more embodiments, the object recommendation system extends object recommendations to non-box scenarios. Indeed, in some implementations, the object recommendation system receives a background image without receiving a query bounding box that sets parameters for object retrieval. The object recommendation system recommends one or more foreground object images despite the lack of a query bounding box.

For instance, in some cases, the object recommendation system generates a plurality of bounding boxes within the background image, generates embeddings for the plurality of bounding boxes, and identifies a compatible foreground object image using the embeddings. In some implementations, the object recommendation system further recommends a location for the foreground object image within the background image and/or a scale of the foreground object image to use in the composite image. In some embodiments, the object recommendation system utilizes the lighting-and-geometry-aware neural network in determining the foreground object image and/or the location to recommend.

Further, as mentioned above, in some implementations, the object recommendation system implements a graphical user interface that intuitively facilitates the provision of object recommendations and composite images. For instance, in some cases, the object recommendation system, via a graphical user interface of a client device, receives a background image for image composition and recommends a foreground object image in response. In some cases, the object recommendation system provides the foreground object image and/or a composite image containing the foreground object image for display as part of the recommendation. In some cases, such as when no query bounding box is provided, the object recommendation system generates the composite image so that the foreground object image is at a recommended location. Further, in some cases, the object recommendation system utilizes the graphical user interface to enable intuitive modifications to an object recommendation via a small number of user interactions.

As mentioned above, conventional object recommendation systems suffer from several technological shortcomings that result in inflexible, inaccurate, and inefficient operation. In particular, many conventional systems are inflexible in that they employ models that rigidly search for and recommend foreground objects based on a limited set of features. For instance, conventional systems often employ models that retrieve foreground objects based on their semantic compatibility with background images but fail to consider other aspects of compatibility that affect the resulting image composition. Additionally, many conventional systems rigidly require parameter inputs, such as a query bounding box, to guide the object search and retrieval.

Further, conventional object recommendation systems often suffer from inaccuracies. For example, because many conventional systems focus on semantic compatibility without regard to other features of compatibility, such systems often fail to accurately determine the compatibility of a foreground object with a background. Indeed, though a foreground object retrieved by these systems may semantically match a background image, other image features may ultimately render the foreground object incompatible. Thus, composite images generated using these incompatible foreground objects can appear unrealistic.

In addition to inflexibility and inaccuracy problems, conventional object recommendation systems can also operate inefficiently. In particular, conventional systems typically require a significant number of user interactions with a client device in order to execute an object search, generate an image composition, or make changes thereafter. For instance, after a foreground object is retrieved, conventional systems may require user interactions to trigger the combination of image components or modify the foreground object within the composite image (e.g., adjusting the location, size, lighting, or orientation of the foreground object). Further, by requiring parameter inputs as part of the search query, conventional systems implement workflows that rely on several user interactions to recommend a foreground object.

The object recommendation system provides several advantages over conventional systems. For example, the object recommendation system improves the flexibility of implementing computing devices when compared to conventional systems. To illustrate, by building and implementing a geometry-lighting-aware neural network, the object recommendation system flexibly recommends foreground object images based on various aspects of compatibility that are not considered by conventional systems. In particular, by learning network parameters using geometry/lighting transformations, the object recommendation system enables the geometry-lighting-aware neural network to determine compatibility in terms of lighting and geometry (in addition to semantics). Additionally, by providing the capability to recommend a location and/or scale for a foreground object image, the object recommendation system flexibly generates object recommendations when a query bounding box is not provided.

Additionally, the object recommendation system can improve the accuracy of implementing computing devices when compared to conventional systems. Indeed, by determining compatibility using a wide variety of image features, the object recommendation system more accurately identifies foreground object images that are compatible with background images. Further, by learning network parameters for the foreground network using an alternating update process, the object recommendation system learns better parameters that lead to more accurate object search and retrieval. Thus, the resulting composite images appear more realistic, as recommended foreground object images are a more natural fit within the background.

Further, the object recommendation system can improve the efficiency of implementing computing devices when compared to conventional systems. Indeed, by recommending foreground object images that have various dimensions of compatibility with background images, the object recommendation system reduces the interactive steps needed to adjust features (e.g., lighting and geometry) within the resulting composite image to achieve a more realistic appearance. Further, by providing the capability to recommend a location and/or scale of a foreground object image, the object recommendation system eliminates the need for user interactions to provide such parameters. Moreover, the object recommendation system utilizes a graphical user interface to implement a workflow that anticipates the needs for a successful image composition and provides object recommendations, location/scale recommendations, or composite images with reduced reliance on user interactivity.

Additional details regarding the object recommendation system will now be provided with reference to the figures. For example, FIG. 1 illustrates a schematic diagram of an exemplary system environment ("environment") 100 in which an object recommendation system 106 operates. As illustrated in FIG. 1, the environment 100 includes a server(s) 102, a network 108, and client devices 110*a*-110*n*.

Although the environment 100 of FIG. 1 is depicted as having a particular number of components, the environment 100 is capable of having any number of additional or alternative components (e.g., any number of servers, client devices, or other components in communication with the object recommendation system 106 via the network 108). Similarly, although FIG. 1 illustrates a particular arrangement of the server(s) 102, the network 108, and the client devices 110*a*-110*n*, various additional arrangements are possible.

The server(s) 102, the network 108, and the client devices 110*a*-110*n* are communicatively coupled with each other either directly or indirectly (e.g., through the network 108 discussed in greater detail below in relation to FIG. 14). Moreover, the server(s) 102 and the client devices 110*a*-110*n* include one of a variety of computing devices (including one or more computing devices as discussed in greater detail with relation to FIG. 14).

As mentioned above, the environment 100 includes the server(s) 102. In one or more embodiments, the server(s) 102 generates, stores, receives, and/or transmits data including neural networks, digital images, composite images, and recommendations for foreground object images. In one or more embodiments, the server(s) 102 comprises a data server. In some implementations, the server(s) 102 comprises a communication server or a web-hosting server.

In one or more embodiments, the image editing system 104 provides functionality by which a client device (e.g., a user of one of the client devices 110*a*-110*n*) generates, edits, manages, and/or stores digital images. For example, in some instances, a client device sends a digital image to the image editing system 104 hosted on the server(s) 102 via the network 108. The image editing system 104 then provides many options that the client device may use to edit the digital image, store the digital image, and subsequently search for, access, and view the digital image. For instance, in some cases, the image editing system 104 provides one or more options that the client device may use to create a composite image using the digital image.

Additionally, the server(s) 102 includes the object recommendation system 106. In one or more embodiments, via the server(s) 102, the object recommendation system 106 identifies and recommends foreground object images that are compatible with background images for generating composite images. For instance, in some cases, the object recommendation system 106, via the server(s) 102, builds and implements a geometry-lighting-aware neural network 114 to identify and recommend foreground object images. In some cases, via the server(s) 102, the object recommendation system 106 further recommends a location and/or scale for a foreground object image within a composite image. Example components of the object recommendation system 106 will be described below with regard to FIG. 12.

In one or more embodiments, the client devices 110a-110n include computing devices that can access, edit, modify, store, and/or provide, for display, digital images, including composite images. For example, the client devices 110a-110n include smartphones, tablets, desktop computers, laptop computers, head-mounted-display devices, or other electronic devices. The client devices 110a-110n include one or more applications (e.g., the client application 112) that can access, edit, modify, store, and/or provide, for display, digital images, including composite images. For example, in some embodiments, the client application 112 includes a software application installed on the client devices 110a-110n. In other cases, however, the client application 112 includes a web browser or other application that accesses a software application hosted on the server(s) 102.

The object recommendation system 106 can be implemented in whole, or in part, by the individual elements of the environment 100. Indeed, as shown in FIG. 1 the object recommendation system 106 can be implemented with regard to the server(s) 102 and/or at the client devices 110a-110n. In particular embodiments, the object recommendation system 106 on the client devices 110a-110n comprises a web application, a native application installed on the client devices 110a-110n (e.g., a mobile application, a desktop application, a plug-in application, etc.), or a cloud-based application where part of the functionality is performed by the server(s) 102.

In additional or alternative embodiments, the object recommendation system 106 on the client devices 110a-110n represents and/or provides the same or similar functionality as described herein in connection with the object recommendation system 106 on the server(s) 102. In some implementations, the object recommendation system 106 on the server(s) 102 supports the object recommendation system 106 on the client devices 110a-110n.

For example, in some embodiments, the object recommendation system 106 on the server(s) 102 train one or more machine learning models described herein (e.g., the geometry-lighting-aware neural network 114). The object recommendation system 106 on the server(s) 102 provides the one or more trained machine learning models to the object recommendation system 106 on the client devices 110a-110n for implementation. Accordingly, although not illustrated, in one or more embodiments the client devices 110a-110n utilize the one or more trained machine learning models to generate recommend foreground object images for image composition.

In some embodiments, the object recommendation system 106 includes a web hosting application that allows the client devices 110a-110n to interact with content and services hosted on the server(s) 102. To illustrate, in one or more implementations, the client devices 110a-110n accesses a web page or computing application supported by the server(s) 102. The client devices 110a-110n provide input to the server(s) 102 (e.g., a background image). In response, the object recommendation system 106 on the server(s) 102 utilizes the trained machine learning models to generate a recommendation for utilizing a foreground object image with the background image in generating a composite image. The server(s) 102 then provides the recommendation to the client devices 110a-110n.

In some embodiments, though not illustrated in FIG. 1, the environment 100 has a different arrangement of components and/or has a different number or set of components altogether. For example, in certain embodiments, the client devices 110a-110n communicate directly with the server(s) 102, bypassing the network 108. As another example, the environment 100 includes a third-party server comprising a content server and/or a data collection server.

Figure 2A:
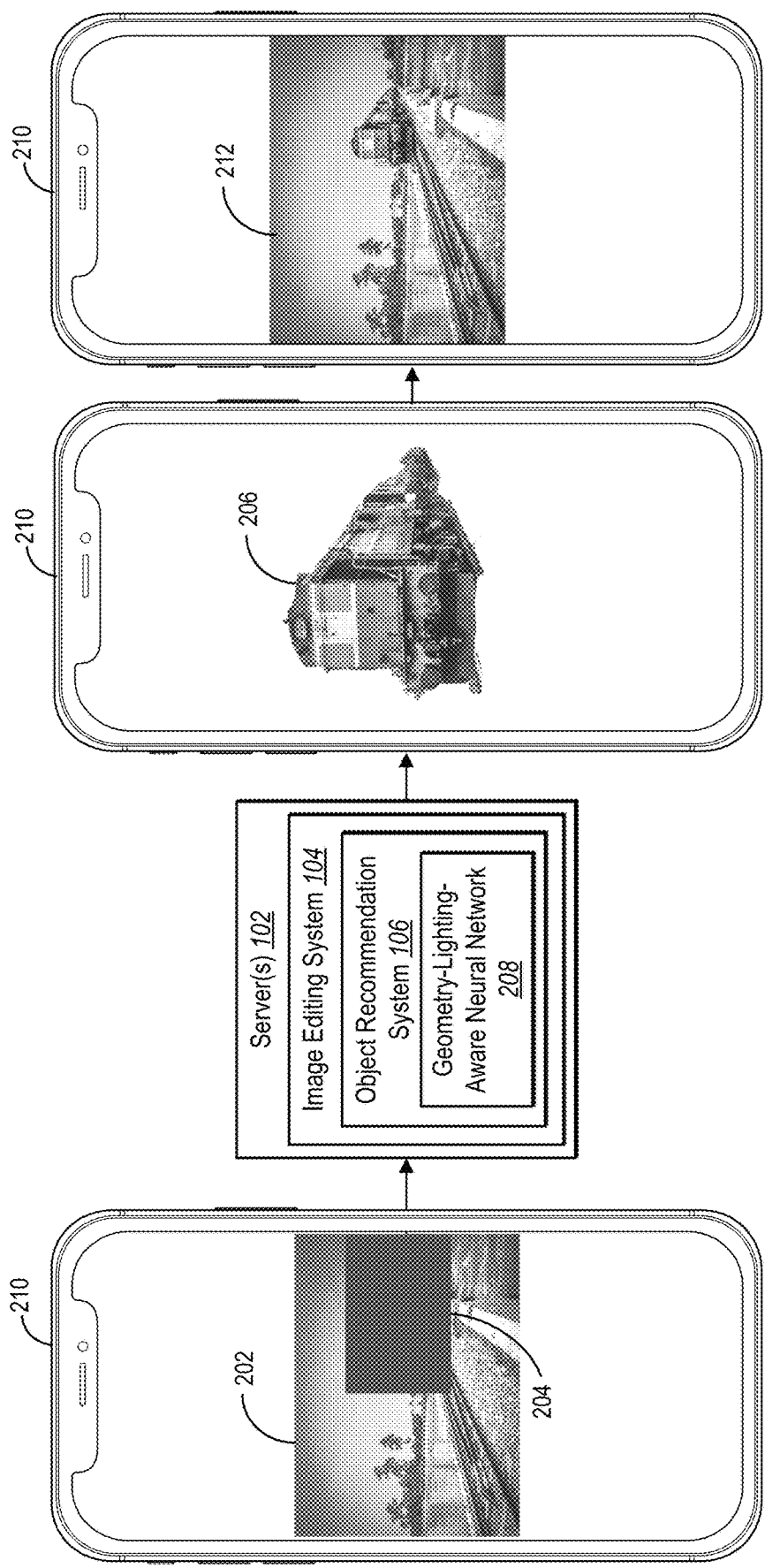
FIG. 2A illustrates an overview diagram of the object recommendation system recommending a foreground object image to use to generate a composite image in accordance with one or more embodiments.

As mentioned above, the object recommendation system 106 generates recommendations for using foreground object images in creating a composite image. FIG. 2A illustrates an overview diagram of the object recommendation system 106 recommending a foreground object image to use to generate a composite image in accordance with one or more embodiments.

In one or more embodiments, a foreground object image includes a digital image portraying a foreground object. In particular, in some embodiments, a foreground object image includes a digital image usable for providing a foreground object for a composite image. For example, in some implementations, a foreground object image includes a digital image portraying a person or other object that is used to generate a composite image having the same portrayal of the person or object. In some implementations, a foreground object image includes a portrayal of the foreground object against a solid background or a cutout of the foreground object (e.g., without a background). Accordingly, in some instances, the following disclosure utilizes the terms foreground object image and foreground object interchangeably.

In some embodiments, the object recommendation system 106 recommends a foreground object image based on a background image to be used in generating a composite image. Indeed, as shown in FIG. 2A, the object recommendation system 106 receives, from a client device 210, a background image 202 for use in generating a composite image.

In one or more embodiments, a background image includes a digital image portraying a scene. In particular, in some embodiments, a background image includes a digital image that portrays a scene that is usable as a background within a composite image. For instance, in some cases, a background image portrays a scene that is used to generate a composite image portraying the same scene as a background.

As further shown in FIG. 2A, the object recommendation system 106 also receives a query bounding box 204 within the background image 202. In one or more embodiments, a query bounding box includes a bounding box that provides parameters for searching for a foreground object. In particular, in some implementations, a query bounding box includes a user-defined bounding box that indicates user-selected parameters for searching for a foreground object image. To illustrate, in some cases, a query bounding box indicates a scale parameter (e.g., a maximum scale) for use in searching for a foreground object. In some instances, a query bounding box indicates a location parameter for use in searching for a foreground object. For instance, in some embodiments, a query bounding box indicates a location within a background image to add a foreground object in generating a composite image. Accordingly, in some embodiments, the object recommendation system 106 searches for, retrieves, and recommends a foreground object image that is compatible with the portion of the background image covered by the query bounding box. A query bounding box is not limited to a particular shape. For example, a query bounding box can be implemented as a box, oval, circle, polygon, or irregular shape.

Indeed, as shown in FIG. 2A, the object recommendation system 106 retrieves a foreground object image 206 that is compatible with the background image 202 for use in generating a composite image. In particular, in some cases, the object recommendation system 106 retrieves the foreground object image 206 based on determining that the foreground object image 206 is compatible with the portion of the background image 202 that corresponds to the query bounding box 204.

As illustrated by FIG. 2A, the object recommendation system 106 utilizes a geometry-lighting-aware neural network 208 to retrieve the foreground object image 206 for the recommendation. For instance, in some cases, the object recommendation system 106 utilizes the geometry-lighting-aware neural network 208 to analyze the background image 202 and the query bounding box 204 and retrieve the foreground object image 206 based on the analysis.

In one or more embodiments, a neural network includes a type of machine learning model, which can be tuned (e.g., trained) based on inputs to approximate unknown functions used for generating the corresponding outputs. In particular, in some embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

In some embodiments, a geometry-lighting-aware neural network includes a computer-implemented neural network that identifies foreground objects (e.g., foreground object images) that are compatible with background images for use in generating composite images. In particular, in some embodiments, a geometry-lighting-aware neural network includes a computer-implemented neural network that analyzes a background image and determines, from a set of foreground objects, one or more foreground objects that are compatible with the background image based on the analysis. For instance, in some cases, a geometry-lighting-aware neural network determines compatibility by considering similarities of a variety of image characteristics, such as lighting, geometry, and semantics.

In one or more embodiments, the object recommendation system 106 generates a recommendation using the foreground object image 206. For example, as shown in FIG. 2A, the object recommendation system 106 provides the foreground object image 206 to the client device 210 to recommend using the foreground object image 206 in generating a composite image. In some cases, the object recommendation system 106 includes additional information as part of the recommendation, such as a score indicating the compatibility between the background image 202 and the foreground object image 206.

As further shown in FIG. 2A, the object recommendation system 106 generates a composite image 212 from the background image 202 and the foreground object image 206. In some cases, the object recommendation system 106 generates the composite image 212 upon receiving a user acceptance of the foreground object image 206. In some implementations, the object recommendation system 106 generates the composite image 212 upon retrieving the foreground object image 206 and provides the composite image 212 to the client device 210 as part of the recommendation (e.g., as a preview of the resulting composition).

Figure 2B:
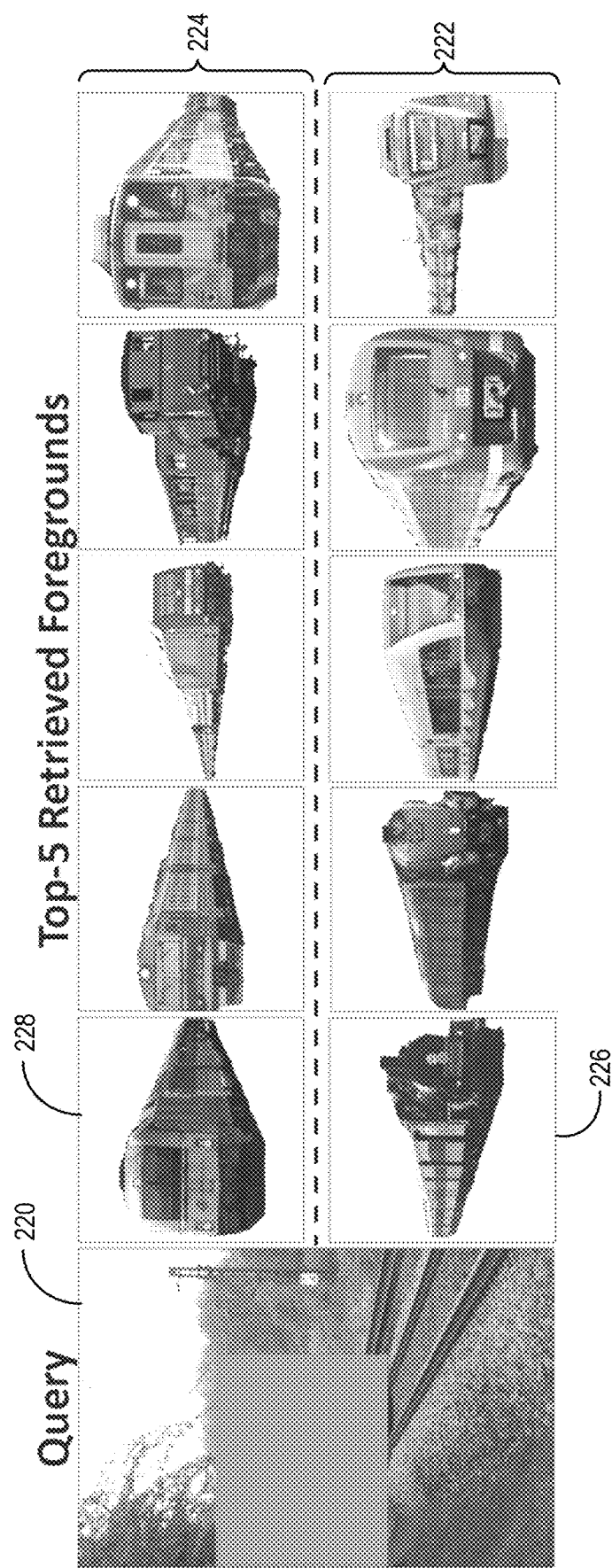
FIG. 2B illustrates graphical representations comparing recommendations of the object recommendation system and recommendations of a conventional system in accordance with one or more embodiments.

By utilizing a geometry-lighting-aware neural network, the object recommendation system 106 recommends foreground object images that are more similar to background images in terms of lighting and geometry (as well as semantics) when compared to conventional systems. FIG. 2B illustrates graphical representations comparing recommendations of the object recommendation system 106 and recommendations of a conventional system in accordance with one or more embodiments.

Indeed, FIG. 2B illustrates a plurality of recommendations provided in response to a query 220 that includes a background image and a query bounding box. In particular, FIG. 2B illustrates the top foreground object images recommended by an embodiment of the object recommendation system 106 in the first row 222. The foreground object images shown in the second row 224 represent the top recommendations provided by a conventional system that does not explicitly model lighting and geometry, such as the unconstrained foreground object (UFO) search model described by Yinan Zhao et al., *Unconstrained Foreground Object Search*, IEEE/CVF International Conference on Computer Vision, pages 2030-2039, 2019, or the teacher student framework described by Zongze Wu et al., *Fine-grained Foreground Retrieval via Teacher-student Learning*, Proceedings of the IEEE/VCF Winter Conference on Applications of Computer Vision, pages 3646-3654, 2021.

As shown in FIG. 2B, foreground object images recommended by both systems appear to match the semantics of the background image of the query 220 (e.g., the foreground object images include trains that match with the train tracks of the background image). The foreground object images recommended by the object recommendation system 106, however, are more compatible in terms of lighting and geometry. For instance, the top recommendation 226 provided by the object recommendation system 106 includes a foreground object image that is geometrically compatible with the background image (e.g., the train is going the same way as the train tracks). In contrast, the top recommendation 228 of the conventional system includes a foreground object image that is geometrically incompatible (e.g., the train is going the wrong direction). Moreover, as indicated by FIG. 2B, the object recommendation system 106 retrieves foreground object images that are compatible with the background image with greater consistency.

As previously indicated, in one or more embodiments, the object recommendation system 106 recommends foreground object images that are compatible with background images in terms of geometry and lighting by building and implementing a geometry-lighting-aware neural network that is sensitive to such image features. Indeed, in one or more embodiments, the object recommendation system 106 builds a geometry-lighting-aware neural network by learning network parameters that facilitate the detection of similarities between background images and foreground objects in terms of geometry and lighting. FIGS. 3A-5B illustrate diagrams for learning network parameters for a geometry-lighting-aware neural network in accordance with one or more embodiments.

Figure 3A:
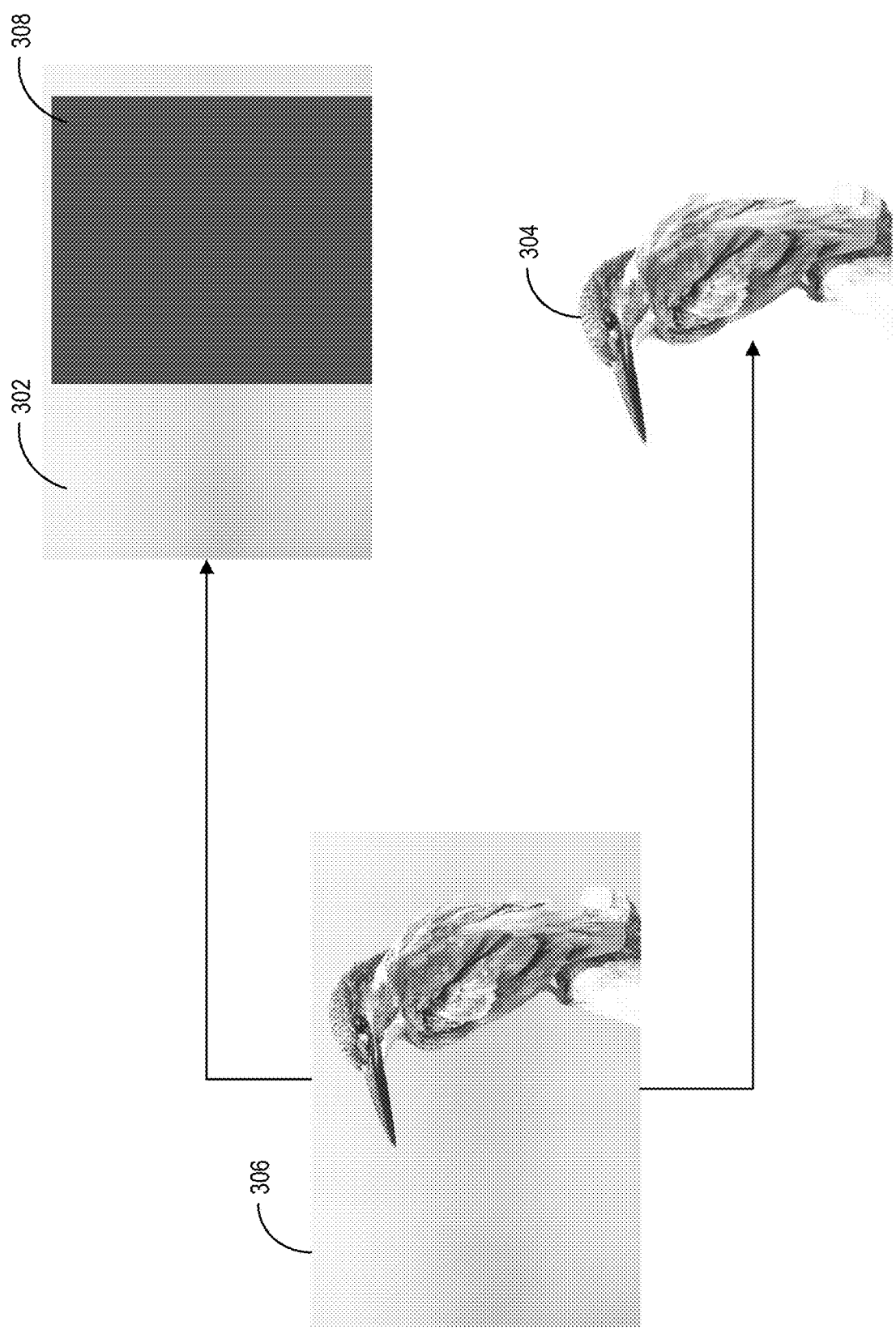
FIG. 3A illustrates generating a background image and a foreground image object in accordance with one or more embodiments.

FIG. 3A illustrates generating a background image and a foreground image object for use in learning network parameters for a geometry-lighting-aware neural network in accordance with one or more embodiments. Indeed, as shown in FIG. 3A, the object recommendation system 106 generates a background image 302 and a foreground object image 304 from a digital image 306. For instance, in one or more embodiments, the object recommendation system 106 generates the foreground object image 304 from the digital image 306 by extracting the foreground object from the digital image 306 utilizing the corresponding segmentation mask.

In one or more embodiments, a segmentation mask includes an identification of pixels in an image that represent an object. In particular, in some embodiments, a segmentation mask includes an image filter useful for partitioning a digital image into separate portions. For example, in some cases, a segmentation mask includes a filter that corresponds to a digital image (e.g., a foreground image) that identifies a portion of the digital image (i.e., pixels of the digital image) belonging to a foreground object and a portion of the digital image belonging to a background. For example, in some implementations, a segmentation map includes a map of the digital image that has an indication for each pixel of whether the pixel is part of an object (e.g., foreground object) or not. In such implementations, the indication can comprise a binary indication (a 1 for pixels belonging to the object and a zero for pixels not belonging to the object). In alternative implementations, the indication can comprise a probability (e.g., a number between 1 and 0) that indicates the likelihood that a pixel belongs to the object. In such implementations, the closer the value is to 1, the more likely the pixel belongs to the foreground or object and vice versa.

As further shown in FIG. 3A, the object recommendation system 106 generates the background image 302 by placing a mask 308 over the portion of the background image 302 that corresponds to the extracted foreground object. In one or more embodiments, a mask generally includes a visual element that covers a corresponding area of pixels or a filter that filters out a corresponding area of pixels. For example, in some implementations, where a segmentation mask targets a component of a digital image for segmentation, a mask more generally blocks or filters out pixels of a digital image. For instance, in some cases, a mask blocks or filters out pixels without consideration of the image component to which they belong. Indeed, as shown in FIG. 3A, the mask 308 covers a rectangular area of the background image 302 and does not outline any particular component of the digital image 306. It should be understood, however, that a mask can more closely follow the contours of an image component in some cases (or use a variety of different shapes).

Figure 3B:
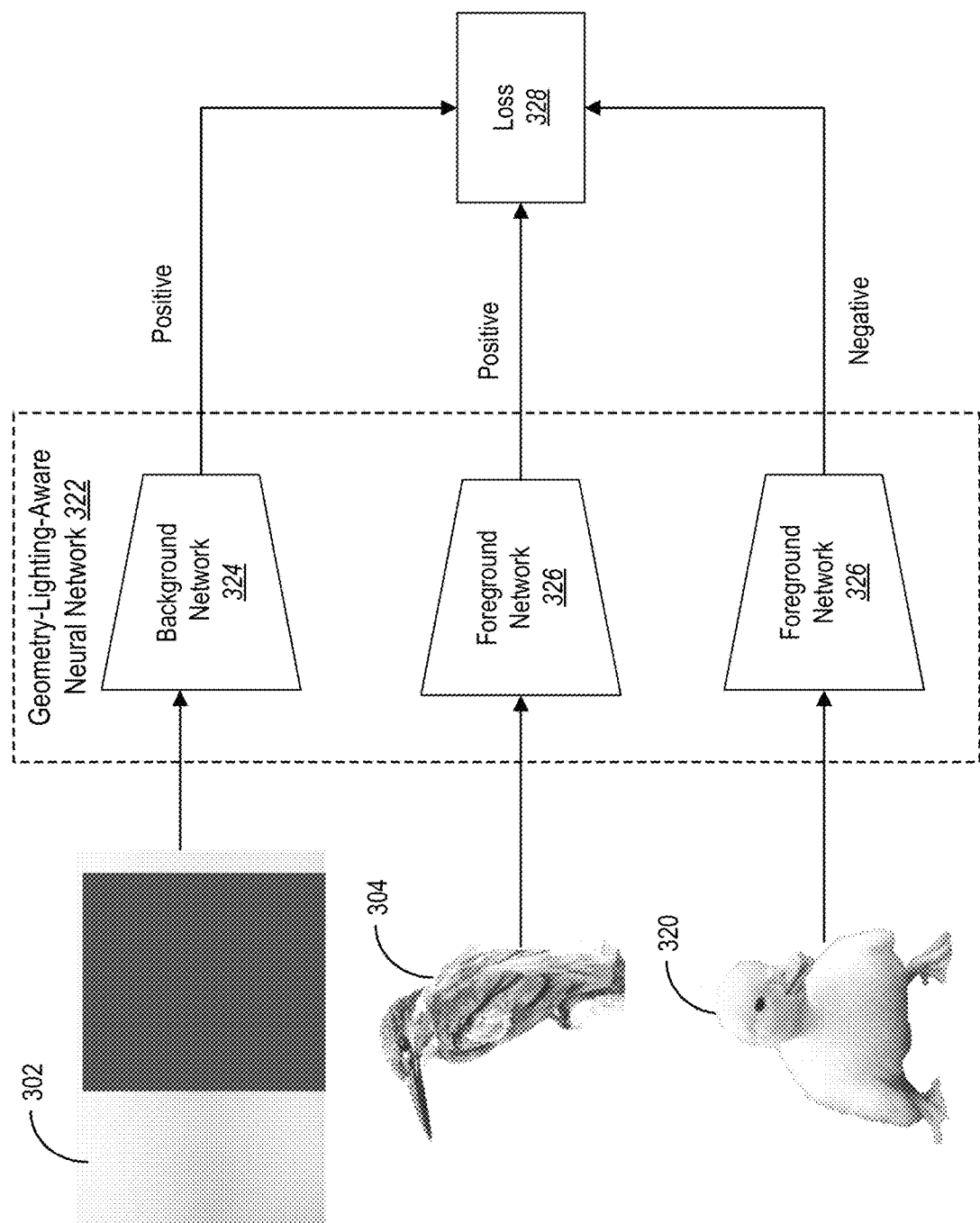
FIG. 3B illustrates utilizing a background image and a foreground object image to update parameters of a geometry-lighting-aware neural network in accordance with one or more embodiments.

FIG. 3B illustrates utilizing a background image and a foreground object image to update parameters of a geometry-lighting-aware neural network in accordance with one or more embodiments. Indeed, as shown in FIG. 3B, the object recommendation system 106 utilizes the background image 302 and the foreground object image 304 as positive samples to one another for learning the network parameters. Further, as illustrated, the object recommendation system 106 obtains an additional foreground object image 320. In particular, FIG. 3B shows, the additional foreground object image 320 does not correspond to the background image 302 or the foreground object image 304. Accordingly, in some implementations, the object recommendation system 106 utilizes the additional foreground object image 320 as a negative sample with respect to the background image 302 and the foreground object image 304.

As shown in FIG. 3B, the object recommendation system 106 utilizes the geometry-lighting-aware neural network 322 to analyze the background image 302, the foreground object image 304, and the additional foreground object image 320. In particular, the object recommendation system 106 utilizes a background network 324 of the geometry-lighting-aware neural network 322 to analyze the background image 302. The object recommendation system 106 further utilizes a foreground network 326 of the geometry-lighting-aware neural network 322 to analyze the foreground object image 304 and the additional foreground object image 320.

In one or more embodiments, a background network includes a neural network or neural network component that analyzes background images. Similarly, in one or more embodiments, a foreground network includes a neural network or neural network component that analyzes foreground object images. In some cases, a background network and/or a foreground network includes a neural network encoder that generates one or more embeddings based on an analysis of a background image or a foreground image, respectively. For example, in some cases, a background network and/or a foreground network include a convolutional neural network (CNN) or CNN component for generating embeddings from background or foreground image features.

In particular, in one or more embodiments, the object recommendation system 106 utilizes the background network 324 and the foreground network 326 to generate predicted embeddings from the background image 302, the foreground object image 304, and the additional foreground object image 320 within a geometry-lighting-sensitive embedding space.

Generally, in one or more embodiments, an embedding space includes a space in which digital data is embedded. In particular, in some embodiments, an embedding space includes a space (e.g., a mathematical or numerical space) in which some representation of digital data (referred to as an embedding) exists. For example, in some implementations, an embedding space includes a vector space where an embedding located therein represents patent and/or latent features of the corresponding digital data. In some cases, an embedding space includes a dimensionality associated with a representation of digital data, including the number of dimensions associated with the representation and/or the types of dimensions. In one or more embodiments, a geometry-lighting-aware embedding space includes an embedding space for embeddings that encode the lighting and/or geometry features of corresponding digital data (e.g., background images or foreground object images).

As shown in FIG. 3B, the object recommendation system 106 compares the outputs of the background network 324 and the foreground network 326 (e.g., the predicted embeddings) to determine a loss 328. For example, the object recommendation system 106 compares a background embedding corresponding to the background image 302 and a foreground embedding corresponding to the foreground object image 304 and determine a measure of loss based on the comparison. In particular, the object recommendation system 106 penalizes (e.g., determines a larger measure of loss) for greater distances between the background embedding and the foreground embedding. In this manner, the object recommendation system 106 teaches the background network 324 and the foreground network 326 to move background embeddings close to matching (e.g., ground truth) foreground objects within the geometry-lighting-sensitive embedding space.

Similarly, the object recommendation system 106 compares a background embedding corresponding to the background image 302 and an additional foreground embedding corresponding to the additional foreground object image 320 and determine a measure of loss based on the comparison. In particular, the object recommendation system 106 penalizes (e.g., determines a larger measure of loss) for smaller distances between the background embedding and the additional foreground embedding. In this manner, the object recommendation system 106 teaches the background network 324 and the foreground network 326 to move background embeddings further away from negative (non-ground-truth) foreground objects within the geometry-lighting-sensitive embedding space.

In one or more embodiments, the object recommendation system 106 determines the loss 328 by determining a triplet loss utilizing the following:

$$\mathcal{L}_t = [S(N_b(I_b), N_f(I_f^-)) - S(N_b(I_b), N_f(I_f^+)) + m]_+ \quad (1)$$

In equation 1, S represents the cosine similarity and $[\cdot]_+$ represents the hinge function. Additionally, $N_b$ and $N_f$ represent the background network 324 and the foreground network 326, respectively. Further, $I_b$ represents a background image (e.g., the background image 302), $I_f^+$ represents a positive foreground object image with respect to the background image (e.g., the foreground object image 304), and $I_f^-$ represents the negative foreground object image with respect to the background image (e.g., the additional foreground object image 320). Also, in equation 1, m represents a margin for triplet loss. Though equation 1 shows use of the cosine similarity, the object recommendation system 106 utilizes various measures of similarity in various embodiments. For instance, in some cases, the object recommendation system 106 utilizes Euclidean distance as the measure of the similarity in determining the loss 328.

In one or more embodiments, the object recommendation system 106 utilizes the loss 328 to update the parameters of the geometry-lighting-aware neural network 322. For instance, in some cases, the object recommendation system 106 updates the parameters to optimize the geometry-lighting-aware neural network 322 by reducing the errors of its outputs. Accordingly, in some cases, the object recommendation system 106 utilizes the loss 328 in accordance with the optimization formulation $\arg\min_{N_b, N_f} \mathcal{L}_t$. For example, in some instances, by updating the parameters, the object recommendation system 106 decreases the distance between positive samples and increases the distance between negative samples within the geometry-lighting-sensitive embedding space. Thus, at inference time, the object recommendation system 106 utilizes the geometry-lighting-aware neural network 322 to identify compatible foreground object images based on the distance between their embeddings and the embedding of the given background image.

Figure 4A:
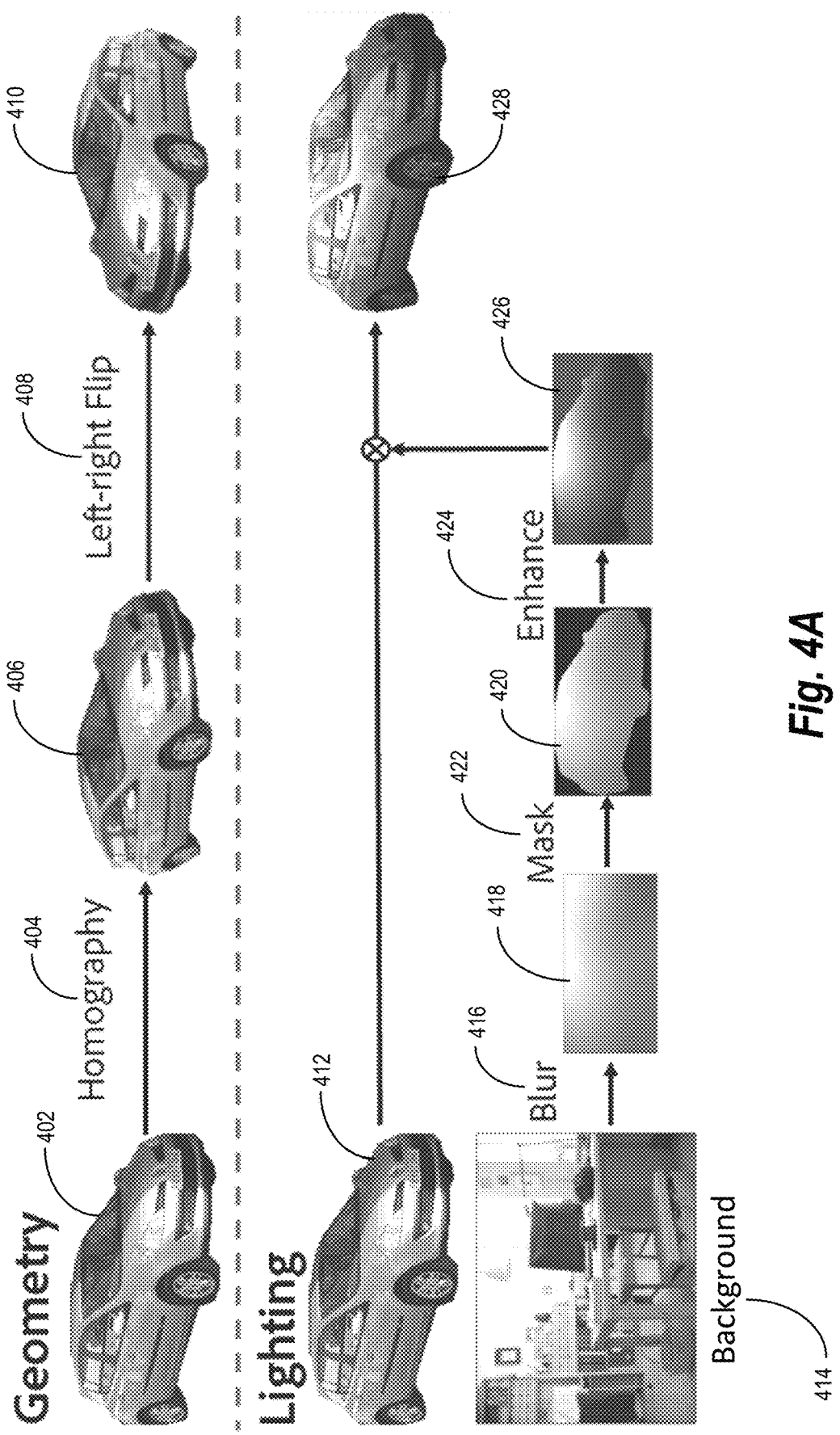
FIG. 4A illustrates generating transformed foreground object images in accordance with one or more embodiments.

As previously mentioned, in some cases, the object recommendation system 106 learns parameters for a geometry-lighting-aware neural network using one or more transformed foreground object images. FIGS. 4A-4B illustrate using transformed foreground object images to learn parameters for a geometry-lighting-aware neural network in accordance with one or more embodiments.

FIG. 4A illustrates generating transformed foreground object images in accordance with one or more embodiments. Indeed, as illustrated by FIG. 4A, the object recommendation system 106 generates a transformed foreground object image utilizing at least one of a geometry transformation or a lighting transformation.

In one or more embodiments, a geometry transformation includes a modification to a foreground object image that changes the geometry of the foreground object image. In particular, in some embodiments, a geometry transformation includes a modification to one or more geometric properties of a foreground object image. For instance, in some implementations, a geometry transformation includes, but is not limited to, a modification to the shape, orientation, perspective, or size of a foreground object image. Indeed, in some cases, a geometry transformation modifies one or more patent geometric features of a foreground object image. In some embodiments, however, a geometry transformation additionally or alternatively modifies one or more latent geometric features.

In one or more embodiments, a lighting transformation includes a modification to a foreground object image that changes the lighting of the foreground object image. In particular, in some embodiments, a lighting transformation includes a modification to one or more lighting properties of a foreground object image. For instance, in some cases, a lighting transformation includes, but is not limited to, a modification to a brightness, hue, or saturation of a foreground object image, a light source of a foreground object image, or shadows or reflections portrayed by the foreground object image. Indeed, in some cases, a lighting transformation modifies one or more patent lighting features of a foreground object image. In some embodiments, however, a lighting transformation additionally or alternatively modifies one or more latent lighting features.

As shown in FIG. 4A, the object recommendation system 106 transforms a foreground object image 402 using a geometry transformation by applying one or more homography transformations 404 to the foreground object image 402. For instance, in some cases, the object recommendation system 106 utilizes one or more random or semi-random homography transformations. Additionally, as shown, the object recommendation system 106 further transforms the modified foreground object image 406 resulting from the one or more homography transformations 404. In particular, the object recommendation system 106 transforms the modified foreground object image 406 utilizing a flipping transformation 408. For instance, in some cases, the object recommendation system 106 utilizes a left-right flip with a fifty percent probability.

Thus, the object recommendation system 106 generates a transformed foreground object image 410. Though FIG. 4A illustrates a particular set of transformations being applied in a particular sequence, it should be understood that the object recommendation system 106 can utilize geometry transformations having various sets of transformations in various sequences in different embodiments.

As further shown in FIG. 4A, the object recommendation system 106 transforms a foreground object image 412 via a lighting transformation using a digital image 414 portraying a background. For instance, in some cases, the object recommendation system 106 randomly or semi-randomly selects the digital image 414 so that the portrayed background is unassociated with with the foreground object image 412.

As illustrated in FIG. 4A, the object recommendation system 106 modifies the digital image 414 using a blur 416. For instance, in some cases, the object recommendation system 106 utilizes a Gaussian blur. In one or more embodiments, the object recommendation system 106 further resizes the modified digital image 418 (e.g., lighting map) resulting from application of the blur 416 to the size of the foreground object image 412. For instance, in some embodiments, the object recommendation system 106 resizes the modified digital image 418 via interpolation.

As further shown in FIG. 4A, the object recommendation system 106 extracts a portion 420 of the modified digital image 418 (e.g., the resized modified digital image) that corresponds to the foreground object image 412. For instance, as indicated, the object recommendation system 106 extracts the portion 420 from the modified digital image 418 utilizing a segmentation mask 422 that corresponds to the foreground object image 412.

Additionally, as shown, the object recommendation system 106 utilizes one or more enhancements 424 to further transform the portion 420 extracted from the modified digital image 418. In some cases, the object recommendation system 106 further transforms the portion 420 by enhancing the variance of the portion 420. For instance, in some implementations, the object recommendation system 106 enhances the variance using an exponential function. Thus, the object recommendation system 106 generates an enhanced lighting map 426 from the digital image 414.

As further shown, the object recommendation system 106 utilizes the enhanced lighting map 426 to generate a transformed foreground object image 428 from the foreground object image 412. For instance, in some embodiments, the object recommendation system 106 multiplies the foreground object image 412 by the enhanced lighting map 426 to generate the transformed foreground object image 428. Thus, in some cases, the object recommendation system 106 utilizes the enhanced lighting map 426 to change the lighting of the foreground object image 412, such as by highlighting some region of the foreground object image 412.

As previously stated with regard to geometry transformations, FIG. 4A illustrates a particular set of transformations being applied in a particular sequence, but the object recommendation system 106 can utilize lighting transformations having various sets of transformations in various sequences in different embodiments.

Further, FIG. 4A illustrates utilizing one of a geometry transformation or a lighting transformation to generate a transformed foreground object image; however, the object recommendation system 106 can utilize both in generating a transformed foreground object image in some implementations.

FIG. 4B illustrates utilizing a transformed foreground object image to update parameters of a geometry-lighting-aware neural network in accordance with one or more embodiments. Indeed, as shown in FIG. 4B, the object recommendation system 106 utilizes a background image 432 and a foreground object image 434 as positive samples to one another for learning network parameters. Further, as illustrated, the object recommendation system 106 utilizes one of the transformed foreground object images 436a-436b as a negative sample with respect to the background image 432 and the foreground object image 434.

As shown in FIG. 4B, the object recommendation system 106 utilizes the geometry-lighting-aware neural network 438 to analyze the background image 432, the foreground object image 434, and one of the transformed foreground object images 436a-436b. In particular, the object recommendation system 106 utilizes the background network 440 of the geometry-lighting-aware neural network 438 to analyze the background image 432. The object recommendation system 106 further utilizes the foreground network 442 of the geometry-lighting-aware neural network 438 to analyze the foreground object image 434 and one of the transformed foreground object images 436a-436b.

In particular, in one or more embodiments, the object recommendation system 106 utilizes the background network 440 and the foreground network 442 to generate predicted embeddings from the background image 432, the foreground object image 434, and one of the transformed foreground object images 436a-436b within a geometry-lighting-sensitive embedding space. As shown in FIG. 4B, the object recommendation system 106 compares the predicted embeddings (e.g., the outputs of the background network 440 and the foreground network 442) to determine a loss 444. In one or more embodiments, the object recommendation system 106 determines the loss 444 by determining a triplet loss utilizing the following:

$$\mathcal{L}_c = [S(N_b(I_b), N_f(I_f)) - S(N_b(I_b), N_f(I_f^+)) + m]_+ \quad (2)$$

In equation 2, $I_f^t$ represents a transformed foreground object image (e.g., one of the transformed foreground object images 436a-436b). Though equation 2 (like equation 1) shows use of the cosine similarity, the object recommendation system 106 utilizes various measures of similarity in various embodiments. For instance, in some cases, the object recommendation system 106 utilizes Euclidean distance as the measure of the similarity in determining the loss 444.

In one or more embodiments, the object recommendation system 106 utilizes the loss 444 to update the parameters of the geometry-lighting-aware neural network 438. For instance, in some cases, the object recommendation system 106 updates the parameters to optimize the geometry-lighting-aware neural network 438 by reducing the errors of its outputs. For example, in some instances, by updating the parameters, the object recommendation system 106 decreases the distance between positive samples and increases the distance between negative samples within the geometry-lighting-sensitive embedding space even where those negative samples merely differ in terms of lighting and/or geometry. Thus, at inference time, the object recommendation system 106 utilizes the geometry-lighting-aware neural network 438 to identify compatible foreground object images based on the distance between their embeddings and the embedding of the given background image.

By updating parameters of the geometry-lighting-aware neural network 438 utilizing transformed foreground object images, the object recommendation system 106 improves the accuracy with which the geometry-lighting-aware neural network 438 identifies foreground object images that are compatible with background images for image composition. In particular, the object recommendation system 106 enables the geometry-lighting-aware neural network 438 to identify foreground object images that are similar to background images in terms of lighting and/or geometry (as well as semantics).

In some implementations, the object recommendation system 106 combines the triplet loss of equation 1 and the triplet loss of equation 2 to determine a loss (e.g., a combined loss) for the geometry-lighting-aware neural network 438. For instance, in some implementations, the object recommendation system 106 generates predicted embeddings for a background image, a foreground object image corresponding to the background image, a transformed foreground object image generated from the foreground object image, and an additional foreground object image. The object recommendation system 106 further determines the triplet loss of equation 1 and the triplet loss of equation 2 utilizing the respective predicted embeddings and updates the parameters of the geometry-lighting-aware neural network 438 utilizing a combination of the triplet losses. For instance, in some cases, the object recommendation system 106 combines the triplet loss of equation 1 and the triplet loss of equation 2 as follows:

$$\mathcal{L} = \mathcal{L}_t + \mathcal{L}_c \quad (3)$$

Figure 5A:
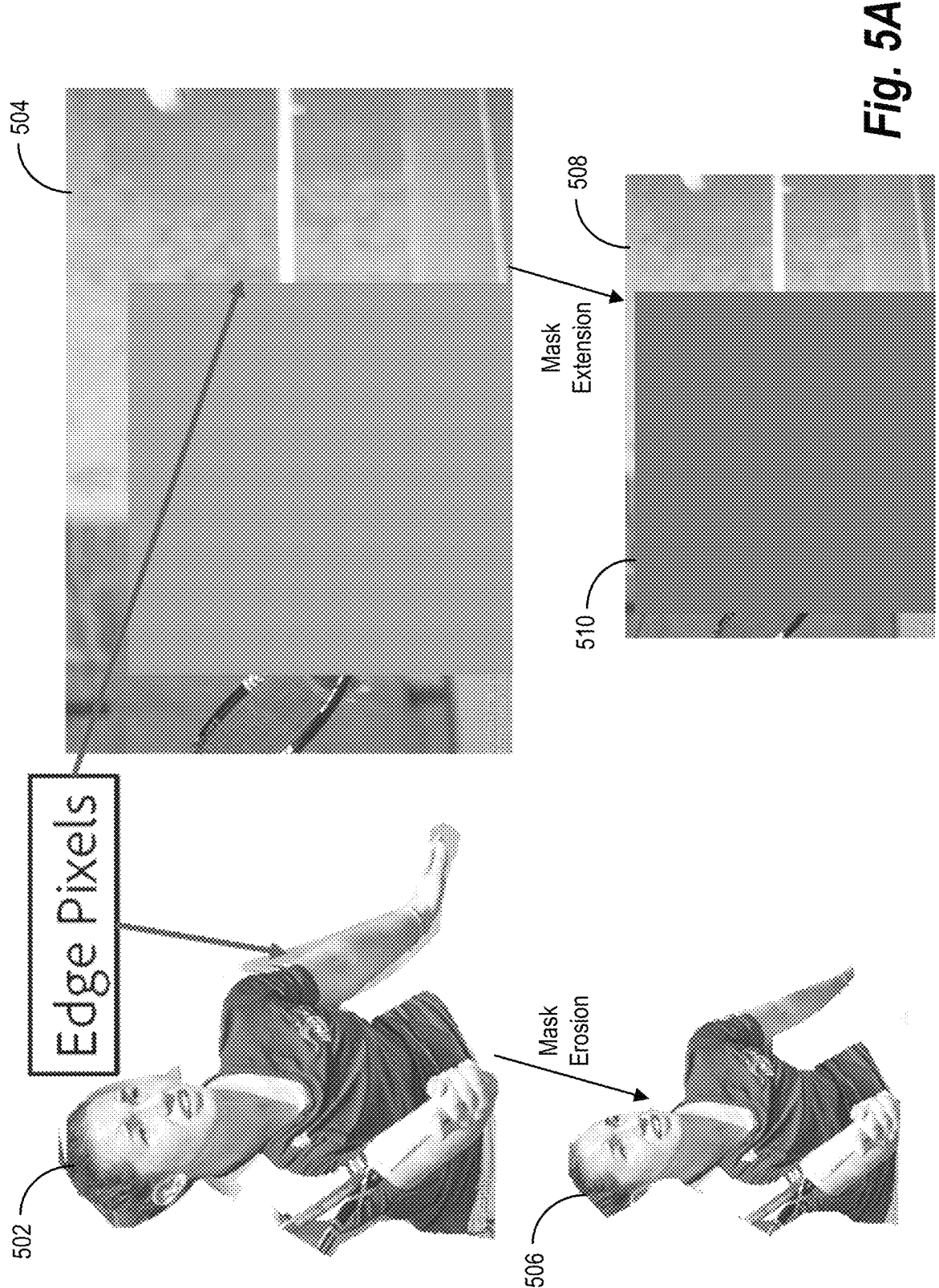
FIG. 5A illustrates a diagram for generating a foreground object image and a background image utilizing augmented masks in accordance with one or more embodiments.
Figure 5B:
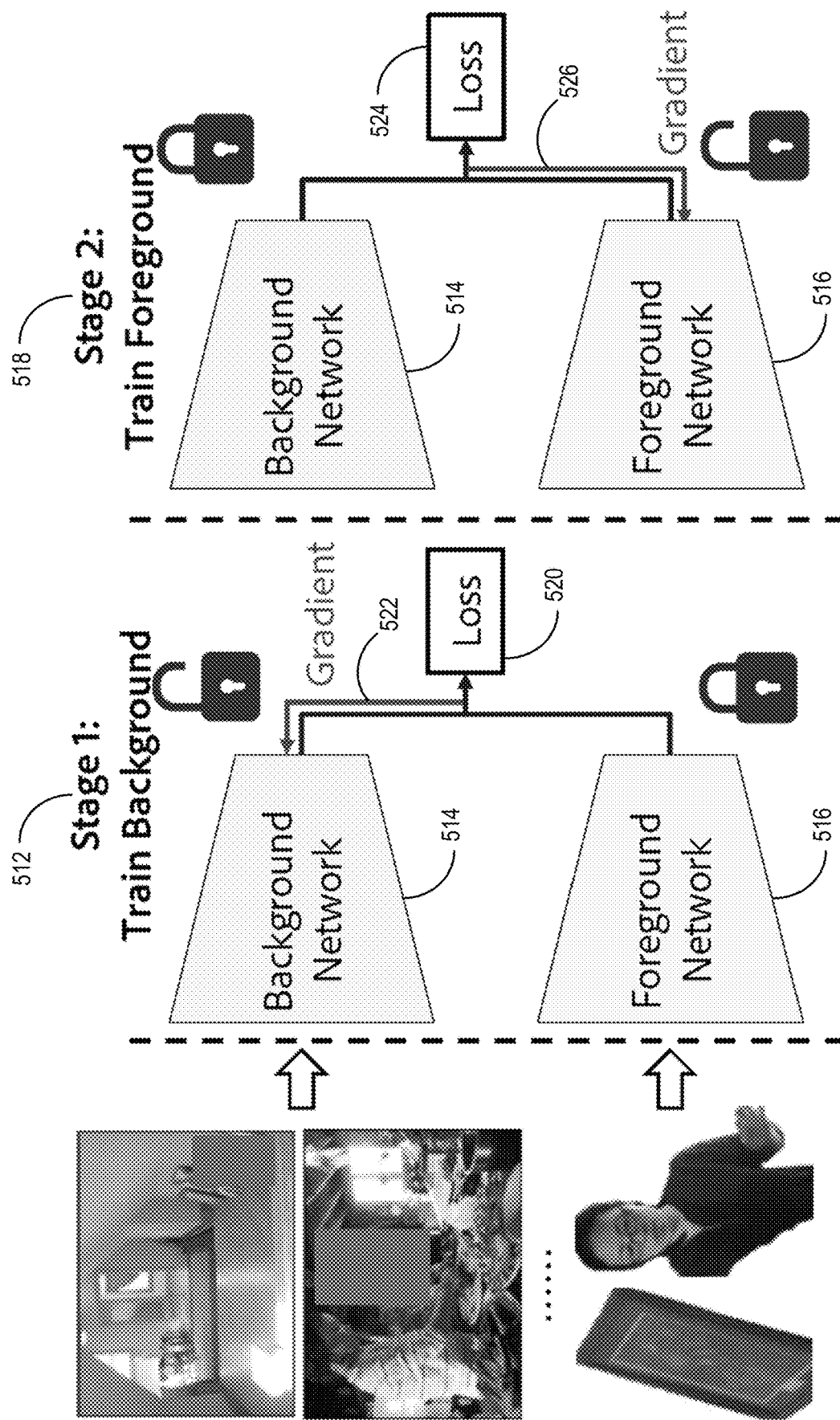
FIG. 5B illustrates utilizing an alternating update process to update parameters of a geometry-lighting-aware neural network in accordance with one or more embodiments.

In some implementations, the object recommendation system 106 employs additional methods for building a geometry-lighting-aware neural network. Indeed, in some cases, the object recommendation system 106 implements one or more additional methods during that facilitate the learning of network parameters that improve operation at inference time. FIGS. 5A-5C illustrate diagrams associated with one or more additional methods for building a geometry-lighting-aware neural network in accordance with one or more embodiments.

In particular, FIG. 5A illustrates a diagram for generating a foreground object image and a background image utilizing augmented masks in accordance with one or more embodiments. For example, in one or more embodiments, the object recommendation system 106 utilizes modified masks to improve the ability of a geometry-lighting-aware neural network in determining similarities between background images and foreground object images. For instance, in some cases where an imperfect segmentation mask is used, some pixels of the resulting foreground object image are background pixels, which are likely to be the same as other background pixels. Indeed, as shown in FIG. 5A, the foreground object image 502 includes a portion of pixels from the background (e.g., at the edge of the portrayed foreground object) that are similar to pixels in the background image 504. The inclusion of background pixels within foreground object images can provide a strong cue of similarity. The use of foreground object images that include background pixels potentially results in a model that learns to detect similarities based on matching edge pixels rather than detect similarities based on other features, such as semantics, lighting, and geometry.

Accordingly, as shown in FIG. 5A, the object recommendation system 106 generates a foreground object image 506 via mask erosion. In particular, in some embodiments, the object recommendation system 106 extracts the foreground object image 506 from a digital image as described above with reference to FIG. 3A but using an eroded segmentation mask.

In one or more embodiments, an eroded segmentation mask includes a segmentation mask that has been modified so that the number of pixels of a digital image that are attributed to a foreground object is reduced. Indeed, in some embodiments, an eroded segmentation mask includes a segmentation mask that has been modified so that the resulting foreground object image includes less pixels than would be included from using the unmodified segmentation mask. For example, in one or more embodiments, the object recommendation system 106 generates an eroded segmentation mask by randomly or semi-randomly eroding a number of pixels of the segmentation mask at the edge between the foreground and the background (e.g., changing the affiliation of the pixels from the foreground object to the background).

Accordingly, in some cases using an eroded segmentation mask results in a foreground object image that includes relatively fewer background edge pixels. Thus, as shown in FIG. 5A, the foreground object image 506 generated via a corresponding eroded segmentation mask includes less background pixels when compared to the foreground object image 502. In some implementations, use of an eroded segmentation mask results in a foreground object image that includes relatively fewer foreground edge pixels as well. Indeed, in some cases, by utilizing an eroded segmentation mask, the object recommendation system 106 ensures that the similarity cue provided by background pixels is random or semi-random.

Further, as shown in FIG. 5A, the object recommendation system 106 generates a background image 508 using an extended mask 510. In particular, in some embodiments, the object recommendation system 106 generates the background image 508 from a digital image as described above with reference to FIG. 3A but using an extended mask. In one or more embodiments, an extended mask includes a mask that has been enlarged. Indeed, in some embodiments, an extended mask includes a mask that has been increased in size to cover or filter out a larger area of pixels. For instance, in some cases, the object recommendation system 106 generates an extended mask by randomly or semi-randomly extending a corresponding mask by a number of pixels in at least one direction.

By utilizing foreground object images extracted from digital images using eroded segmentation masks and background images generated from the digital images using extended masks, the object recommendation system 106 improves the parameter-learning for the geometry-lighting-aware neural network. Indeed, the object recommendation system 106 avoids learning network parameters that rely on edge pixels as cues for determining similarities. Thus, at inference time, the geometry-lighting-aware neural network can more accurately identify foreground object images that are compatible in terms of other features, such as semantics, geometry, and/or lighting.

FIG. 5B illustrates utilizing an alternating update process to update parameters of a geometry-lighting-aware neural network in accordance with one or more embodiments. Indeed, as shown in FIG. 5B, the object recommendation system 106 updates the parameters of a geometry-lighting-aware neural network in two stages. In particular, as shown, in a first stage 512, the object recommendation system 106 updates the parameters of the background network 514 while maintaining the parameters of the foreground network 516 (e.g., preventing the parameters of the foreground network 516 from changing). Further, in a second stage 518, the object recommendation system 106 updates the parameters of the foreground network 516 while maintaining the parameters of the background network 514. In one or more embodiments, the object recommendation system 106 performs the first stage 512 and/or the second stage 518 utilizing multiple iterations.

To illustrate, in one or more embodiments, in the first stage 512, the object recommendation system 106 utilizes the background network 514 and the foreground network 516 of the geometry-lighting-aware neural network to generate predicted embeddings from a background image, a foreground object image, a transformed foreground object image (as a negative sample), and/or an additional foreground object image (as a negative sample). The object recommendation system 106 further determines a loss 520 from the predicted embeddings, such as by using the triplet loss of equation 1, the triplet loss of equation 2, or the combined loss of equation 3. The object recommendation system 106 back propagates the loss 520 (as shown by the line 522) and updates the parameters of the background network 514 accordingly while maintaining the parameters of the foreground network 516. As mentioned, in some implementations, the object recommendation system 106 repeats the process through various iterations using further positive and negative samples.

Similarly, in one or more embodiments, the object recommendation system 106 updates the foreground network 516 of the geometry-lighting-aware neural network in the second stage 518. The object recommendation system 106 can utilize the same (or different) positive and negative samples as used in the first stage 512 or use different samples. Like with the first stage 512, the object recommendation system 106 utilizes the background network 514 and the foreground network 516 to generate predicted embeddings, determines a loss 524 from the predicted embeddings, and back propagates the loss 524 (as shown by the line 526) to update the parameters of the foreground network 516. As mentioned, in some implementations, the object recommendation system 106 repeats the process through various iterations using further positive and negative samples.

In one or more embodiments, the object recommendation system 106 performs each of the first stage 512 and the second stage 518 multiple times. In some cases, however, the object recommendation system 106 performs each of the first stage 512 and the second stage 518 once.

In one or more embodiments, by modifying the parameters of the foreground network 516, the object recommendation system 106 enables the foreground network 516 to flexibly learn from various data samples, which is not available under many conventional systems that utilize frozen, pre-trained parameters for the foreground network. Further, by learning parameters for the background network 514 and the foreground network 516 in separate stages, the object recommendation system 106 prevents the embedded features of the geometry-lighting-aware neural network from drifting significantly, which can be seen from training these components together. In particular, the object recommendation system 106 improves the accuracy of the geometry-lighting-aware neural network by enabling it to maintain semantic features while allowing the foreground network 516 to flexibly learn from the data for other features (e.g., lighting and geometry), further improving performance at inference time.

Indeed, FIG. 5C illustrates a table reflecting experimental results regarding the effectiveness of the object recommendation system 106 in accordance with one or more embodiments. In particular, the table of FIG. 5C compares the performance of various embodiments of the geometry-lighting-aware neural network that have undergone different training strategies. The table of FIG. 5C utilizes the mean average precision (mAP) metric in comparing the performance.

In the table, "Fixed Foreground" refers to an embodiment of the geometry-lighting-aware neural network where the foreground network was pre-trained and its parameters were frozen during the learning process. "Direct Training" refers to an embodiment of the geometry-lighting-aware neural network where the parameters of the foreground network and background network were learned simultaneously. "Aug" refers to an embodiment of the geometry-lighting-aware neural network where the parameters were learned using one or more augmented masks, such as eroded segmentation masks for the foreground object images and/or extended masks for the background images. "Aug+Alternating" refers to an embodiment of the geometry-lighting-aware neural network that learned parameters via augmented masks and an alternating update strategy. The table of FIG. 5C compares the performance of the embodiments on the compositing-aware image search (CAIS) database described by Hengshuang Zhao et al., *Compositing-aware Image Search*, Proceedings of the European Conference on Computer Visions (ECCV), pages, 502-516, 2018.

As shown by the table of FIG. 5C, the "Aug+Alternating" embodiment of the geometry-lighting-aware neural network greatly outperforms the other embodiments. Indeed, as shown, the "Direct Training" and "Aug" embodiments perform more poorly when compared to the "Fixed Foreground" implementation that mimics the parameter learning of many conventional systems. By further including the alternating update process, however, the geometry-lighting-aware neural network improves upon the conventional approach.

Thus, the object recommendation system 106 builds a geometry-lighting-aware neural network by learning network parameters via one or more of the processes described above with reference to FIGS. 3A-5C. In one or more embodiments, at inference time, the object recommendation system 106 utilizes the geometry-lighting-aware neural network having the learned network parameters to identify foreground object images that are compatible with background images in terms of semantics, lighting, and/or geometry. For instance, in some implementations, the object recommendation system 106 utilizes the geometry-lighting-aware neural network to generate an embedding for a given background image within the learned geometry-lighting-sensitive embedding space and identifies one or more compatible foreground object images based on the embedding. For instance, in some cases, the object recommendation system 106 determines similarity scores (e.g., using cosine similarity, Euclidean distance, or some other measure of proximity within the embedding space) between the embedding for the background image and embeddings for background object images. The object recommendation system 106 further selects one or more foreground object images based on the similarity scores, such as by selecting the one or more foreground object images corresponding to the highest similarity score(s). Thus, in some implementations, the object recommendation system 106 recommends the one or more selected foreground object images for use in generating a composite image with the given background image.

As indicated above, in some cases, the object recommendation system 106 receives a query bounding box with a background image for guiding the object search and retrieval. In some cases, the object recommendation system 106 utilizes the geometry-aware-lighting neural network with the learned parameters to generate an embedding for the portion of the background image that corresponds to the query bounding box. Thus, the object recommendation system 106 utilizes the geometry-lighting-aware neural network in identifying and recommending foreground object images that are specifically compatible with that portion of the background image. Indeed, in some cases, the object recommendation system 106 utilizes the size and/or location of the query bounding box as parameters for object retrieval.

In one or more embodiments, however, the object recommendation system 106 receives a background image without receiving a query bounding box. In some cases, the object recommendation system 106 still operates to identify and recommend foreground object images that are compatible with the background image in terms of semantics, lighting, and/or geometry. For example, in some cases, the object recommendation system 106 determines a location and/or scale for a foreground object image within the background image for use in generating a composite image. Accordingly, in some implementations, the object recommendation system 106 recommends a foreground object image by further recommending a location and/or a scale for the foreground object image within the given background image. FIG. 6A illustrates determining a location and/or scale for a foreground object image within a background image in accordance with one or more embodiments.

As shown in FIG. 6A, the object recommendation system 106 determines a recommended location for a foreground object image within a background image 602 by determining a plurality of candidate locations 604. In particular, the object recommendation system 106 generates a plurality of bounding boxes for a plurality of locations within the background image 602. In one or more embodiments, the object recommendation system 106 generates the plurality of bounding boxes using one or more aspect ratios. In some cases, the object recommendation system 106 generates the plurality of bounding boxes using one or more scales.

In one or more embodiments, the object recommendation system 106 retrieves foreground image objects based on the plurality of bounding boxes. For instance, in some cases, the object recommendation system 106 retrieves one or more foreground object images for a bounding box upon determining that the foreground object image(s) is compatible with a portion of the background image 602 associated with the bounding box. Indeed, in some implementations, the object recommendation system 106 utilizes a neural network to generate an embedding for the portion of the background image 602 associated with the bounding box. Further, the object recommendation system 106 determines similarity scores (e.g., using cosine similarity, Euclidean distance, or some other measure of proximity within the embedding space) for the embedding and the embeddings of foreground object images. Accordingly, the object recommendation system 106 selects the one or more foreground object images based on the similarity scores (e.g., by selecting the one or more foreground object images having the highest similarity scores). In one or more embodiments, the object recommendation system 106 utilizes a geometry-lighting-aware neural network to generate the embeddings within a geometry-lighting-sensitive embedding space to facilitate the retrieval of foreground object images that are compatible in terms of geometry and/or lighting (as well as semantics).

In one or more embodiments, the object recommendation system 106 determines a ranking for the retrieved foreground object images based on their similarity scores. Further, the object recommendation system 106 selects a foreground object image based on the ranking, such as by selecting the foreground object image having the highest similarity score. In some embodiments, the object recommendation system 106 further associates the selected foreground object image with a bounding box, such as by generating a bounding box having the same aspect ratio of the foreground object image (or using the bounding box for which the foreground object image was retrieved). In some implementations, the object recommendation system 106 further generates the bounding box for the foreground object image to include a scale that is a fraction of the scale of the background image 602.

As shown in FIG. 6A, the object recommendation system 106 further generates a grid 606 of locations (e.g., a k×k grid) for the background image 602 using the bounding box associated with the selected foreground object image. For instance, in some embodiments, the object recommendation system 106 generates the grid 606 of locations to cover the background image 602 in a sliding window manner. In one or more embodiments, the object recommendation system 106 determines similarity scores for the selected foreground object image and the locations for the background image 602 from the grid 606. To illustrate, in some embodiments, the object recommendation system 106 utilizes a neural network to generate an embedding for each of the locations of the background image 602 from the grid 606 and determines a similarity score for the location based on its embedding and the embedding for the foreground object image. In one or more embodiments, the object recommendation system 106 utilizes a geometry-lighting-aware neural network to generate the embeddings so that the similarity scores are determined in terms of lighting and/or geometry as well as semantics.

Accordingly, the object recommendation system 106 determines a location for the selected foreground object image within the background image 602 using the similarity scores (e.g., by selecting the location associated with the highest similarity score). In one or more embodiments, the object recommendation system 106 generates a recommendation that recommends using the foreground object image at the determined location within the background image 602 for generating a composite image.

As shown in FIG. 6A, the object recommendation system 106 further generates a location heatmap 608 using the locations of the grid 606. In particular, the object recommendation system 106 generates the location heatmap 608 using the similarity scores determined for the locations of the grid 606.

In one or more embodiments, a location heatmap includes presentation of location compatibility. In particular, in some embodiments, a location heatmap includes a heatmap that indicates the compatibility of a foreground object image with various locations within a background image. For instance, in some cases, a location heatmap includes a heatmap having a range of values (e.g., color values) where a particular value from the range indicates a degree of compatibility between a location within a background image and a foreground object image. In one or more embodiments, a location heatmap provides indications for the entirety of the background image. In other words, a location heatmap provides an indication of compatibility (e.g., a value) for each location of a background image.

In one or more embodiments, the object recommendation system 106 generates the location heatmap 608 by interpolating the similarity scores determined for the locations of the grid 606 across the background image 602 (e.g., via bilinear interpolation). In some embodiments, the object recommendation system 106 further normalizes the interpolated values. Thus, in some cases, the object recommendation system 106 utilizes the similarity scores for those locations to determine compatibility of a selected foreground object image with all locations of the background image 602. In one or more embodiments, dimensions of the grid 606 are configurable. In particular, in some instances, the object recommendation system 106 changes the dimensions of the grid 606 (e.g., the stride of moving the foreground object image across the background image 602) in response to input from a client device, allowing for a change to the level of refinement with which the object recommendation system 106 determines the recommendation location.

In one or more embodiments, the object recommendation system 106 provides the location heatmap 608 as part of the recommendation. For instance, in some embodiments, the object recommendation system 106 provides the location heatmap 608 for display on a client device as a visualization of the location of the background image 602 that is recommended for the foreground object image. Further, in some cases, by providing the location heatmap 608, the object recommendation system 106 also shows other compatible or non-compatible locations for the foreground object image.

As further shown in FIG. 6A, the object recommendation system 106 determines a scale for the selected foreground object image within the background image 602 by determining a plurality of candidate scales 610. For instance, in one or more embodiments, the object recommendation system 106 applies a range of scales on the bounding box associated with the selected foreground object image at the determined location and selects a scale accordingly. In one or more embodiments, the object recommendation system 106 provides the scale as part of the recommendation. For instance, as will be shown below, in some implementations, the object recommendation system 106 generates a composite image using the selected foreground object image with the recommended scale and at the recommended location within the background image 602 and provides the composite image as part of the recommendation.

In some implementations, the object recommendation system 106 determines a recommended location and a recommended scale for a foreground object image utilizing one of various other methods than described above. For instance, in some implementations, the object recommendation system 106 recommends a global optimum scale-location pair for the foreground object image. To illustrate, in one or more embodiments, the object recommendation system 106 generates a plurality of bounding boxes with different scales at a plurality of locations of the background image. For instance, in some implementations, the object recommendation system 106 generates a plurality of grids for the background image where each grid is associated with a different scale than the other grids. In some cases, the object recommendation system 106 analyzes the plurality of bounding boxes with the various scales at the different locations to determine a bounding box associated with a global optimum scale-location pair. For instance, the object recommendation system can determine that a bounding box is associated with a global optimum scale-location pair if it provides the highest similarity score when compared to the other bounding boxes. Thus, in some cases, the object recommendation system recommends utilizing the foreground object image with the scale and location of the bounding box associated with the global optimum scale-location pair.

Figure 6B:
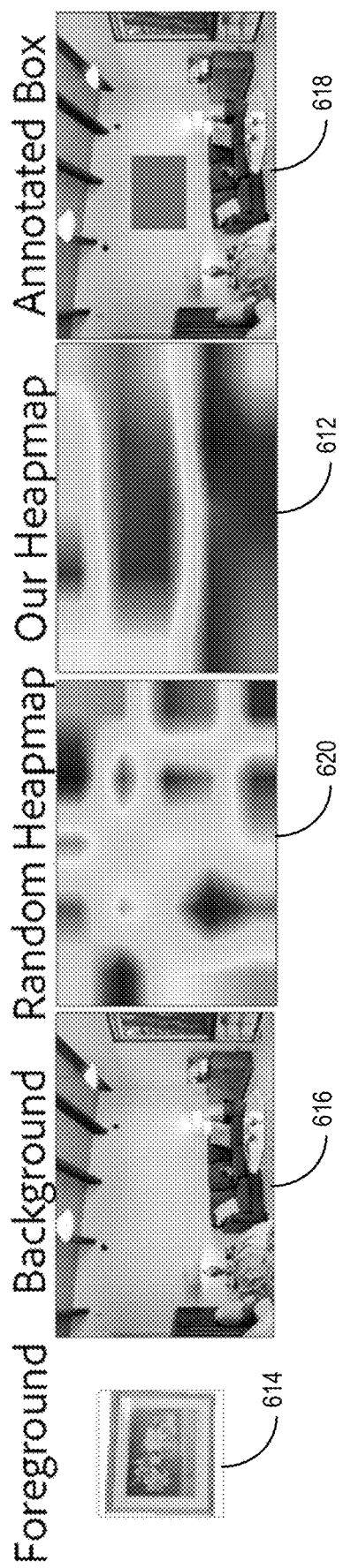
FIG. 6B illustrates graphical representations reflecting experimental results regarding the effectiveness of the object recommendation system in determining a recommended location for a foreground object image in accordance with one or more embodiments.

FIG. 6B illustrates graphical representations reflecting experimental results regarding the effectiveness of the object recommendation system 106 in determining a recommended location for a foreground object image in accordance with one or more embodiments. Indeed, FIG. 6B illustrates a location heatmap 612 generated by the object recommendation system 106 indicating a recommended location for a foreground object image 614 within a background image 616. FIG. 6B compares the location heatmap 612 generated by the object recommendation system 106 with a ground truth annotated location 618 and another heatmap 620 generated using a randomized strategy. As shown in FIG. 6B, the location heatmap 612 generated by the object recommendation system 106 more accurately recommends a compatible location for the foreground object image 614 when compared to the heatmap 620 of produced by the randomized strategy.

Figure 6C:
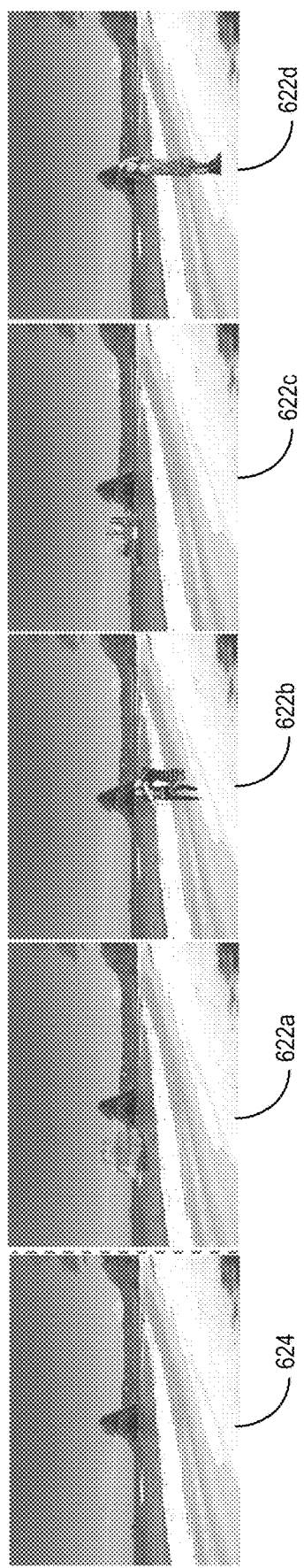
FIG. 6C illustrates composite images generated utilizing recommended locations and/or recommended scales for foreground object images within a background image in accordance with one or more embodiments.

FIG. 6C illustrates composite images 622*a*-622*d* generated utilizing recommended locations and/or recommended scales for foreground object images within a background image 624 in accordance with one or more embodiments. In particular, the composite images 622*a*-622*c* include the top foreground object images retrieved by the object recommendation system 106. As can be seen from FIG. 6C, the object recommendation system 106 can recommend foreground object images and corresponding locations and sizes that are compatible with the background image 624. Accordingly, the composite images 622*a*-622*d* generated using these recommendations have a realistic appearance.

By recommending locations and/or scales for foreground object images within a background image, the object recommendation system 106 operates more flexibly when compared to conventional systems. Indeed, where many conventional systems require a query bounding box to be provided in order to guide the object search and retrieval process, the object recommendation system 106 can flexibly identify compatible foreground object images when a query bounding box is not provided. Further, the object recommendation system 106 can flexibly determine a location and/or scale for the foreground object image that optimizes the compatibility of the foreground object image with the background image so that the resulting composite image has a realistic appearance. Additionally, by recommending locations and/or scales, the object recommendation system 106 operates more efficiently, as it reduces the amount of user input required in order to generate a recommendation.

As mentioned above, in some embodiments, the object recommendation system 106 implements a graphical user interface to facilitate object retrieval and recommendation. In particular, in some cases, the object recommendation system 106 utilizes the graphical user interface to implement a workflow for providing foreground object image recommendations and composite images. FIGS. 7A-7J illustrate a graphical user interface used by the object recommendation system 106 for implementing a workflow for providing foreground object image recommendations and composite images in accordance with one or more embodiments.

Figure 7A:
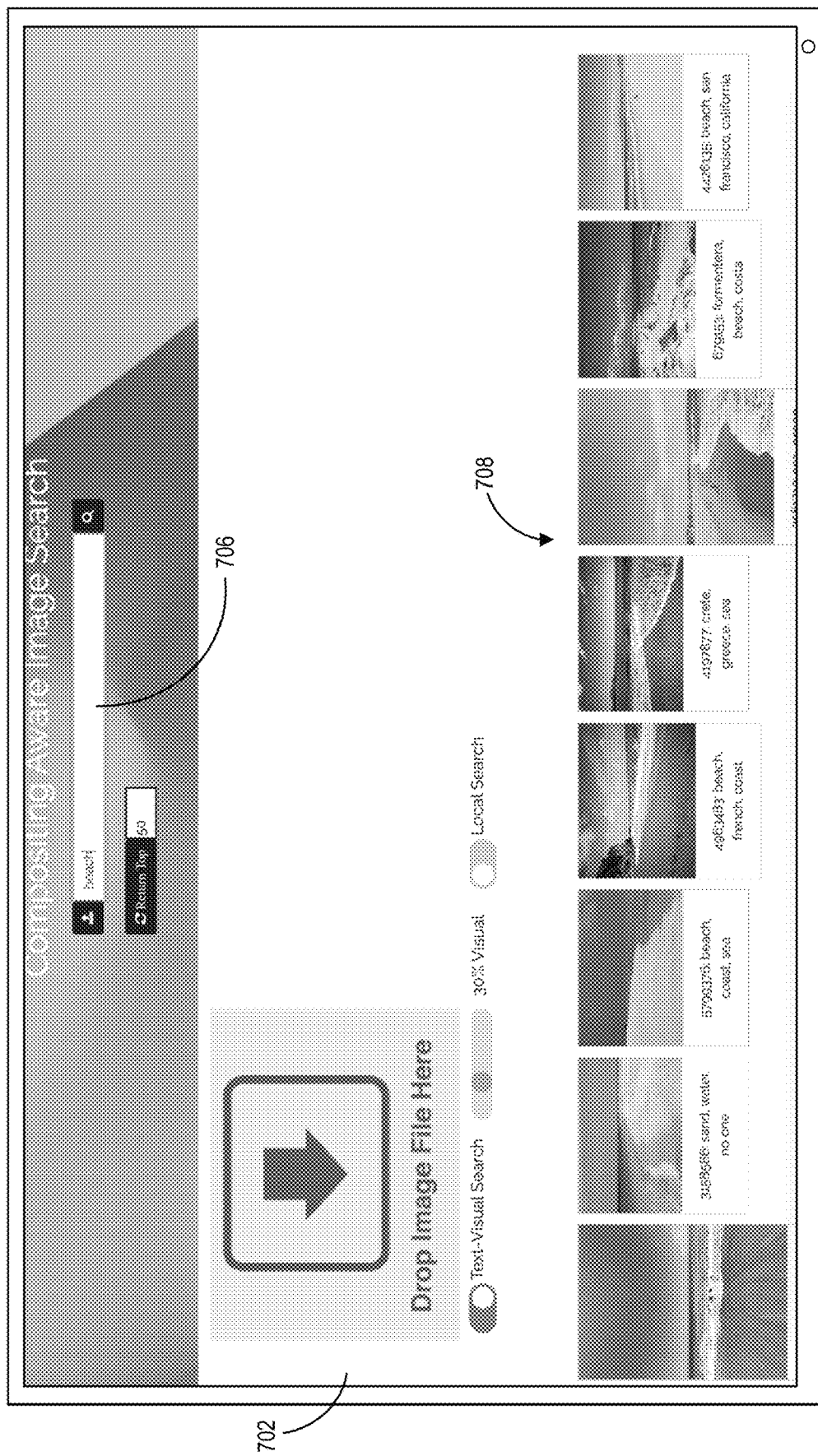
FIGS. 7A-7J illustrate a graphical user interface used by the object recommendation system for implementing a workflow for providing foreground object image recommendations and composite images in accordance with one or more embodiments.

For example, as shown in FIG. 7A, the object recommendation system 106 provides a graphical user interface 702 for display on a client device 704. As further, shown, the object recommendation system 106 provides a search field 706 for display within the graphical user interface 702. In one or more embodiments, the object recommendation system 106 provides the search field 706 to receive user input in searching for a background image. Indeed, as shown in FIG. 7A, in response to receiving user input via the search field 706 (e.g., a text query), the object recommendation system 106 retrieves and provides a plurality of digital images for display within a search results area 708 the graphical user interface 702 as candidate background images.

In one or more embodiments, the object recommendation system 106 searches for and retrieves the plurality of digital images via a web search. In some cases, the object recommendation system 106 searches local storage of the client device 704 or a remote storage device. Further, in some embodiments, rather than presenting the search field 706, the object recommendation system 106 presents one or more folders or links to the plurality of digital images or provides interactive options for selecting various parameters for retrieving background images.

Figure 7B:
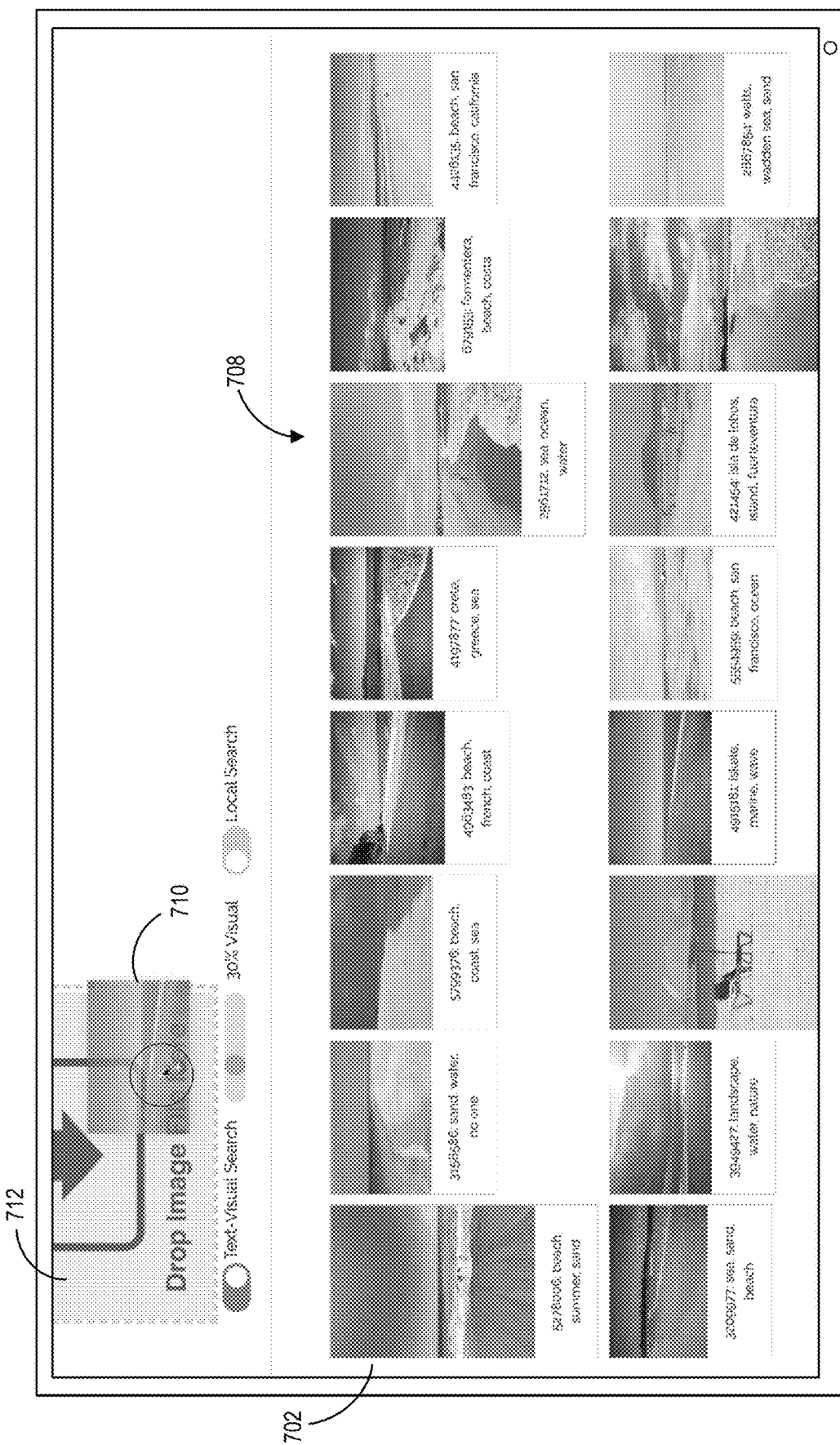

As shown in FIG. 7B, the object recommendation system 106 receives a background image 710 via the graphical user interface 702. In particular, the object recommendation system 106 receives an indication that the background image 710 has been selected for use in generating a composite image via a drag-and-drop of the background image 710 from the search results area 708 to a target drop area 712 of the graphical user interface 702. In some cases, the object recommendation system 106 receives the background image 710 via other selection methods, such as a click or tap of the background image 710 or a hovering of a cursor over the background image 710 within the graphical user interface 702.

Figure 7C:
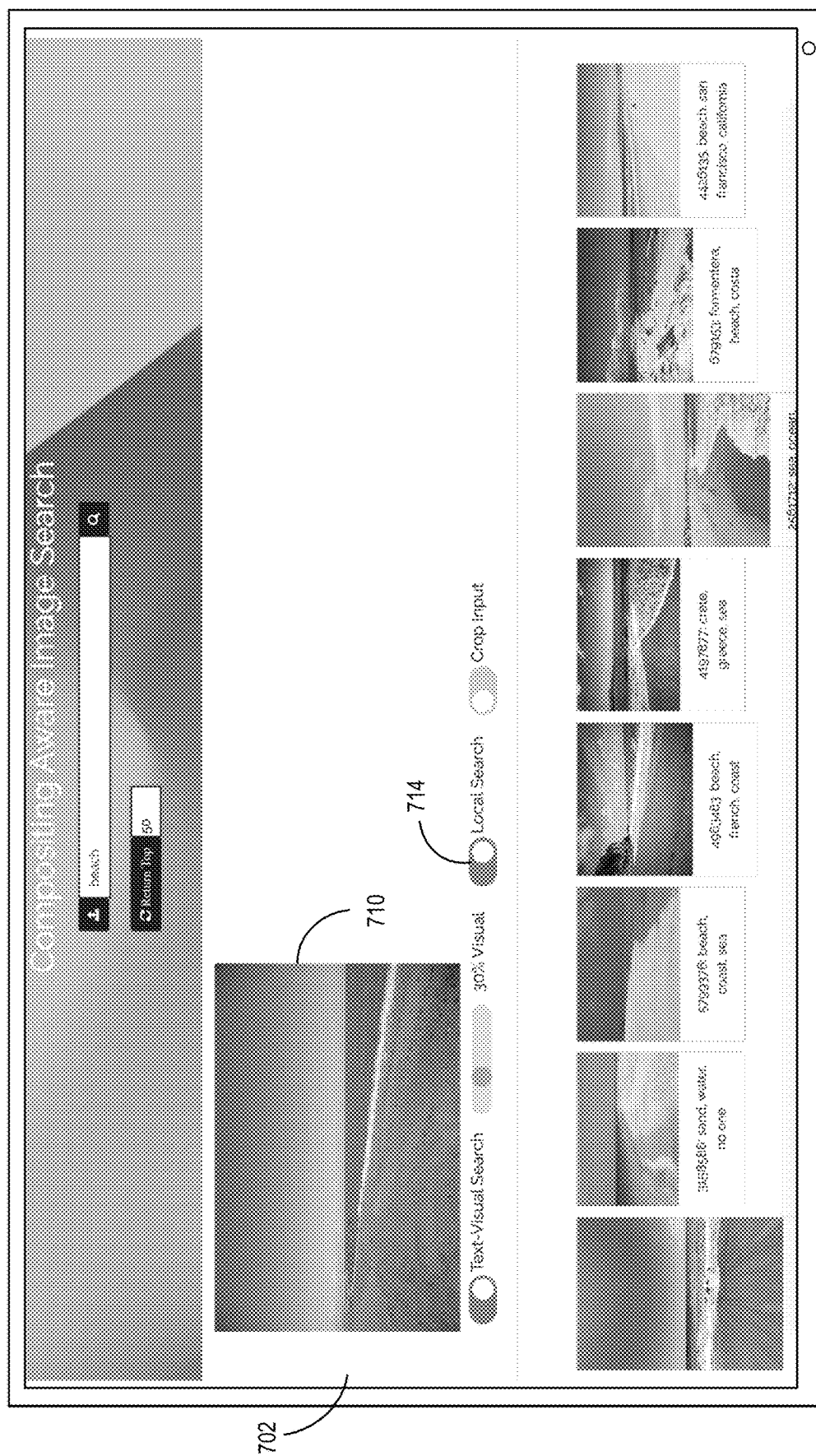

As illustrated in FIG. 7C, the object recommendation system 106 also provides a selectable option 714 for providing an indication to search for a foreground object image for use in generating the composite image with the background image 710. Indeed, in one or more embodiments, in response to a user interaction with the selectable option 714, the object recommendation system 106 receives an indication to search for one or more foreground object images that are compatible with the background image 710. Accordingly, in some embodiments, in response to detecting a user interaction with the selectable option 714, the object recommendation system 106 identifies one or more foreground object images to recommend in response. In some cases, however, the object recommendation system 106 retrieves one or more foreground object images without a user interaction with the selectable option 714 (e.g., automatically in response to selection of the background image 710).

In some implementations, the object recommendation system 106 utilizes a neural network (e.g., a geometry-lighting-aware neural network) to identify the one or more foreground object images. For instance, in some cases, the object recommendation system 106 utilizes the neural network to generate an embedding for the background image 710 and embeddings for a plurality of foreground object images within an embedding space (e.g., a geometry-lighting-sensitive embedding space). Further, the object recommendation system 106 determines compatibility based on the embeddings, such as by determining similarity scores between the embeddings for the foreground object images and the embedding for the background image 710. In some cases, as shown in FIG. 7C, the object recommendation system 106 is not provided with a query bounding box for the background image 710. Accordingly, in some embodiments, the object recommendation system 106 determines a foreground object image to recommend as described above with reference to FIG. 6A.

Figure 7D:
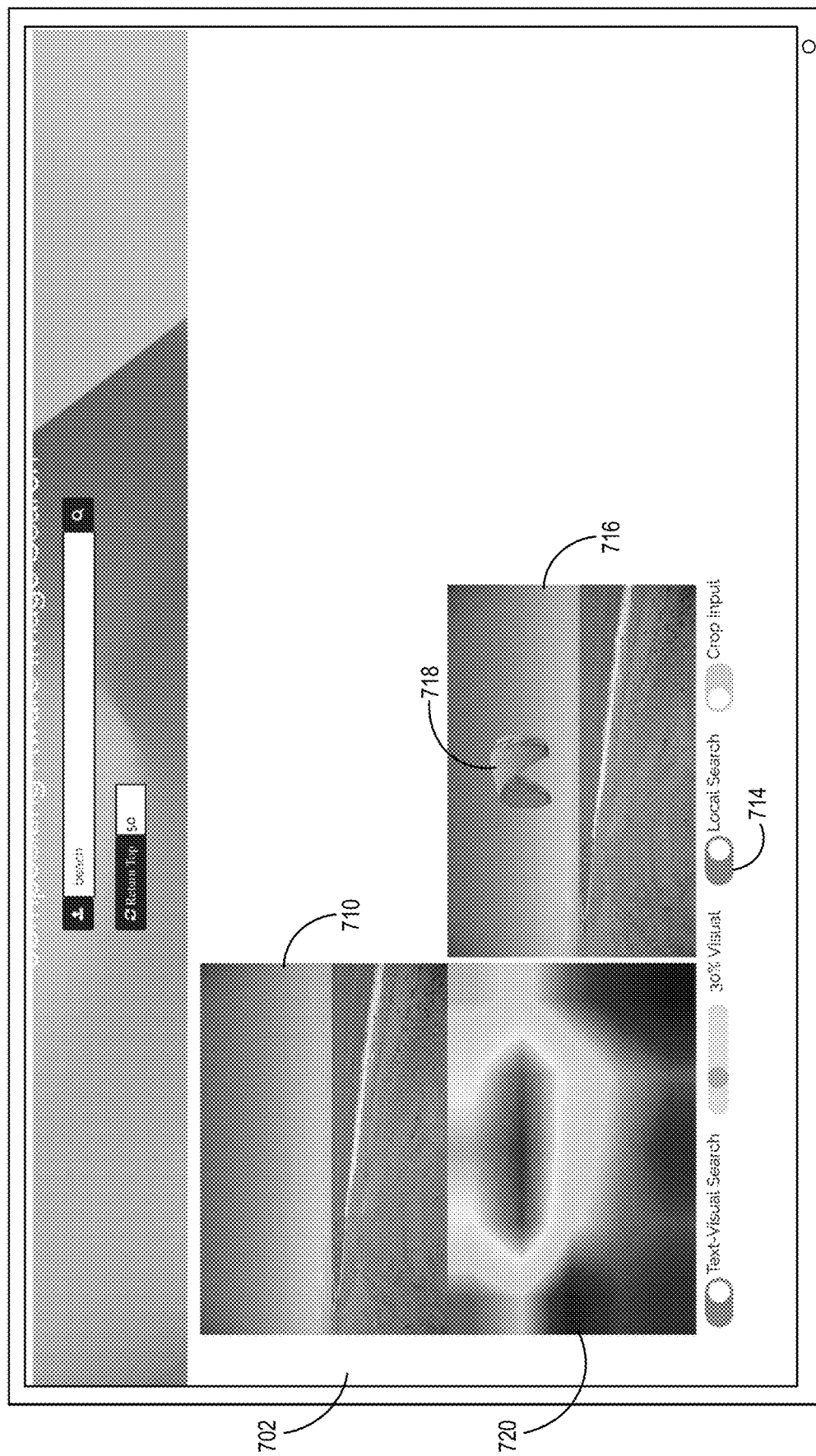

As shown in FIG. 7D, in response to receiving an indication to search for one or more foreground object images via a selection of the selectable option 714, the object recommendation system 106 provides a recommendation for display within the graphical user interface 702. In particular, as shown, the object recommendation system 106 generates and provides a composite image 716 for display within the graphical user interface 702. Indeed, in one or more embodiments, the object recommendation system 106 selects a foreground object image 718 (e.g., the foreground object image associated with the highest similarity score based on the embeddings) and generates and provides the composite image 716 for display without additional user input.

As further shown in FIG. 7D, as no query bounding box was provided with the background image 710, the object recommendation system 106 further recommends a location and scale for the foreground object image 718 within the background image 710. In particular, as shown, the object recommendation system 106 generates the composite image 716 by positioning the foreground object image 718 at a recommended location and using a recommended scale. Further, as shown in FIG. 7D, the object recommendation system 106 generates and provides a location heatmap 720 for display within the graphical user interface 702 as part of the recommendation. Thus, as shown in FIG. 7D, in some cases, the object recommendation system 106 provides the background image 710, the composite image 716, and the location heatmap 720 for simultaneous display.

Figure 7E:
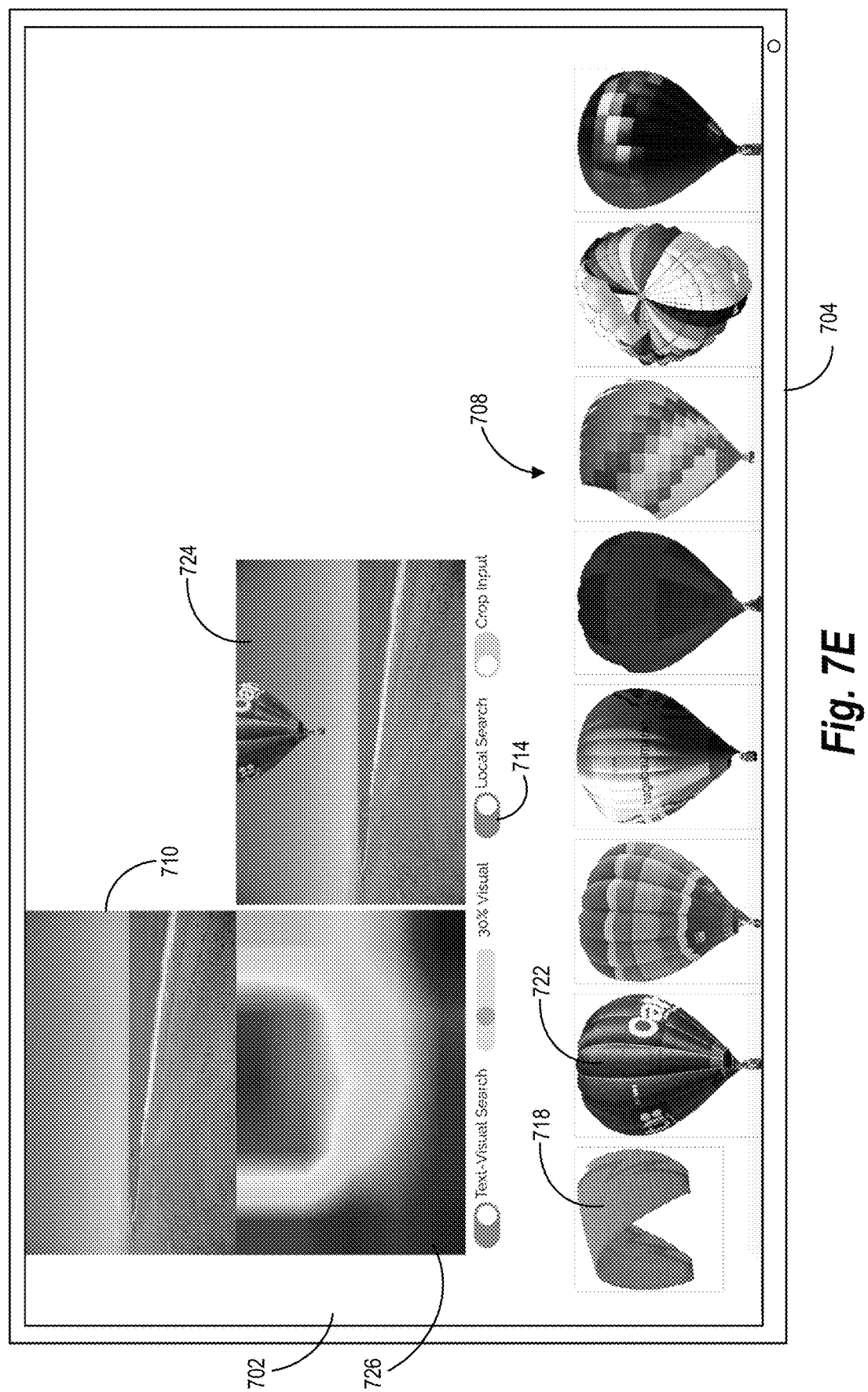

As shown in FIG. 7E, in some implementations, the object recommendation system 106 retrieves a plurality of foreground object images in response to detecting a selection of the selectable option 714. Indeed, as shown, the object recommendation system 106 provides the plurality of foreground object images for display within the search results area 708 of the graphical user interface 702. In one or more embodiments, the object recommendation system 106 arranges the plurality of foreground object images within the search results area 708 based on a ranking. For instance, as shown, the object recommendation system 106 provides the foreground object image 718 as a first foreground object image, indicating that the foreground object image 718 is most compatible with the background image 710 (e.g., is associated with the highest compatibility score). Further, the object recommendation system 106 provides another foreground object image 722 as a second foreground object image, indicating the foreground object image 722 is the second most compatible with the background image 710.

As further show in FIG. 7E, the object recommendation system 106 enables a change to the recommendation initially discussed with reference to FIG. 7D. For instance, as illustrated, upon a selection of the foreground object image 722, the object recommendation system 106 generates and provides a composite image 724 that combines the foreground object image 722 with the background image 710. As further shown, the object recommendation system 106 positions the foreground object image 722 at a recommended location using a recommended scale and generates and provides another location heatmap 726 based on the foreground object image 722. Thus, while the object recommendation system 106 generates and provides an initial recommendation without additional user input, the object recommendation system 106 allows for additional user input and modifies the initial recommendation accordingly.

Figure 7F:
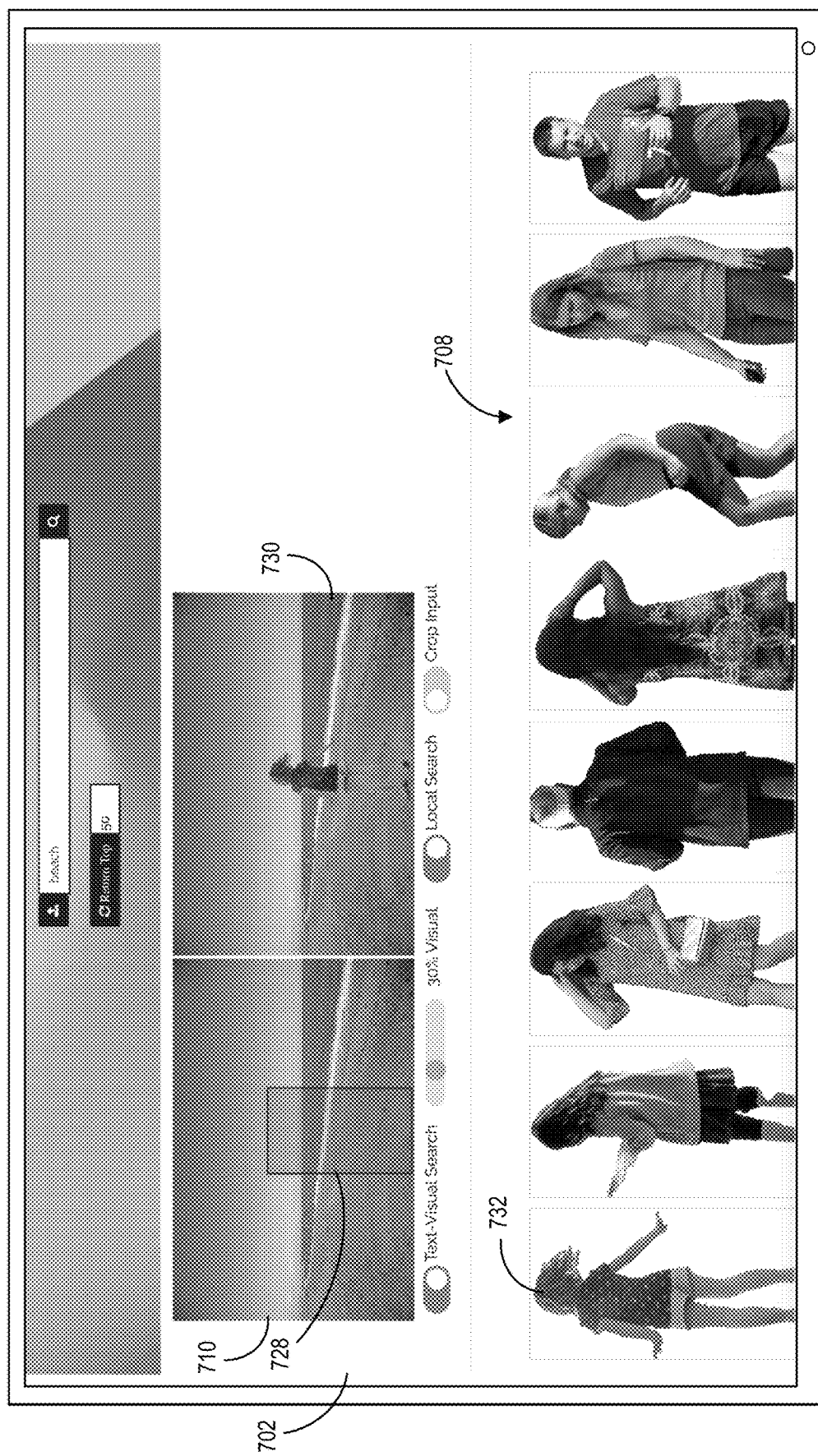

As shown in FIG. 7F, the object recommendation system 106 further modifies the provided recommendation in response to further user input. Indeed, as shown in FIG. 7F, the object recommendation system 106 receives a query bounding box 728 via one or more user interactions with the graphical user interface 702. In response, the object recommendation system 106 retrieves and provides, for display within the search results area 708, a plurality of foreground object images that are compatible with the portion of the background image 710 that corresponds to the query bounding box 728. Further, the object recommendation system 106 generates a composite image 730 using a foreground object image 732 and the background image 710. In particular, the object recommendation system 106 generates the composite image 730 by positioning the foreground object image 732 at the location and using the scale indicated by the query bounding box 728.

As indicated by FIG. 7F, the object recommendation system 106 does not provide a location heatmap indicating a recommended location as the query bounding box 728 already indicates a desired location. In some instances, however, the object recommendation system 106 still generates and provides a location heatmap to indicate compatibilities of the retrieved foreground object images with different locations of the background image 710.

Figure 7G:
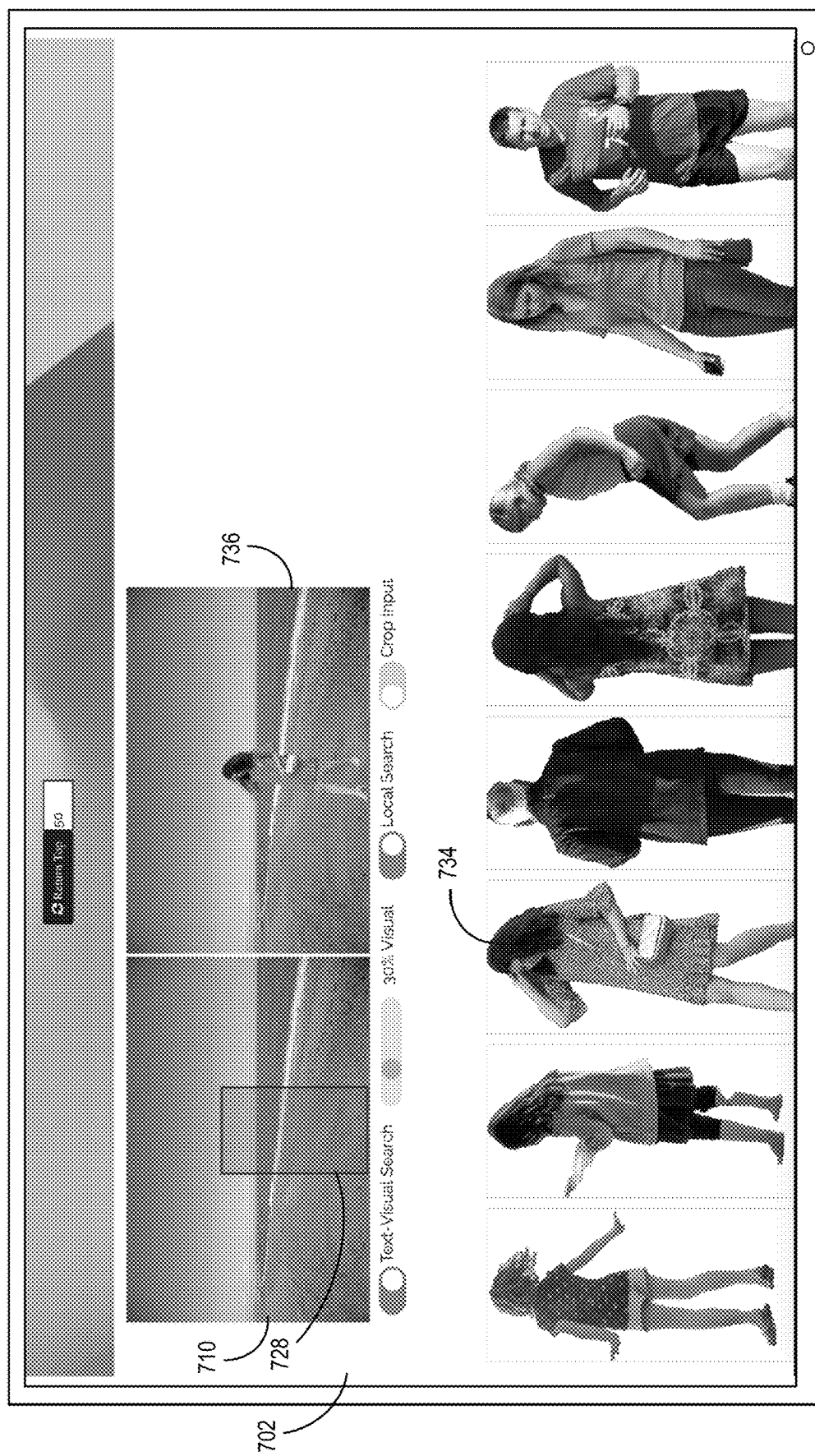

As shown by FIG. 7G, the object recommendation system 106 further modifies the recommendation in response to yet further user input. In particular, as shown, the object recommendation system 106 detects a selection of another foreground object image 734 and generates a composite image 736 using the background image 710 and the foreground object image 734. In particular, the object recommendation system 106 still positions the foreground object image 734 at a location and using a scale indicated by the query bounding box 728 to generate the composite image 736.

Figure 7H:
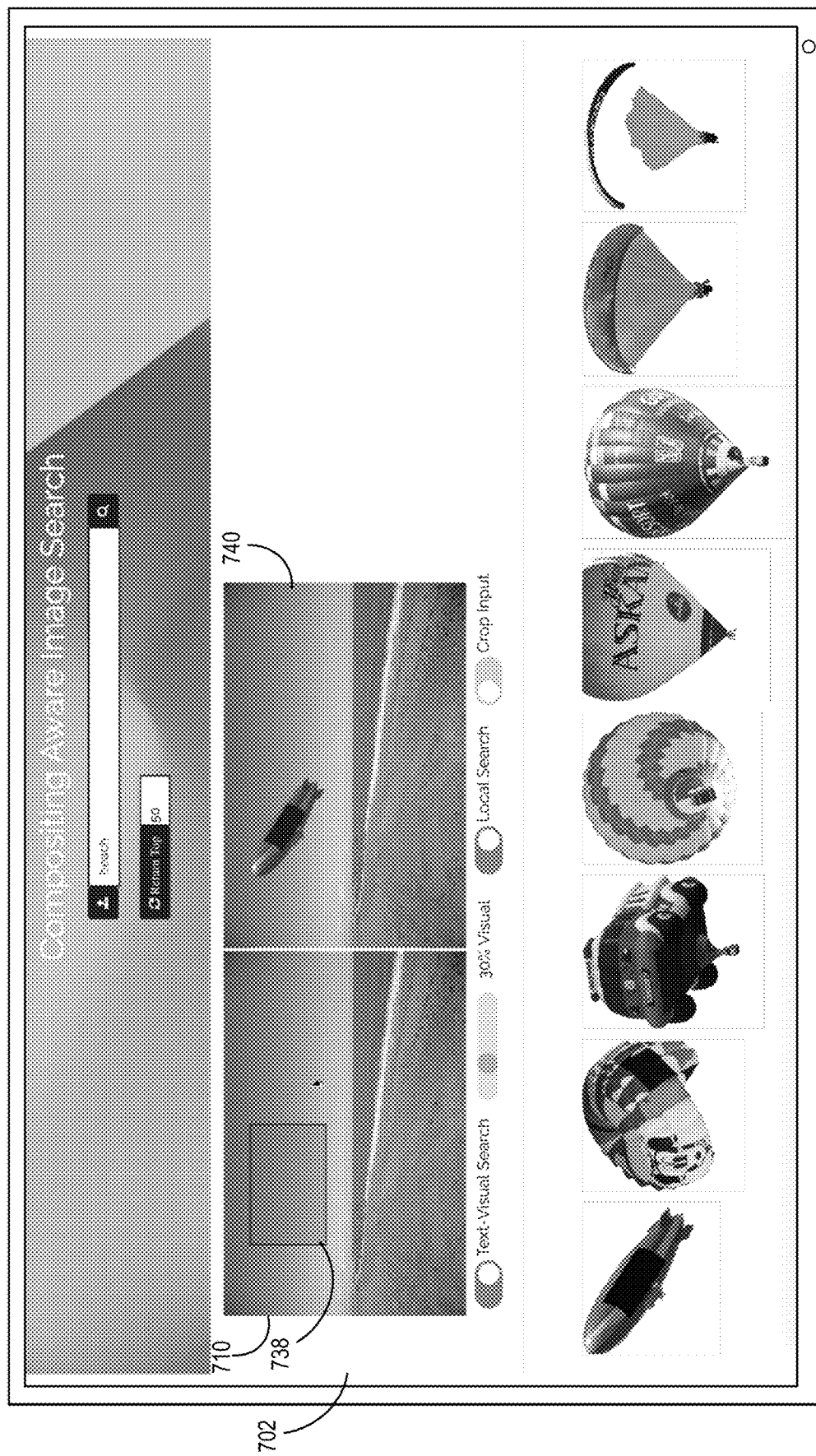

As shown by FIG. 7H, the object recommendation system 106 provides different recommendations based on the positioning of a query bounding box. Indeed, as illustrated, the object recommendation system 106 receives another query bounding box 738 at a different location of the background image 710. In response, the object recommendation system 106 retrieves foreground object images that are compatible with the portion of the background image 710 associated with the query bounding box 738 and generates a composite image 740 as part of the recommendation accordingly.

Figure 7I:
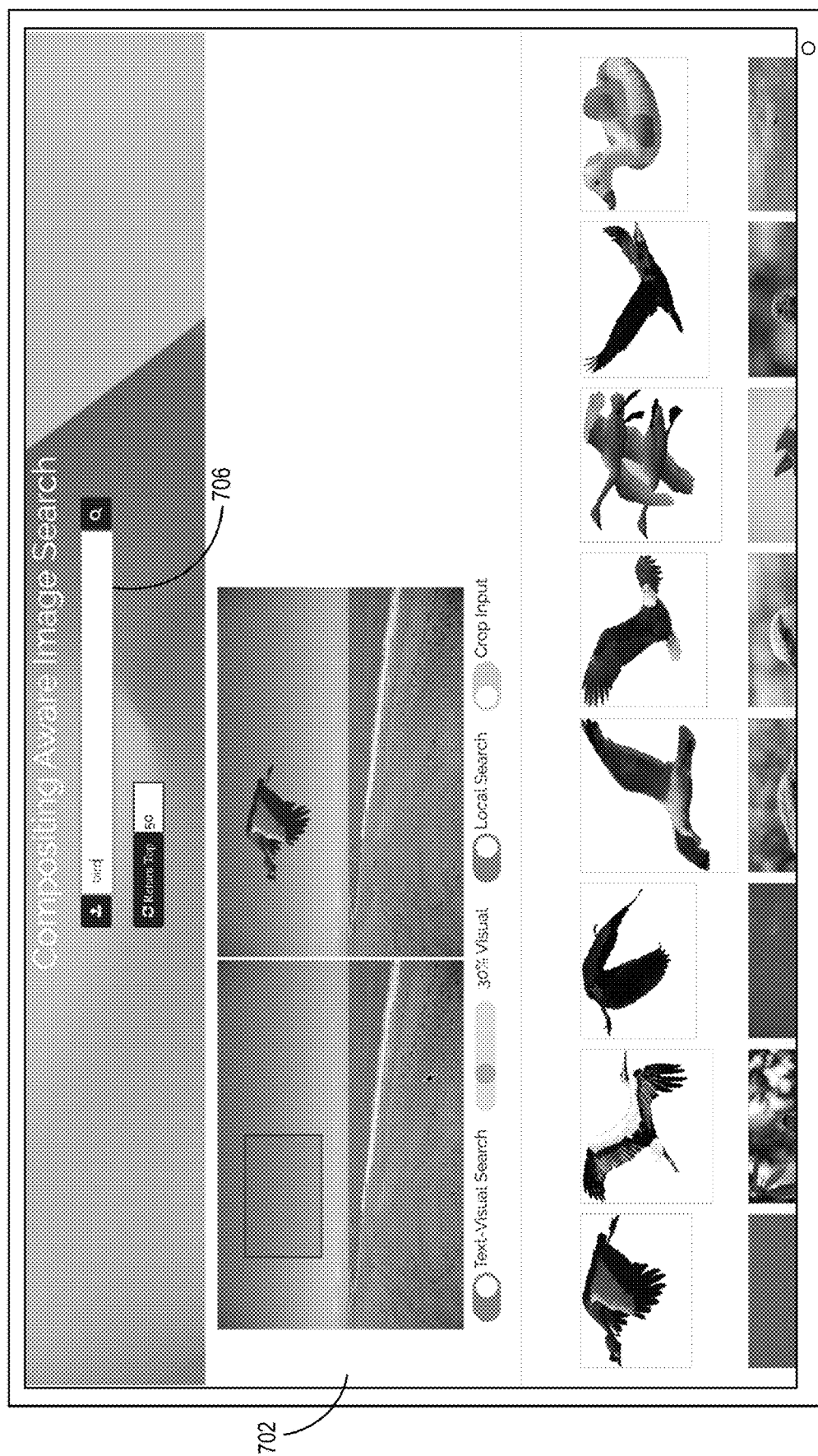
Figure 7J:
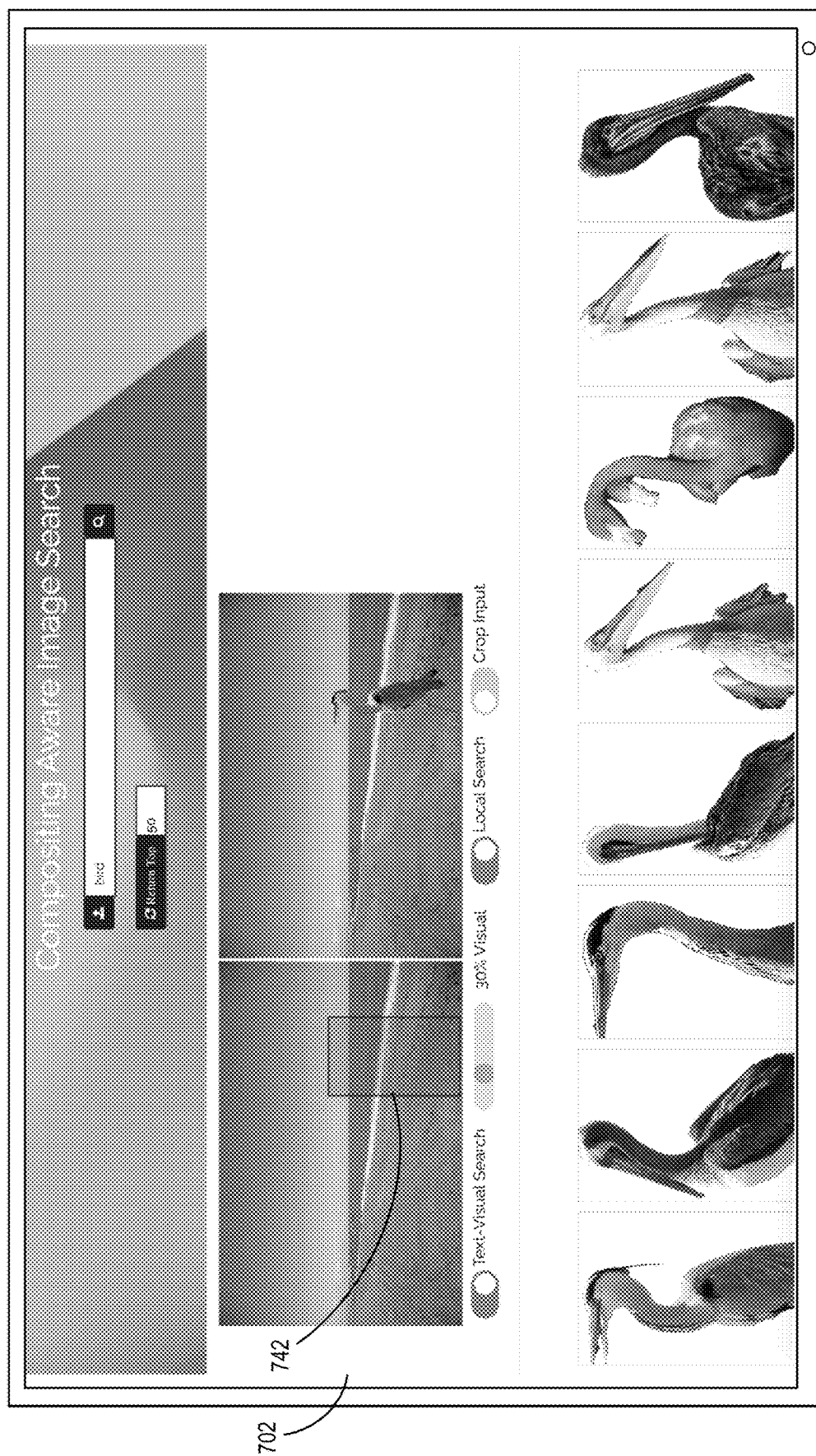

As shown by FIG. 7I, in some cases, the object recommendation system 106 provides recommendations based on other user-constraints (in addition to the constraints indicated by a query bounding box). For instance, as shown in FIG. 7I, the object recommendation system 106 receives user input via the search field 706 displayed within the graphical user interface 702. In particular, the user input indicates a category of foreground object images to retrieve. For instance, the object recommendation system 106 does a semantic search (e.g., utilizing a semantic neural network that compares semantic word embeddings to digital image embeddings) to identify a subset of digital images/objects that match the user input entered via the search field 706. The object recommendation system 106 then analyzes the subset of digital images (e.g., utilizing a geometry-lighting-aware neural network) to generate a recommendation. Accordingly, in some embodiments, the object recommendation system 106 generates a recommendation using a foreground object image from the category indicated by user input. As shown by FIG. 7J, as the user provides another query bounding box 742, the object recommendation system 106 changes the recommendation while still adhering to the provided category of foreground object images.

Thus, in one or more embodiments, the object recommendation system 106 utilizes a graphical user interface to implement a workflow that operates with more efficiency when compared to conventional systems. Indeed, the object recommendation system 106 can recommend foreground object images and corresponding composite images based on a low number of user interactions. For instance, as discussed above, based on as little as a selection of a background image, the object recommendation system 106 can retrieve a compatible foreground object image, determine a recommended location and scale for the foreground object image, generate a heatmap indicating the recommended location, and/or generate a composite image using the foreground object image at the recommended location and with the recommended scale.

Additionally, the object recommendation system 106 further maintains flexibility by changing the recommendation in response to additional user interaction. Again, the additional user interaction can be minimal, such as a mere selection of a different foreground object image provided within search results or an input indicating a category of foreground object images to target. Thus, in some implementations, the object recommendation system 106 provides a predicted optimal recommendation based on little input and gradually changes the recommendation to satisfy more specific needs are more input is received.

As previously mentioned, the object recommendation system 106 operates more accurately when compared to conventional systems. In particular, by utilizing a geometry-lighting-aware neural network to determine compatibility in terms of geometry and lighting as well as semantics, the object recommendation system 106 can retrieve foreground object images that are a better fit with a given background images. Researchers have conducted studies to determine the accuracy of one or more embodiments of the object recommendation system 106. FIGS. 8-11C provide qualitative and quantitative results regarding the effectiveness of the object recommendation system 106 in accordance with one or more embodiments.

Figure 8:
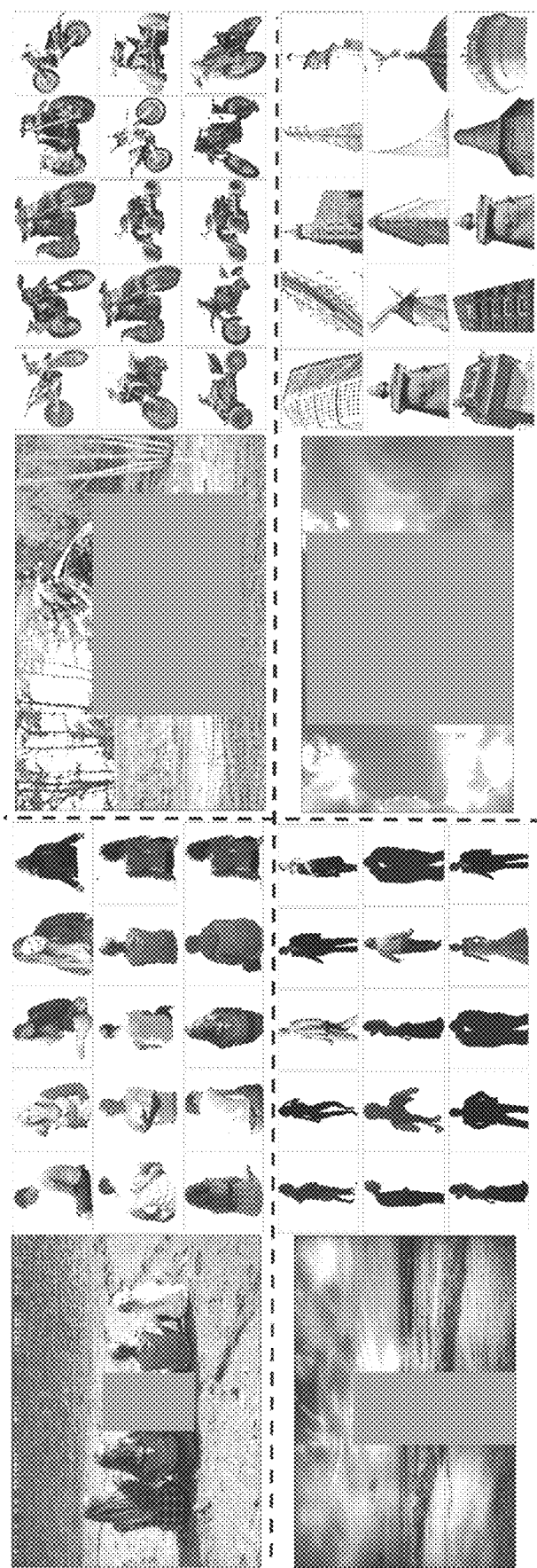
FIG. 8 illustrates graphical representations reflecting experimental results regarding the effectiveness of the object recommendation system in accordance with one or more embodiments.

In particular, FIG. 8 illustrates graphical representations reflecting experimental results regarding the effectiveness of the object recommendation system 106 in accordance with one or more embodiments. In particular, FIG. 8 shows the performance of a baseline foreground object retrieval model (first row of each example), which uses a fixed foreground network and mask augmentations. FIG. 8 further shows the performance of a model that is similar to the baseline model but utilizes an alternating training approach (second row of each example). FIG. 8 also shows the performance of an embodiment of the object recommendation system 106 that implements the full geometry-lighting-aware neural network described above where the network parameters are learned using contrastive learning via transformed foreground object images, mask augmentations, and alternating parameters updates (third row of each example).

FIG. 8 compares the performance of each tested model on the Pixabay and Open Images datasets respectively described in https://pixabay.com/and Alina Kuznetsova et al., *The Open Images Dataset V4*, International Journal of Computer Vision, 128(7):1956-1981, 2020. These are large-scale, real-world datasets that includes images having a broad range of diversity and covering multiple image categories.

As shown in FIG. 8, the embodiment of the object recommendation system 106 represented in the third row recommends foreground object images that are more compatible with the corresponding background image in terms of geometry and lighting. Indeed, as can be seen, while the other tested models recommend foreground object images that are semantically compatible with the corresponding background image, many of the recommended foreground object images are facing the wrong direction or include drastically different lighting. Accordingly, FIG. 8 indicates that these models are less accurate in identifying foreground object images that are truly compatible with a background image.

Figure 9:
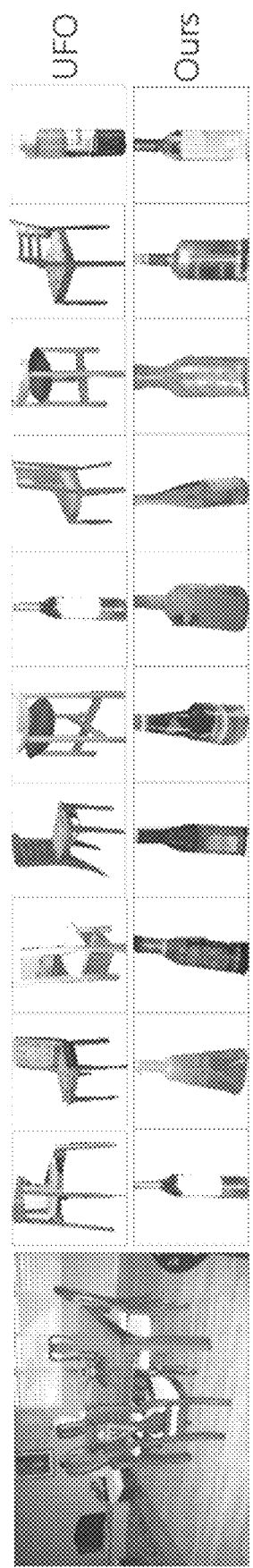
FIG. 9 illustrates graphical representations reflecting additional experimental results regarding the effectiveness of the object recommendation system in accordance with one or more embodiments.

FIG. 9 illustrates graphical representations reflecting additional experimental results regarding the effectiveness of the object recommendation system 106 in accordance with one or more embodiments. In particular, FIG. 9 compares the performance of an embodiment of the object recommendation system 106 with the performance of the above-referenced UFO model described by Yinan Zhao et al. Further, FIG. 9 compares the performance of the tested models on the above-referenced CAIS dataset described by Hengshuang Zhao et al.

As shown by FIG. 9, the object recommendation system 106 achieves better results in terms of lighting and geometry when compared to the UFO model while maintaining semantic compatibility. For example, while both tested methods provide foreground object images that appear to be compatible with the scene in general, the foreground object images provided by the object recommendation system 106 appear to be more compatible with the location on the table indicated by the bounding box.

FIG. 10A illustrates a table reflecting further experimental results regarding the effectiveness of the object recommendation system 106 in accordance with one or more embodiments. The table of FIG. 10A compares the performance of the object recommendation system 106 with the Shape model described by Hengshuang Zhao et al. and the UFO model described by Yinan Zhao et al. The table of FIG. 10A also shows the performance of the convolutional neural network (labeled as "RealismCNN") described by Jun-Yan et al., *Learning a Discriminative Model for the Perception of Realism in Composite Images*, Proceedings of the IEEE International Conference on Computer Vision, pages 3943-3951, 2015. Further, the table of FIG. 10A shows the performance of the constrained foreground object search methods (labeled "CFO-C Search" and "CFO-D Search") described by Hengshuang Zhao et al. The CFO-C Search method trains a classifier to specify the category and then applies constrained retrieval from that category. The CFO-D Search method applies a constrained search to retrieve one hundred samples from each category and then adopts a discriminator to re-rank the retrievals by compositing with each background.

The table of FIG. 10A compares the performance of the tested models on the CAIS dataset. The table further compares the performance using mAP-100, which is the mAP for the top one hundred retrievals. The table shows the mAP-100 value for several object classes. The table further compares the overall performance of each tested method.

As shown by FIG. 10A, the object recommendation system 106 outperforms the other methods in most of the object categories. Further, the object recommendation system 106 provides the best overall performance when compared to the other tested methods. While the CFO-C Search and CFO-D Search methods provide the best performance in some categories, these methods are not scalable in practice due to their use of multiple models and their constraint-based operation (denoted using †).

FIG. 10B illustrates a table comparing the performance of at least one embodiment of the object recommendation system 106 with a baseline model, such as the baseline model using the fixed foreground network and mask augmentations described above. The table of FIG. 10B compares the performance of the tested models on the Pixabay dataset. The table compares the performance using the Recall @ 10 metric, showing the measured percentages. Further, the table compares the performance across categories of different sizes (labeled "Majority," "Medium," and "Minority"). As shown, the object recommendation system 106 significantly outperforms the baseline model for every category, reaffirming the improved performance discussed above with reference to FIG. 8.

FIG. 10C illustrates another table that compares the performance of an embodiment of the object recommendation system 106 with the baseline model on the Pixabay and Open Images datasets. The table compares the performances using several Recall@k metrics. The table of FIG. 10C shows, again, the improved performance of the object recommendation system 106 over the baseline model.

FIG. 11A illustrates a table comparing the performance of an embodiment of the object recommendation system 106 that implements the geometry-lighting-aware neural network described above (labeled "Overall") with the baseline model as well as an embodiment of the object recommendation system 106 that learns network parameters without contrastive learning via transformed foreground object images (labeled "No Contrastive"). For measuring the performance, the researchers randomly selected two thousand foreground objects with their background images and, for each foreground object, generated fifty transformed objects using geometry transformations and fifty transformed objects using lighting transformations. The researchers then ranked the original foreground object with its corresponding transformed objects to determine the Recall@k value.

The researchers measured the discriminative ability of the models as the sensitivity to these transformations (e.g., the square Euclidean distance between normalized embedding features of the original and transformed foreground objects). With L2 normalization, the square Euclidean distance is $d=2-2s$ where $s$ is the cosine similarity. Accordingly, a higher sensitivity value corresponds to a larger distance between the features of original and transformed foreground objects.

As shown by the table of FIG. 11A, the embodiment of the object recommendation system 106 that implements the full geometry-lighting-aware neural network described above achieves better Recall@k and sensitivity values when compared to the other models. Indeed, when using the full geometry-lighting-aware neural network, the object recommendation system 106 shows much higher sensitivity to both geometry and lighting transformations. The results demonstrate the significance of using both alternating parameters updates and contrastive learning to improve discriminability.

FIG. 11B illustrates another table that compares the performance of various embodiments of the object recommendation system 106 using various methods to learn network parameters. The table of FIG. 11B compares the performances of these various methods with an embodiment of the object recommendation system 106 that implements the full geometry-lighting-aware neural network described above. As shown, the embodiment of the object recommendation system 106 that implements the full geometry-lighting-aware neural network described above outperforms all other methods of learning network parameters in both tested metrics.

FIG. 11C illustrates a table that compares performance of various embodiments of the object recommendation system 106 that learn network parameters via various contrastive learning approaches. As shown, the table compares the performance of an embodiment that does not implement contrastive learning, an embodiment that only implements geometry transformations, an embodiment that applies linear color-jittering on top of geometry transformations, and an embodiment that applies both geometry and lighting transformations to each foreground object. As shown by FIG. 11C, the embodiment of the object recommendation system 106 that implements both geometry and lighting transformations significantly outperforms the other embodiments.

Figure 12:
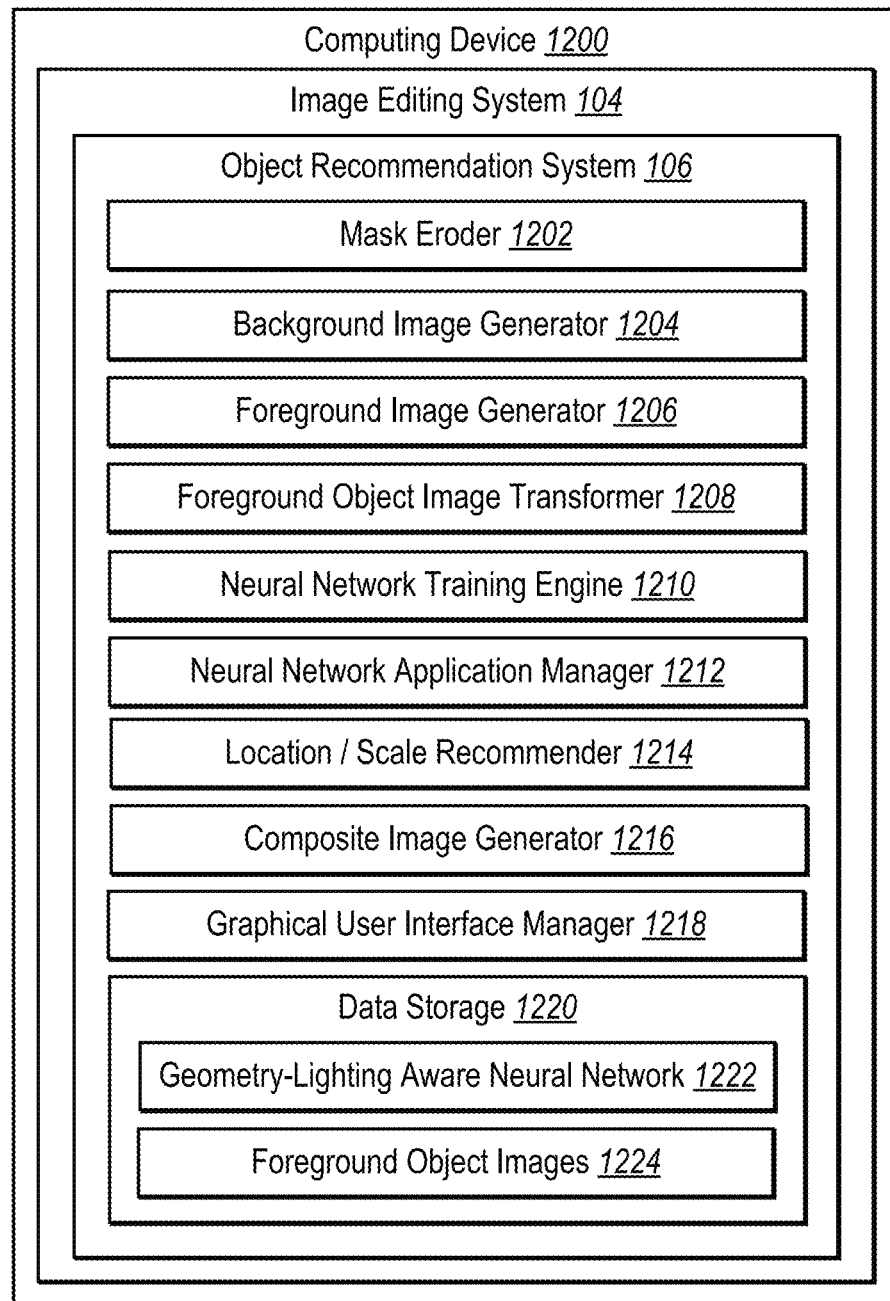
FIG. 12 illustrates an example schematic diagram of an object recommendation system in accordance with one or more embodiments.

Turning now to FIG. 12, additional detail will now be provided regarding various components and capabilities of the object recommendation system 106. In particular, FIG. 12 illustrates the object recommendation system 106 implemented by the computing device 1200 (e.g., the server(s) 102 and/or one of the client devices 110*a*-110*n* discussed above with reference to FIG. 1). Additionally, the object recommendation system 106 is also part of the image editing system 104. As shown in FIG. 12, the object recommendation system 106 includes, but is not limited to, a mask eroder 1202, a background image generator 1204, a foreground image generator 1206, a foreground object image transformer 1208, a neural network training engine 1210, a neural network application manager 1212, a location/scale recommender 1214, a composite image generator 1216, a graphical user interface manager 1218, and data storage 1220 (which includes a geometry-lighting-aware neural network 1222 and foreground object images 1224).

As just mentioned, and as illustrated in FIG. 12, the object recommendation system 106 includes the mask eroder 1202. In one or more embodiments, the mask eroder 1202 performs one or more mask erosions and/or augmentations. For example, in some implementations, the mask eroder 1202 generates an eroded segmentation mask from a segmentation mask that corresponds to a foreground object image. Further, in some cases, the mask eroder 1202 generates an extended mask for using in covering a foreground object within a background image.

Additionally, as shown in FIG. 12, the object recommendation system 106 includes the background image generator 1204. In one or more embodiments, the background image generator 1204 generates a background image from a digital image. For instance, in some embodiments, the background image generator 1204 generates the background image by using a mask to cover a portrayal of a foreground object image within the digital image. In some implementations, the background image generator 1204 utilizes an extended mask to cover the portrayal of the foreground object image.

Further, as shown in FIG. 12, the object recommendation system 106 includes the foreground image generator 1206. In one or more embodiments, the foreground image generator 1206 generates a foreground object image from a digital image. For example, in some instance, the foreground image generator 1206 generates a foreground object image by extracting a foreground object from a digital image using a corresponding segmentation mask. In some embodiments, the foreground image generator 1206 utilizes an eroded segmentation mask to extract the foreground object from the digital image.

As shown in FIG. 12, the object recommendation system 106 also includes the foreground object image transformer 1208. In one or more embodiments, the foreground object image transformer 1208 transforms a foreground object image. For instance, in some cases, the foreground object image transformer 1208 applies one or more geometry transformations to a foreground object image. In some instances, the foreground object image transformer 1208 applies one or more lighting transformations to a foreground object image.

As shown in FIG. 12, the object recommendation system 106 further includes the neural network training engine 1210. In one or more embodiments, the neural network training engine 1210 learns network parameters for a geometry-lighting-aware neural network to identify foreground object images that are compatible with background images in terms of semantics, lighting, and geometry. For instance, in some cases, the neural network training engine 1210 implements contrastive learning by utilizing the geometry-lighting-aware neural network to generate predicted embeddings for background images and transformed foreground object images and then by updating the network parameters based on losses determined from the predicted embeddings. Further, in some embodiments, the neural network training engine 1210 implements an alternating parameter update strategy. For instance, in some cases, the neural network training engine 1210 updates the parameters of the background network of the geometry-lighting-aware neural network while maintaining the parameters of its foreground network during a first stage of parameter updates. The neural network training engine 1210 further updates the parameters of the foreground network while maintaining the parameters of the background network during a second stage of parameter updates.

Additionally, as shown in FIG. 12, the object recommendation system 106 includes the neural network application manager 1212. In one or more embodiments, the neural network application manager 1212 utilizes a geometry-lighting-aware neural network to identify foreground object images that are compatible with background images for image composition. Indeed, in some cases, the neural network application manager 1212 utilizes a geometry-lighting-aware neural network to generate embeddings for a given background image and a plurality of foreground object images. The neural network application manager 1212 further determines similarity scores between the background image and foreground object images based on their corresponding embeddings and selects one or more foreground object images based on the similarity scores.

As further shown in FIG. 12, the object recommendation system 106 includes the location/scale recommender 1214. In one or more embodiments, the location/scale recommender 1214 determines a recommended location and/or a recommended scale for a foreground object image for use within a background image in creating a composite image. In some cases, the location/scale recommender further selects a foreground object image to recommend. To illustrate, in some cases, the location/scale recommender 1214 samples a plurality of locations of a background image using a plurality of bounding boxes, determines a set of foreground object images for each of the bounding boxes, selects a foreground object image from the set of foreground object images, and determines a recommended location and/or recommended scale for the foreground object image. In some implementations, the location/scale recommender 1214 further generates a location heatmap indicating the recommended location.

As shown in FIG. 12, the object recommendation system 106 also includes the composite image generator 1216. In one or more embodiments, the composite image generator 1216 generates a composite image from a background image and a foreground object images. In some cases, the composite image generator 1216 generates the composite image using a recommended location and/or recommended scale for the foreground object image.

Further, as shown in FIG. 12, the object recommendation system 106 includes the graphical user interface manager 1218. In one or more embodiments, the graphical user interface manager 1218 provides a graphical user interface and other visual elements for display and detects user interactions received via the graphical user interface. For example, in some cases, the graphical user interface manager 1218 detects a selection of a background image for creating an image composition and provides a foreground object image recommendation in response (including composite image and/or location heatmap). In some cases, the graphical user interface manager 1218 detects user interactions to modify a recommendation and provides an updated recommendation in accordance with the user interactions.

Additionally, as shown, the object recommendation system 106 includes data storage 1220. In particular, data storage 1220 (implemented by one or more memory devices) includes the geometry-lighting-aware neural network 1222 and the foreground object images 1224. In one or more embodiments, the geometry-lighting-aware neural network 1222 stores the geometry-lighting-aware neural network trained by the neural network training engine 1210 and implemented by the neural network application manager 1212. In some embodiments, the foreground object images 1224 stores foreground object images accessed in search for one or more foreground object images that are compatible with a background image.

Each of the components 1202-1224 of the object recommendation system 106 can include software, hardware, or both. For example, the components 1202-1224 can include one or more instructions stored on a computer-readable storage medium and executable by processors of one or more computing devices, such as a client device or server device. When executed by the one or more processors, the computer-executable instructions of the object recommendation system 106 can cause the computing device(s) to perform the methods described herein. Alternatively, the components 1202-1224 can include hardware, such as a special-purpose processing device to perform a certain function or group of functions. Alternatively, the components 1202-1224 of the object recommendation system 106 can include a combination of computer-executable instructions and hardware.

Furthermore, the components 1202-1224 of the object recommendation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1202-1224 of the object recommendation system 106 may be implemented as a stand-alone application, such as a desktop or mobile application. Furthermore, the components 1202-1224 of the object recommendation system 106 may be implemented as one or more web-based applications hosted on a remote server. Alternatively, or additionally, the components 1202-1224 of the object recommendation system 106 may be implemented in a suite of mobile device applications or "apps." For example, in one or more embodiments, the object recommendation system 106 can comprise or operate in connection with digital software applications such as ADOBE® PHOTOSHOP® or ADOBE® CAPTURE. The foregoing are either registered trademarks or trademarks of Adobe Inc. in the United States and/or other countries.

Figure 13:
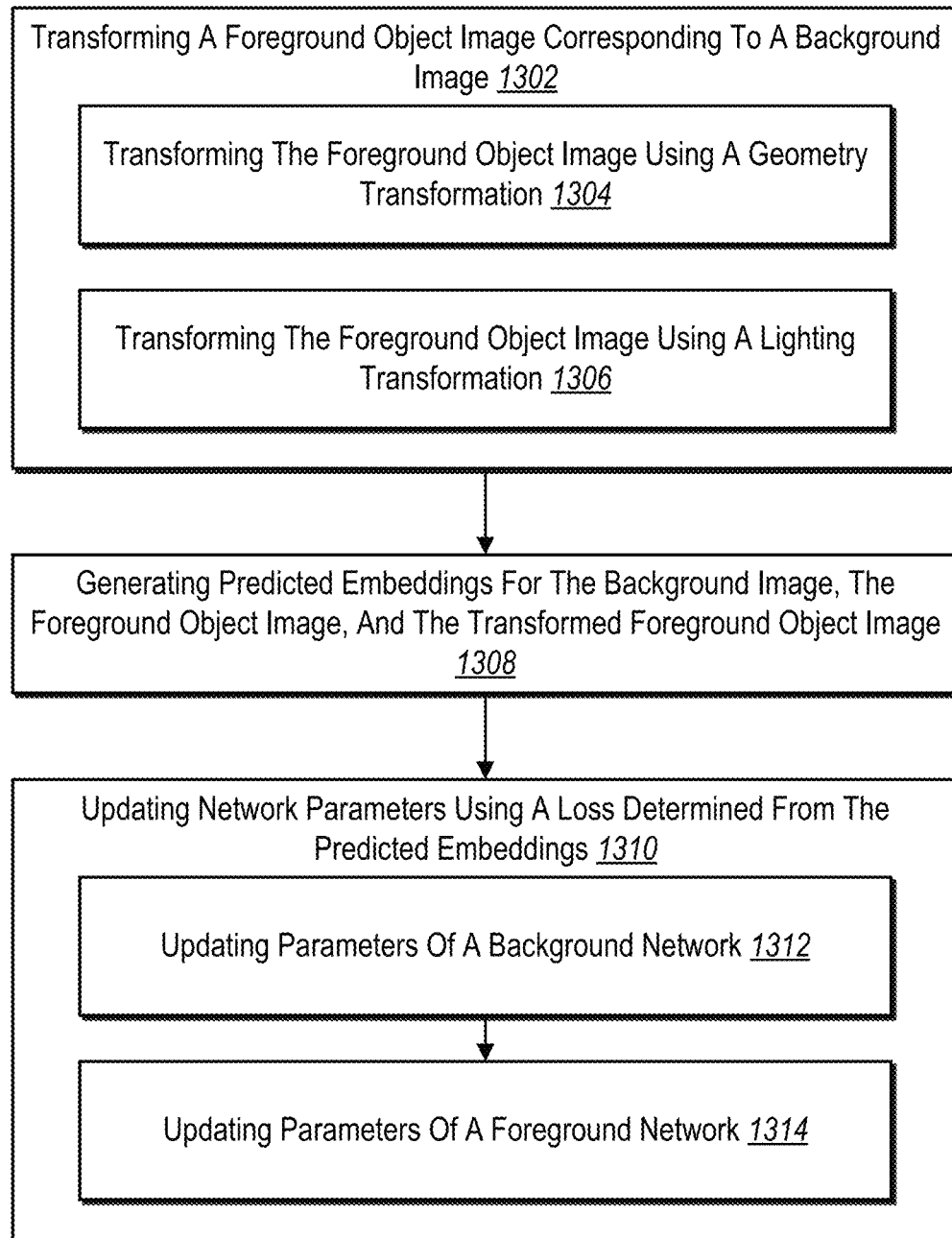
FIG. 13 illustrates a flowchart of a series of acts for learning network parameters for a geometry-lighting-aware neural network in accordance with one or more embodiments.

FIGS. 1-12, the corresponding text, and the examples provide a number of different methods, systems, devices, and non-transitory computer-readable media of the object recommendation system 106. In addition to the foregoing, one or more embodiments can also be described in terms of flowcharts comprising acts for accomplishing the particular result, as shown in FIG. 13. FIG. 13 may be performed with more or fewer acts. Further, the acts may be performed in different orders. Additionally, the acts described herein may be repeated or performed in parallel with one another or in parallel with different instances of the same or similar acts.

FIG. 13 illustrates a flowchart of a series of acts 1300 for learning network parameters for a geometry-lighting-aware neural network in accordance with one or more embodiments. FIG. 13 illustrates acts according to one embodiment, alternative embodiments may omit, add to, reorder, and/or modify any of the acts shown in FIG. 13. In some implementations, the acts of FIG. 13 are performed as part of a computer-implemented method. Alternatively, a non-transitory computer-readable medium can store instructions thereon that, when executed by at least one processor, cause the at least one processor to perform operations comprising the acts of FIG. 13. In some embodiments, a system performs the acts of FIG. 13. For example, in one or more embodiments, a system includes one or more memory devices comprising a geometry-lighting-aware neural network (e.g., a geometry-lighting-aware neural network comprising a foreground network and a background network). The system further includes one or more processors configured to cause the system to perform the acts of FIG. 13.

The series of acts 1300 includes an act 1302 for transforming a foreground object image corresponding to a background image. For example, in one or more embodiments, the act 1302 involves transforming a foreground object image corresponding to a background image using at least one of a geometry transformation or a lighting transformation.

In particular, as shown in FIG. 13, the act 1302 includes a sub-act 1304 for transforming the foreground object image using a geometry transformation. Indeed, in one or more embodiments, transforming the foreground object image using the at least one of the geometry transformation or the lighting transformation comprises transforming the foreground object image using the geometry transformation by: modifying the foreground object image using one or more homography transformations; and flipping the modified foreground object image using a flipping transformation.

As further shown in FIG. 13, the act 1302 also includes a sub-act 1306 for transforming the foreground object image using a lighting transformation. Indeed, in one or more embodiments, transforming the foreground object image using the at least one of the geometry transformation or the lighting transformation comprises transforming the foreground object image using the lighting transformation by: modifying a digital image using a Gaussian blur; extracting a portion of the modified digital image that corresponds to the foreground object image using a segmentation mask corresponding to the foreground object image; and transforming the foreground object image using the extracted portion of the modified digital image.

In some embodiments, the object recommendation system 106 generates the background image and the foreground object image. For instance, in some cases, the object recommendation system 106 generates the foreground object image by extracting a foreground object from a digital image utilizing a segmentation mask; and generates the background image by covering a portrayal of the foreground object within the digital image with a mask.

Additionally, the series of acts 1300 includes an act 1308 for generating predicted embeddings for the background image, the foreground object image, and the transformed foreground object image. For instance, in some embodiments, the act 1308 involves generating, utilizing a geometry-lighting-aware neural network, predicted embeddings for the background image, the foreground object image, and the transformed foreground object image within a geometry-lighting-sensitive embedding space.

In one or more embodiments, generating, utilizing the geometry-lighting-aware neural network, the predicted embeddings for the background image, the foreground object image, and the transformed foreground object image within the geometry-lighting-sensitive embedding space comprises: generating, utilizing a background network of the geometry-lighting-aware neural network, a first predicted embedding for the background image; and generating, utilizing a foreground network of the geometry-lighting-aware neural network, a second predicted embedding for the foreground object image and a third predicted embedding for the transformed foreground object image.

The series of acts 1300 further includes an act 1310 for updating network parameters using a loss determined from the predicted embeddings. To illustrate, in some cases, the act 1310 involves updating parameters of the geometry-lighting-aware neural network utilizing a loss determined from the predicted embeddings.

As shown in FIG. 13, the act 1310 includes a sub-act 1312 for updating parameters of a background network. Further, as shown, the act 1310 includes a sub-act 1314 for updating parameters of a foreground network. To illustrate, in one or more embodiments, updating the parameters of the geometry-lighting-aware neural network utilizing the loss determined from the predicted embeddings comprises updating parameters of a background network of the geometry-lighting-aware neural network utilizing the loss while maintaining parameters of a foreground network of the geometry-lighting-aware neural network. Accordingly, in some cases, the object recommendation system 106 further updates the parameters of the foreground network utilizing an additional loss determined from additional predicted embeddings while maintaining the parameters of the background network. Indeed, in some cases, the object recommendation system 106 updates parameters of the background and foreground networks in alternating stages.

In one or more embodiments, the object recommendation system 106 further identifies an additional foreground object image as a negative sample with respect to the background image; and generates, utilizing the geometry-lighting-aware neural network, an additional predicted embedding for the additional foreground object image within the geometry-lighting-sensitive embedding space. Accordingly, in some embodiments, updating the parameters of the geometry-lighting-aware neural network utilizing the loss determined from the predicted embeddings comprises updating the parameters of the geometry-lighting-aware neural network utilizing the loss determined from the predicted embeddings and the additional predicted embedding.

In some implementations, the object recommendation system 106 determines the loss from the predicted embeddings and the additional predicted embedding by: determining a first triplet loss using a first set of predicted embeddings for the background image, the foreground object image, and the additional foreground object image; determining a second triplet loss using a second set of predicted embeddings for the background image, the foreground object image, and the transformed foreground object image; and combining the first triplet loss and the second triplet loss.

In some implementations, the series of acts 1300 also includes acts for implementing the geometry-lighting-aware neural network. For instance, in some cases, the acts include utilizing the geometry-lighting-aware neural network with the updated parameters to recommend at least one foreground object image for use with at least one background image in generating a composite image.

To provide an illustration of learning network parameters for a geometry-lighting-aware neural network, in one or more embodiments, the object recommendation system 106 learns parameters for the geometry-lighting-aware neural network via an alternating learning process by: generating, utilizing the geometry-lighting-aware neural network, predicted embeddings for a foreground object image and a background image corresponding to the foreground object image within a geometry-lighting-sensitive embedding space; updating parameters of the background network utilizing the predicted embeddings while maintaining parameters of the foreground network; generating, utilizing the geometry-lighting-aware neural network, additional predicted embeddings for at least one foreground object image and at least one background image corresponding to the at least one foreground object image within the geometry-lighting-sensitive embedding space; and updating the parameters of the foreground network utilizing the additional predicted embeddings while maintaining the parameters of the background network.

Indeed, in some embodiments, the object recommendation system 106 generates, from the foreground object image, a transformed foreground object image utilizing a geometry transformation or a lighting transformation; generates, utilizing the geometry-lighting-aware neural network, a predicted embedding for the transformed foreground object image within the geometry-lighting-sensitive embedding space; and updates the parameters of the background network utilizing the predicted embedding for the transformed foreground object image and the predicted embeddings for the foreground object image and the background image. As an example, in at least one implementation, the object recommendation system 106 generates the transformed foreground object image from the foreground object image utilizing the lighting transformation by modifying the foreground object image utilizing a Gaussian blur.

In some cases, the object recommendation system 106 determines a first set of triplet losses from the predicted embeddings utilizing a first triplet loss function and a second triplet loss function; and determines a second set of triplet losses from the additional predicted embeddings utilizing the first triplet loss function and the second triplet loss function. Accordingly, in some instances, the object recommendation system 106 updates the parameters of the background network utilizing the predicted embeddings comprises updating the parameters of the background network utilizing the first set of triplet losses; and updates the parameters of the foreground network utilizing the additional predicted embeddings comprises updating the parameters of the foreground network utilizing the second set of triplet losses.

In one or more embodiments, the object recommendation system 106 generates the foreground object image by extracting a foreground object from a digital image utilizing an eroded segmentation mask corresponding to the foreground object; and generates the background image by covering a portrayal of the foreground object within the digital image utilizing an extended mask.

To provide an illustration of implementing a geometry-lighting-aware neural network, in one or more embodiments, the object recommendation system 106 receives a background image for generating a composite image; determines, utilizing a geometry-lighting-aware neural network, an embedding corresponding to the background image within a geometry-lighting-sensitive embedding space learned using predicted embeddings for transformed foreground object images associated with at least one of a geometry transformation or a lighting transformation; and generates a recommendation for using a foreground object image to generate the composite image with the background image based on the embedding corresponding to the background image within the geometry-lighting-sensitive embedding space.

In some embodiments, the object recommendation system 106 receives a query bounding box associated with a portion of the background image; and determines, utilizing the geometry-lighting-aware neural network, the embedding corresponding to the background image within the geometry-lighting-sensitive embedding space by determining, utilizing the geometry-lighting-aware neural network, an embedding corresponding to the portion of the background image associated with the query bounding box within the geometry-lighting-sensitive embedding space.

In some implementations, the object recommendation system 106 determines a proximity of an embedding corresponding to the foreground object image to the embedding corresponding to the background image within the geometry-lighting-sensitive embedding space; and generates the recommendation for using the foreground object image to generate the composite image with the background image based on the proximity of the embedding corresponding to the foreground object image to the embedding corresponding to the background image.

In some instances, the object recommendation system 106 determines a recommended location for the foreground object image within the background image utilizing the geometry-lighting-aware neural network; and generates the recommendation for using the foreground object image to generate the composite image with the background image by generating the recommendation for using the foreground object image at the recommended location within the background image to generate the composite image. To illustrate, in at least one implementation, the object recommendation system 106 generates the recommendation for using the foreground object image at the recommended location within the background image to generate the composite image by inserting the foreground object image into the background image at the recommended location determined utilizing the geometry-lighting-aware neural network to generate the composite image.

In some cases, the object recommendation system 106 recommends foreground object images where background images have been provided without a query bounding box. To provide an example, in one or more embodiments, the object recommendation system 106 receives a background image for generating a composite image; generates a plurality of bounding boxes for a plurality of locations within the background image; generates, utilizing a neural network, embeddings for a plurality of foreground object images selected for the plurality of bounding boxes; determines, from the plurality of foreground object images, a foreground object image for the composite image based on the embeddings; and generates a recommendation for using the foreground object image to generate the composite image. In some cases, generating the plurality of bounding boxes for the plurality of locations within the background image comprises generating the plurality of bounding boxes utilizing at least one of a plurality of aspect ratios or a plurality of scales.

In some implementations, the object recommendation system 106 generates a grid of locations for the background image; and determines a plurality of similarity scores for the foreground object image and the locations for the background image from the grid. Accordingly, in some embodiments, generating the recommendation for using the foreground object image comprises recommending a location for the foreground object image within the background image using the plurality of similarity scores. In some instances, the object recommendation system 106 further generates a location heatmap utilizing the plurality of similarity scores for the foreground object image and the locations for the background image from the grid. Accordingly, in some implementations, recommending the location for the foreground object image within the background image comprises recommending the location by providing the location heatmap. Further, in one or more embodiments, the object recommendation system 106 determines a scale for the foreground object image from a range of scales applied to the location recommended for the foreground object image. Accordingly, in some embodiments, generating the recommendation for using the foreground object image comprises recommending the scale for the location recommended for the foreground object image.

In one or more embodiments, the object recommendation system 106 further receives, via a graphical user interface of a client device, one or more user interactions indicating a bounding box within the background image; generates, utilizing the neural network, an additional recommendation comprising one or more additional foreground object images for use in generating the composite image based on the bounding box; and provides the additional recommendation for display within the graphical user interface of the client device.

In some embodiments, the object recommendation system 106 provides the recommendation to a client device by providing the foreground object image for display within a graphical user interface of the client device; and in response to detecting a user selection of the foreground object image via the client device: generates the composite image using the background image and the foreground object image; and provides the composite image for display within the graphical user interface of the client device.

In some implementations, the object recommendation system 106 utilizes a graphical user interface for the provision of foreground object image recommendations. As an example, in one or more embodiments, the object recommendation system 106 detects, via a graphical user interface displayed on a client device, a user selection of a background image for generating a composite image; determines, based on the user selection of the background image, a foreground object image for use in generating the composite image; determines a recommended location within the background image for the foreground object image; and provides, for display within the graphical user interface of the client device, a recommendation for using the foreground object image at the recommended location within the background image to generate the composite image.

In some cases, the object recommendation system 106 generates a location heatmap indicating compatibilities of the foreground object image with the recommended location within the background image and one or more additional locations within the background image; and provides, for display within the graphical user interface of the client device, the recommendation for using the foreground object image at the recommended location by providing the location heatmap for display within the graphical user interface. In some implementations, the object recommendation system 106 generates the location heatmap by: generating a grid of locations for the background image; determining a plurality of similarity scores for the foreground object image and the locations for the background image from the grid; and interpolating the plurality of similarity scores across the background image.

In one or more embodiments, the object recommendation system 106 generates the composite image by inserting the foreground object image into the background image at the recommended location; and provides, for display within the graphical user interface of the client device, the recommendation for using the foreground object image at the recommended location by providing, for display within the graphical user interface, the composite image having the foreground object image at the recommended location.

In some embodiments, the object recommendation system 106 provides, for display within the graphical user interface of the client device, the background image selected for generating the composite image with the recommendation for using the foreground object image at the recommended location within the background image; receives, via the graphical user interface, one or more user interactions indicating a bounding box at a location within the background image that is different than the recommended location; and provides, for display within the graphical user interface, an additional recommendation for using another foreground object image at the location within the background image to generate the composite image.

In some instances, the object recommendation system 106 provides the foreground object image and one or more additional foreground object images for display within the graphical user interface of the client device; detects a selection of an additional foreground object image from the one or more additional foreground object images; and in response to detecting the selection: determines an additional recommended location within the background image for the additional foreground object image; and provides, for display within the graphical user interface, an additional recommendation for using the additional foreground object image at the additional recommended location within the background image to generate the composite image.

In some implementations, the object recommendation system 106 receives, via the graphical user interface of the client device, a search query; provides, for display on the graphical user interface, a plurality of digital images in response to the search query; and detects, via the graphical user interface, the user selection of the background image for generating the composite image by detecting, via the graphical user interface, a selection of a digital image from the plurality of digital images.

To provide another example, in one or more embodiments, the object recommendation system 106 provides, for display within a graphical user interface of a client device, a background image for use in generating a composite image; receives, via the graphical user interface of the client device, an indication to search for a foreground object image for the composite image; and in response to receiving the indication to search for the foreground object image: determines, utilizing the geometry-lighting-aware neural network, one or more foreground object images for the composite image; generates the composite image utilizing the background image and a foreground object image from the one or more foreground object images; and provides the composite image for display within the graphical user interface of the client device.

In some cases, the object recommendation system 106 determines, utilizing the geometry-lighting-aware neural network, a recommended location for the foreground object image within the background image; and generates the composite image to include the foreground object image at the recommended location. In some cases, the object recommendation system 106 further provides, for display with the composite image within the graphical user interface of the client device, the background image and a location heatmap indicating compatibilities of the foreground object image with the recommended location within the background image and one or more additional locations within the background image.

In one or more embodiments, the object recommendation system 106 determines a ranking for the one or more foreground object images using embeddings for the one or more foreground object images generated from the geometry-lighting-aware neural network; and selects the foreground object image for use in generating the composite image based on the ranking for the one or more foreground object images. In some embodiments, the object recommendation system 106 provides the one or more foreground object images for display within the graphical user interface; receives, via the graphical user interface, a user selection of an additional foreground object image from the one or more foreground object images; and generates an additional composite image utilizing the background image and the additional foreground object image. In some implementations, the object recommendation system 106 receives, via the graphical user interface, a query bounding box associated with a portion of the background image; and determines, utilizing the geometry-lighting-aware neural network, the one or more foreground object images for the composite image by determining, utilizing the geometry-lighting-aware neural network, at least one foreground object image for the composite image based on the portion of the background image associated with the query bounding box.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
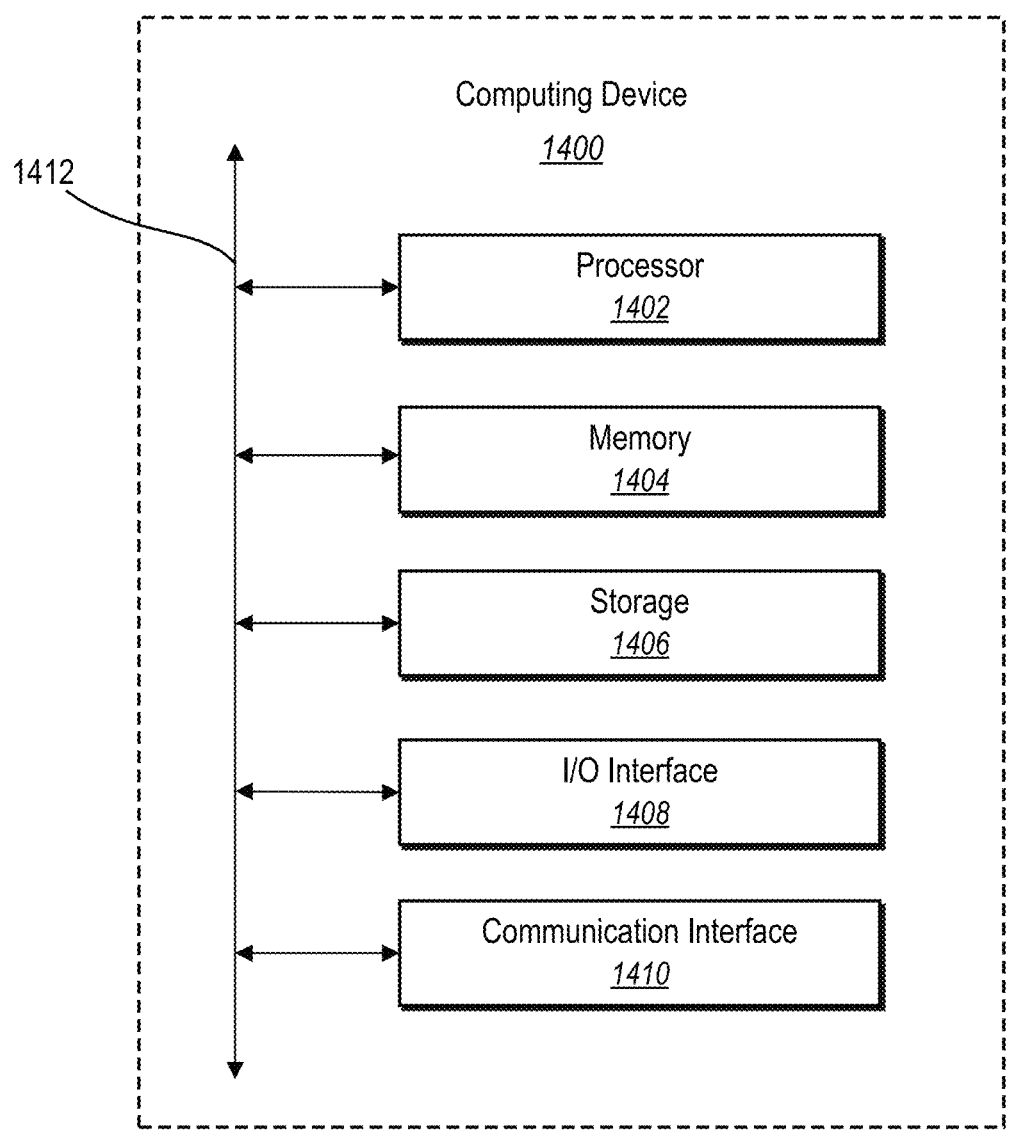
FIG. 14 illustrates a block diagram of an exemplary computing device in accordance with one or more embodiments.

FIG. 14 illustrates a block diagram of an example computing device 1400 that may be configured to perform one or more of the processes described above. One will appreciate that one or more computing devices, such as the computing device 1400 may represent the computing devices described above (e.g., the server(s) 102 and/or the client devices 110a-110n). In one or more embodiments, the computing device 1400 may be a mobile device (e.g., a mobile telephone, a smartphone, a PDA, a tablet, a laptop, a camera, a tracker, a watch, a wearable device). In some embodiments, the computing device 1400 may be a non-mobile device (e.g., a desktop computer or another type of client device). Further, the computing device 1400 may be a server device that includes cloud-based processing and storage capabilities.

As shown in FIG. 14, the computing device 1400 can include one or more processor(s) 1402, memory 1404, a storage device 1406, input/output interfaces 1408 (or "I/O interfaces 1408"), and a communication interface 1410, which may be communicatively coupled by way of a communication infrastructure (e.g., bus 1412). While the computing device 1400 is shown in FIG. 14, the components illustrated in FIG. 14 are not intended to be limiting. Additional or alternative components may be used in other embodiments. Furthermore, in certain embodiments, the computing device 1400 includes fewer components than those shown in FIG. 14. Components of the computing device 1400 shown in FIG. 14 will now be described in additional detail.

In particular embodiments, the processor(s) 1402 includes hardware for executing instructions, such as those making up a computer program. As an example, and not by way of limitation, to execute instructions, the processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 including storage for storing data or instructions. As an example, and not by way of limitation, the storage device 1406 can include a non-transitory storage medium described above. The storage device 1406 may include a hard disk drive (HDD), flash memory, a Universal Serial Bus (USB) drive or a combination these or other storage devices.

As shown, the computing device 1400 includes one or more I/O interfaces 1408, which are provided to allow a user to provide input to (such as user strokes), receive output from, and otherwise transfer data to and from the computing device 1400. These I/O interfaces 1408 may include a mouse, keypad or a keyboard, a touch screen, camera, optical scanner, network interface, modem, other known I/O devices or a combination of such I/O interfaces 1408. The touch screen may be activated with a stylus or a finger.

The I/O interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1408 are configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 provides one or more interfaces for communication (such as, for example, packet-based communication) between the computing device and one or more other computing devices or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can include hardware, software, or both that connects components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause the at least one processor to perform operations comprising:
    detecting, via a graphical user interface displayed on a client device, a user selection of a background image for generating a composite image;
    determining, based on the user selection of the background image, a foreground object image for use in generating the composite image;
    generating a plurality of candidate locations for the foreground object image within the background image by generating a grid of locations for the background image;
    determining, from the plurality of candidate locations, a recommended location within the background image for the foreground object image based on determining similarity scores for the foreground object image and the locations for the background image from the grid; and
    providing, for display within the graphical user interface of the client device, a recommendation for using the foreground object image at the recommended location within the background image to generate the composite image.

2. The non-transitory computer-readable medium of claim 1, wherein the operations further comprise:
    generating a location heatmap indicating compatibilities of the foreground object image with the recommended location within the background image and one or more additional locations within the background image; and
    providing, for display within the graphical user interface of the client device, the recommendation for using the foreground object image at the recommended location by providing the location heatmap for display within the graphical user interface.

3. The non-transitory computer-readable medium of claim 2, wherein:
    generating the location heatmap comprises interpolating the plurality of similarity scores across the background image.

4. The non-transitory computer-readable medium of claim 1, wherein the operations further comprise:
    generating the composite image by inserting the foreground object image into the background image at the recommended location; and
    providing, for display within the graphical user interface of the client device, the recommendation for using the foreground object image at the recommended location by providing, for display within the graphical user interface, the composite image having the foreground object image at the recommended location.

5. The non-transitory computer-readable medium of claim 1, wherein the operations further comprise:
    providing, for display within the graphical user interface of the client device, the background image selected for generating the composite image with the recommendation for using the foreground object image at the recommended location within the background image;
    receiving, via the graphical user interface, one or more user interactions indicating a bounding box at a location within the background image that is different than the recommended location; and
    providing, for display within the graphical user interface, an additional recommendation for using another foreground object image at the location indicated by the bounding box within the background image to generate the composite image.

6. The non-transitory computer-readable medium of claim 1, wherein the operations further comprise:
    providing the foreground object image and one or more additional foreground object images for display within the graphical user interface of the client device;
    detecting a selection of an additional foreground object image from the one or more additional foreground object images; and
    in response to detecting the selection:
        determining an additional recommended location within the background image for the additional foreground object image; and
        providing, for display within the graphical user interface, an additional recommendation for using the additional foreground object image at the additional recommended location within the background image to generate the composite image.

7. The non-transitory computer-readable medium of claim 1, wherein the operations further comprise:
    receiving, via the graphical user interface of the client device, a search query;

providing, for display on the graphical user interface, a plurality of digital images in response to the search query; and detecting, via the graphical user interface, the user selection of the background image for generating the composite image by detecting, via the graphical user interface, a selection of a digital image from the plurality of digital images.

8. A system comprising:

one or more memory devices comprising a geometry-lighting-aware neural network; and one or more processors configured to cause the system to:
provide, for display within a graphical user interface of a client device, a background image for use in generating a composite image;
receive, via the graphical user interface of the client device, an indication to search for a foreground object image for the composite image; and
in response to receiving the indication to search for the foreground object image:
determine, utilizing the geometry-lighting-aware neural network, one or more foreground object images for the composite image;
generate a plurality of candidate locations for the one or more foreground object images within the background image by generating a grid of locations for the background image;
determine, from the plurality of candidate locations, a recommended location within the background image for a foreground object image from the one or more foreground object images based on determining similarity scores for the foreground object image and the locations for the background image from the grid;
generate the composite image utilizing the background image and the foreground object image from the one or more foreground object images at the recommended location; and
provide the composite image for display within the graphical user interface of the client device.

9. The system of claim 8, wherein the one or more processors are further configured to cause the system to determine the recommended location from the plurality of candidate locations by determining the recommended location using the geometry-lighting-aware neural network.

10. The system of claim 9, wherein the one or more processors are further configured to cause the system to provide, for display with the composite image within the graphical user interface of the client device, the background image and a location heatmap indicating compatibilities of the foreground object image with the recommended location within the background image and one or more additional locations within the background image.

11. The system of claim 8, wherein the one or more processors are further configured to cause the system to:
determine a ranking for the one or more foreground object images using embeddings for the one or more foreground object images generated from the geometry-lighting-aware neural network; and
select the foreground object image for use in generating the composite image based on the ranking for the one or more foreground object images.

12. The system of claim 8, wherein the one or more processors are further configured to cause the system to:
provide the one or more foreground object images for display within the graphical user interface;
receive, via the graphical user interface, a user selection of an additional foreground object image from the one or more foreground object images; and
generate an additional composite image utilizing the background image and the additional foreground object image.

13. The system of claim 8, wherein the one or more processors are further configured to cause the system to:
receive, via the graphical user interface, a query bounding box associated with a portion of the background image; and
determine, utilizing the geometry-lighting-aware neural network, the one or more foreground object images for the composite image by determining, utilizing the geometry-lighting-aware neural network, at least one foreground object image for the composite image based on the portion of the background image associated with the query bounding box.

14. A computer-implemented method comprising:
detecting, via a graphical user interface displayed on a client device, a user selection of a background image for generating a composite image;
determining, based on the user selection of the background image, a foreground object image for use in generating the composite image;
generating a plurality of candidate locations for the foreground object image within the background image by generating a grid of locations for the background image;
determining, from the plurality of candidate locations, a recommended location within the background image for the foreground object image based on determining similarity scores for the foreground object image and the locations for the background image from the grid; and
providing, for display within the graphical user interface of the client device, a recommendation for using the foreground object image at the recommended location within the background image to generate the composite image.

15. The computer-implemented method of claim 14, further comprising generating a location heatmap that indicates the recommended location within the background image using the similarity scores for the foreground object image and the locations for the background image from the grid,
wherein providing the recommendation for using the foreground object image at the recommended location within the background image comprises providing the location heatmap.

16. The computer-implemented method of claim 14, further comprising determining a scale for the foreground object image from a range of scales applied to the recommended location for the foreground object image,
wherein generating the recommendation for using the foreground object image comprises recommending the scale for the recommended location for the foreground object image.

17. The computer-implemented method of claim 14, further comprising:
receiving, via a graphical user interface of a client device, one or more user interactions indicating a bounding box within the background image;

generating an additional recommendation comprising one or more additional foreground object images for use in generating the composite image based on the bounding box; and providing the additional recommendation for display within the graphical user interface of the client device.

18. The computer-implemented method of claim 14, wherein:

generating the plurality of candidate locations for the foreground object image within the background image comprises generating a set of bounding boxes at a set of locations within the background image; and determining the recommended location from the plurality of candidate locations comprises determining a bounding box associated with a global optimum scale-location pair from the set of bounding boxes.

19. The computer-implemented method of claim 14, further comprising:

generating the composite image by inserting the foreground object image into the background image at the recommended location; and providing, for display within the graphical user interface of the client device, the recommendation for using the foreground object image at the recommended location by providing, for display within the graphical user interface, the composite image having the foreground object image at the recommended location.

20. The computer-implemented method of claim 14, further comprising:

providing the foreground object image and one or more additional foreground object images for display within the graphical user interface of the client device;

detecting a selection of an additional foreground object image from the one or more additional foreground object images; and in response to detecting the selection:

determining an additional recommended location within the background image for the additional foreground object image; and providing, for display within the graphical user interface, an additional recommendation for using the additional foreground object image at the additional recommended location within the background image to generate the composite image.

\* \* \* \* \*